(12) United States Patent
Schaffert

(10) Patent No.: US 7,121,216 B2
(45) Date of Patent: Oct. 17, 2006

(54) LIQUID DISTRIBUTION APPARATUS FOR DISTRIBUTING LIQUID INTO A SEED FURROW

(76) Inventor: Paul E. Schaffert, R.R. 1 Box 157, Indianola, NE (US) 69034

( * ) Notice: Subject to any disclaimer, the term of this patent is extended or adjusted under 35 U.S.C. 154(b) by 135 days.

(21) Appl. No.: 10/819,565

(22) Filed: Apr. 6, 2004

(65) Prior Publication Data

US 2004/0255834 A1 Dec. 23, 2004

Related U.S. Application Data

(63) Continuation-in-part of application No. 10/228,688, filed on Aug. 26, 2002, now Pat. No. 6,763,773, which is a continuation-in-part of application No. 09/832,740, filed on Apr. 9, 2001, now Pat. No. 6,453,832, and a continuation-in-part of application No. 09/563,106, filed on May 2, 2000, now Pat. No. 6,283,050, which is a continuation of application No. 08/881,177, filed on Jun. 23, 1997, now Pat. No. 6,082,275, which is a continuation-in-part of application No. 08/550,088, filed on Oct. 30, 1995, now Pat. No. 5,640,915.

(60) Provisional application No. 60/195,942, filed on Apr. 10, 2000.

(51) Int. Cl.
*A01C 5/00* (2006.01)
(52) U.S. Cl. ........................ 111/150; 111/129
(58) Field of Classification Search ............... 111/150, 111/189, 197, 149, 190, 200, 186, 188, 129, 111/120, 118
See application file for complete search history.

(56) References Cited

U.S. PATENT DOCUMENTS

| | | | |
|---|---|---|---|
| 13,683 | A | 10/1855 | McCormick |
| 35,510 | A | 6/1862 | DeHaven |
| 122,299 | A | 12/1871 | Wight et al. |
| 176,708 | A | 4/1876 | Templin |
| 183,947 | A | 10/1876 | Lewis |
| 203,207 | A | 4/1878 | Springer |
| 211,601 | A | 1/1879 | Springer |
| 221,004 | A | 10/1879 | Strayer |
| 252,265 | A | 1/1882 | Scofield |
| 288,661 | A | 11/1883 | Purdy et al. |
| 308,327 | A | 11/1884 | Runstetler |
| 322,841 | A | 7/1885 | Miskimen |
| 410,438 | A | 9/1889 | Patric et al. |
| 555,897 | A | 3/1896 | Crane |
| 789,798 | A | 5/1905 | Deterding |
| 889,947 | A | 6/1908 | Miller |
| 909,137 | A | 1/1909 | Bellerive |
| 1,104,602 | A | 7/1914 | Akers |
| 1,473,297 | A | 11/1923 | Knight |
| 1,691,466 | A | 11/1928 | Burtner |
| 1,934,490 | A | 11/1933 | Elliott |

(Continued)

FOREIGN PATENT DOCUMENTS

DE 3114771 10/1982

(Continued)

OTHER PUBLICATIONS

BROCHURE, "Keeton Seed Firmer", J & K Enterprises, 1994.

(Continued)

*Primary Examiner*—Christopher J. Novosad
(74) *Attorney, Agent, or Firm*—Dorsey & Whitney LLP

(57) ABSTRACT

An extension for use with a planter, drill, or other farming implement having a seed tube that deposits seed in a furrow. The extension defines protrusions for attaching one or more liquid distribution apparatuses arranged to distribute liquid in a furrow well above the seeds, on the seeds, or both.

15 Claims, 64 Drawing Sheets

U.S. PATENT DOCUMENTS

| | | |
|---|---|---|
| 2,096,230 A | 10/1937 | Elliott |
| 2,533,374 A | 12/1950 | Hyland |
| 2,554,205 A | 6/1951 | Oehler |
| 2,849,969 A | 9/1958 | Taylor |
| 2,872,883 A | 2/1959 | Padrick |
| 3,182,345 A | 5/1965 | Smith |
| 3,336,885 A | 8/1967 | Lebow |
| 4,108,089 A | 8/1978 | van der Lely |
| 4,148,267 A | 4/1979 | Bennett et al. |
| 4,253,412 A | 3/1981 | Hogenson |
| 4,276,836 A | 7/1981 | Pust |
| 4,373,455 A | 2/1983 | Friggstad |
| 4,420,516 A | 12/1983 | Emert et al. |
| 4,445,445 A | 5/1984 | Sterrett |
| 4,446,801 A | 5/1984 | Machnee et al. |
| 4,542,705 A | 9/1985 | Orth |
| 4,565,141 A | 1/1986 | Kopecky |
| 4,580,507 A | 4/1986 | Dreyer et al. |
| D285,205 S | 8/1986 | Johnson |
| 4,607,581 A | 8/1986 | Kopecky |
| 4,628,841 A | 12/1986 | Powilleit |
| 4,671,193 A | 6/1987 | States |
| 4,674,419 A | 6/1987 | Kopecky |
| 4,779,674 A | 10/1988 | McNulty |
| 4,911,090 A | 3/1990 | Schimke |
| 5,092,255 A | 3/1992 | Long et al. |
| 5,375,542 A | 12/1994 | Schaffert |
| 5,425,318 A | 6/1995 | Keeton |
| 5,640,915 A | 6/1997 | Schaffert |
| 5,673,638 A | 10/1997 | Keeton |
| 5,730,074 A | 3/1998 | Peter |
| 5,852,982 A | 12/1998 | Peter |
| 5,918,557 A | 7/1999 | Schaffert |
| 5,996,514 A | 12/1999 | Arriola et al. |
| 6,082,274 A | 7/2000 | Peter |
| 6,082,275 A | 7/2000 | Schaffert |
| 6,119,608 A | 9/2000 | Peterson et al. |
| 6,209,466 B1 | 4/2001 | Wodrich |
| 6,220,191 B1 | 4/2001 | Peter |
| 6,283,050 B1 | 9/2001 | Schaffert |
| 6,453,832 B1 | 9/2002 | Schaffert |
| 6,530,334 B1 | 3/2003 | Hagney |
| 6,763,773 B1 | 7/2004 | Schaffert |

FOREIGN PATENT DOCUMENTS

| | | |
|---|---|---|
| DE | 3321490 | 12/1984 |
| DE | 3441610 | 5/1986 |

OTHER PUBLICATIONS

BROCHURE, "Tube Alignment Brackets", M & J Cotton Farms, Inc, date unknown.

Finck, Charlene; "Put Seed in its Place", Farm Journal, pp. 16-17, Jan. 1995.

"Seed to Soil Inforcer", Seed Flap, Spring 1995.

"Keeton Seed Firmer", Precision Planting, http://precision_planting.com/html/keeton.html, web page printed on Dec. 30, 2000.

BROCHURE, Keeton Seed Firmer, Precision Planting (copy of Brochure), Date of publication of brochure is unknown.

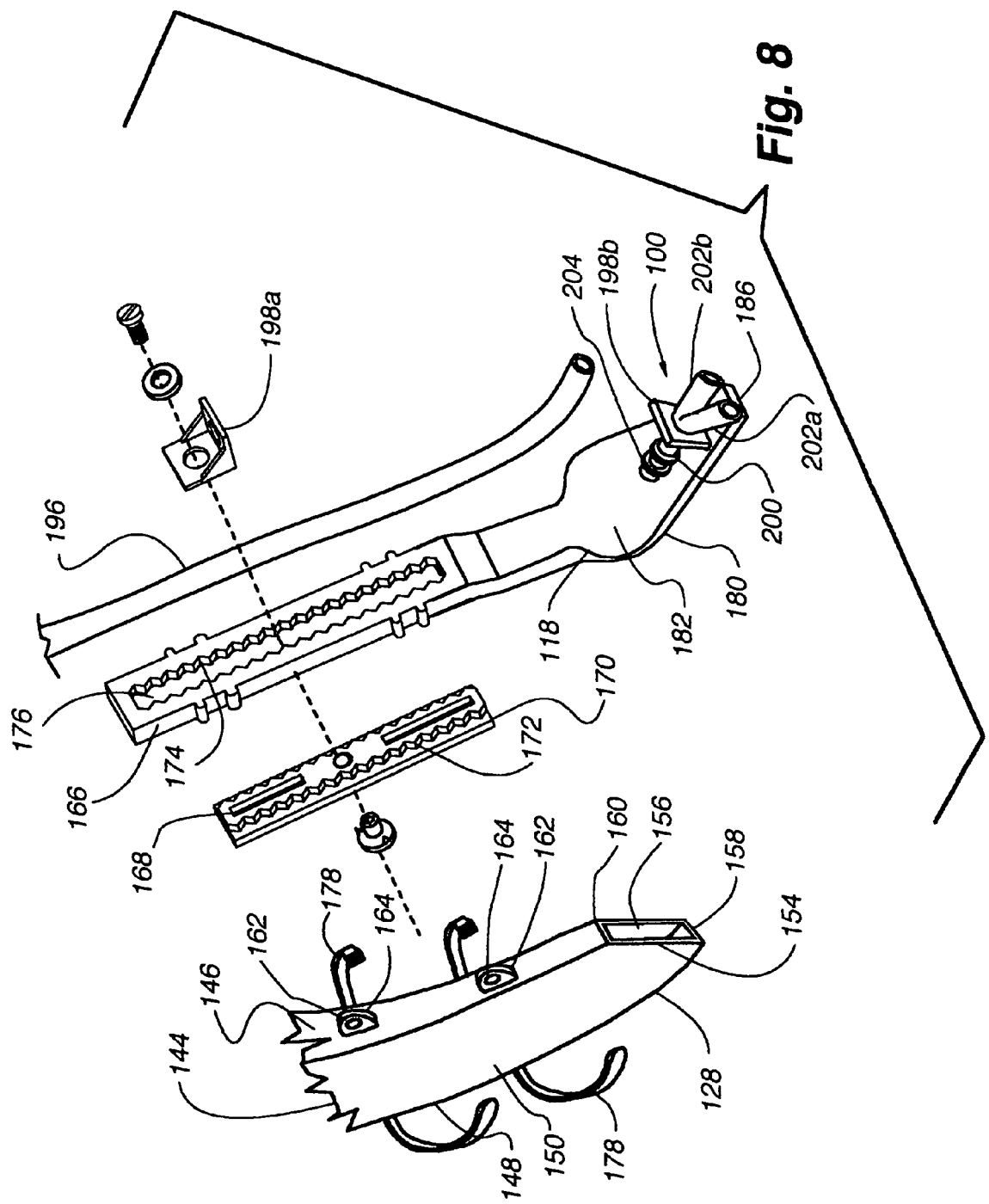

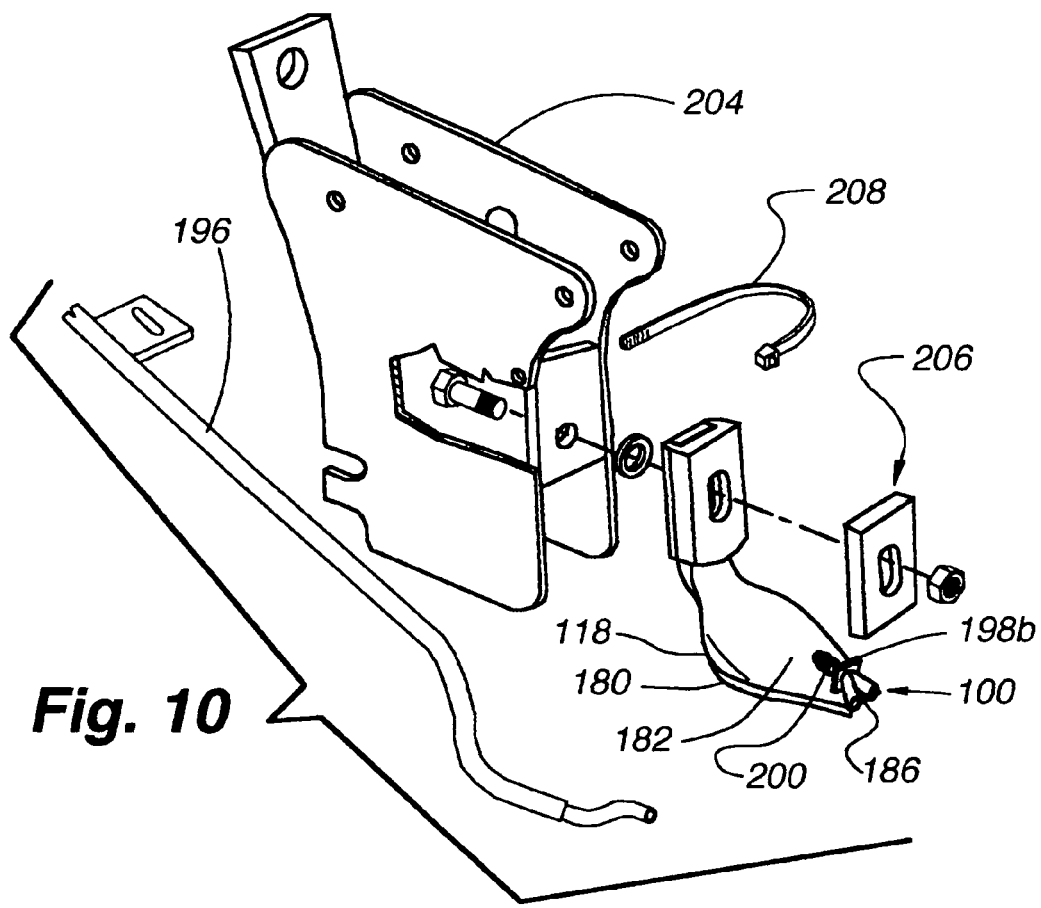
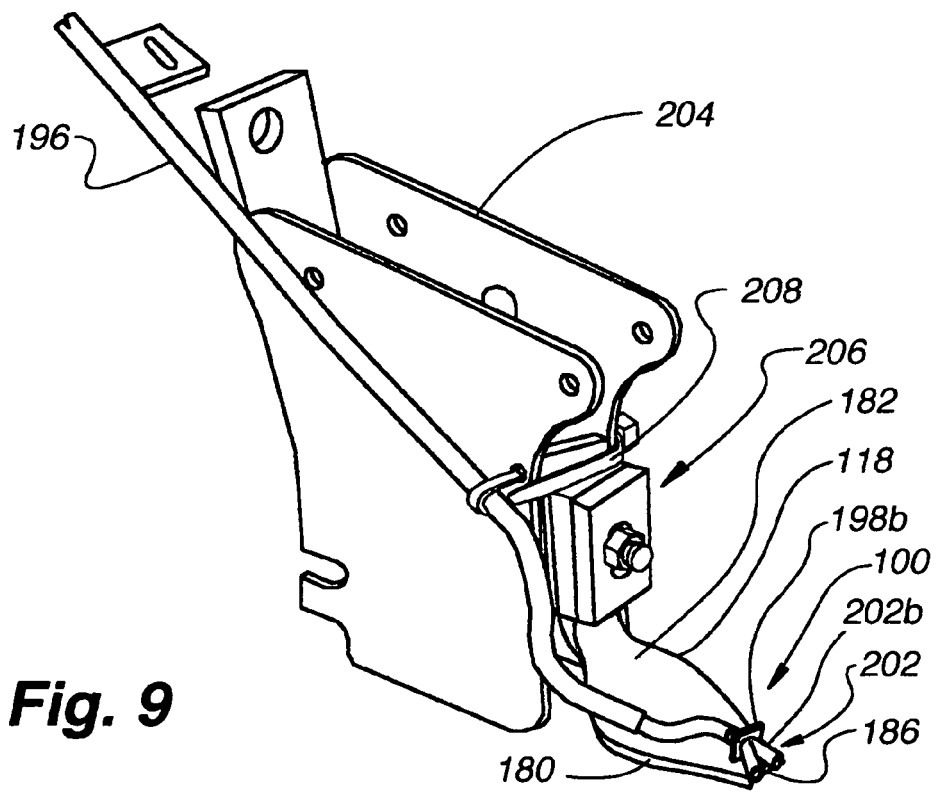

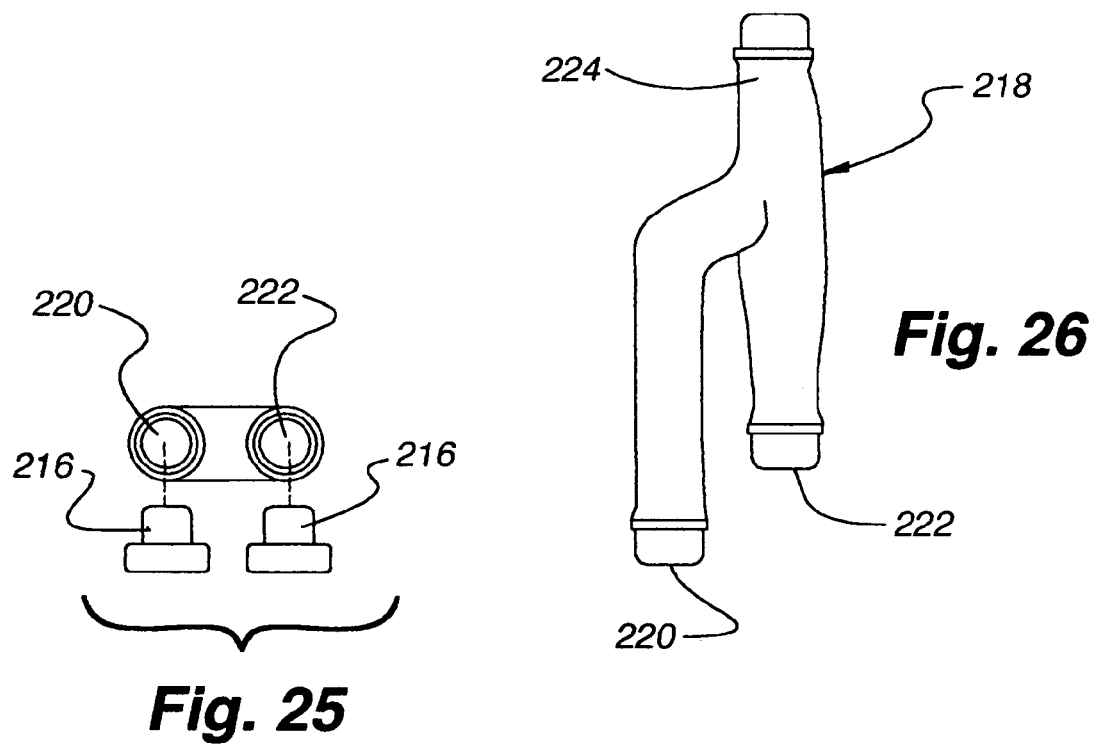
*Fig. 26*
*Fig. 25*
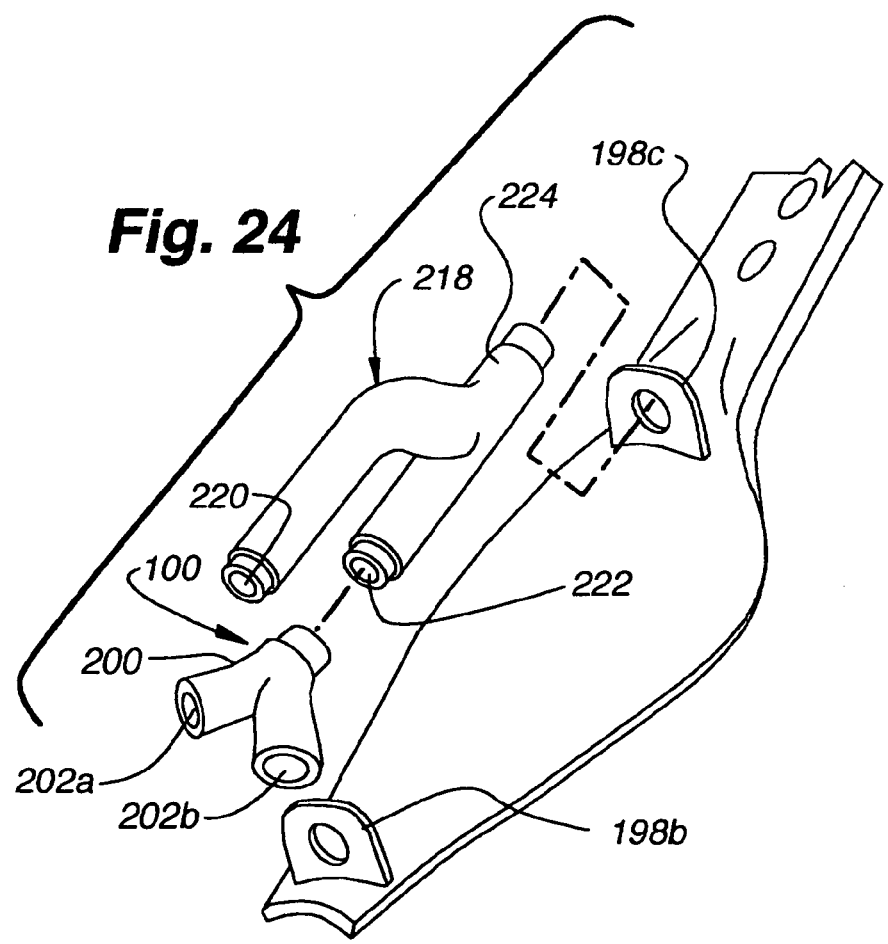
*Fig. 24*

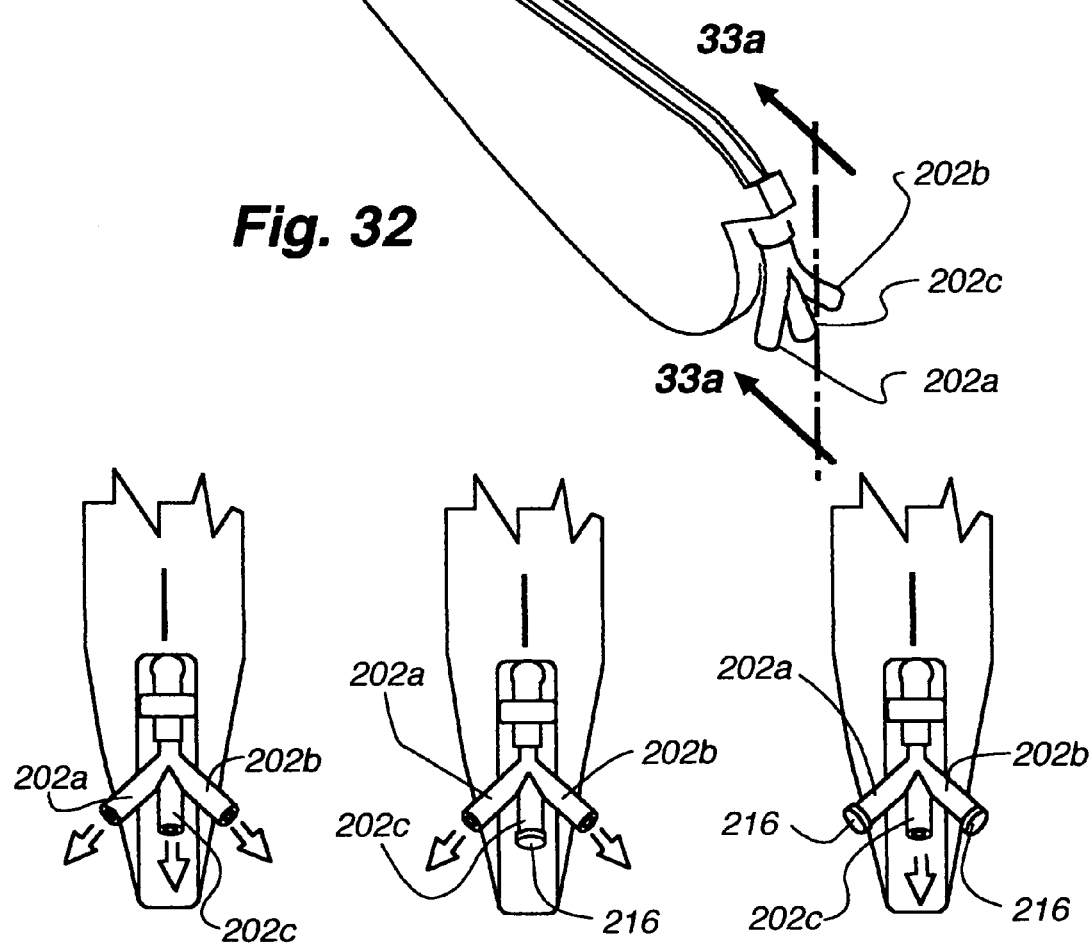
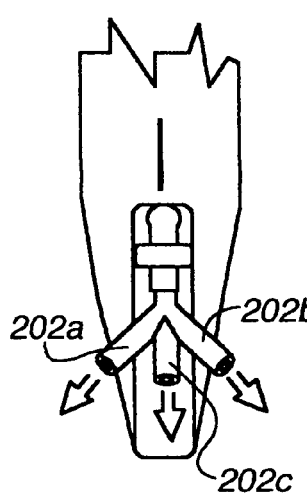
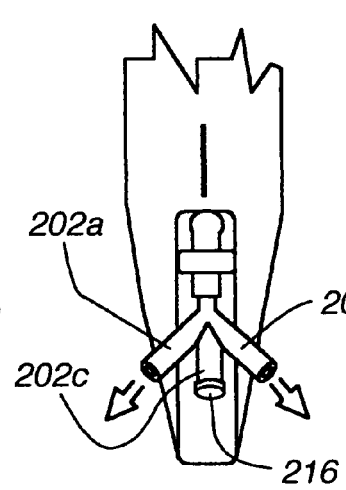
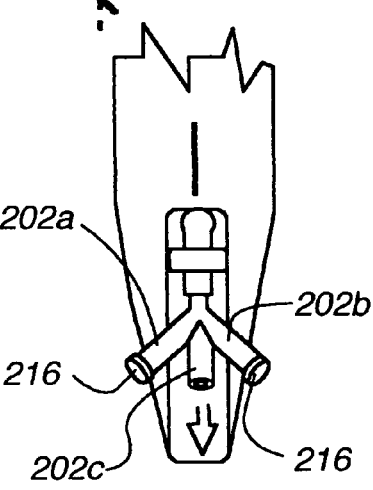
Fig. 34
Fig. 32
Fig. 33a        Fig. 33b        Fig. 33c

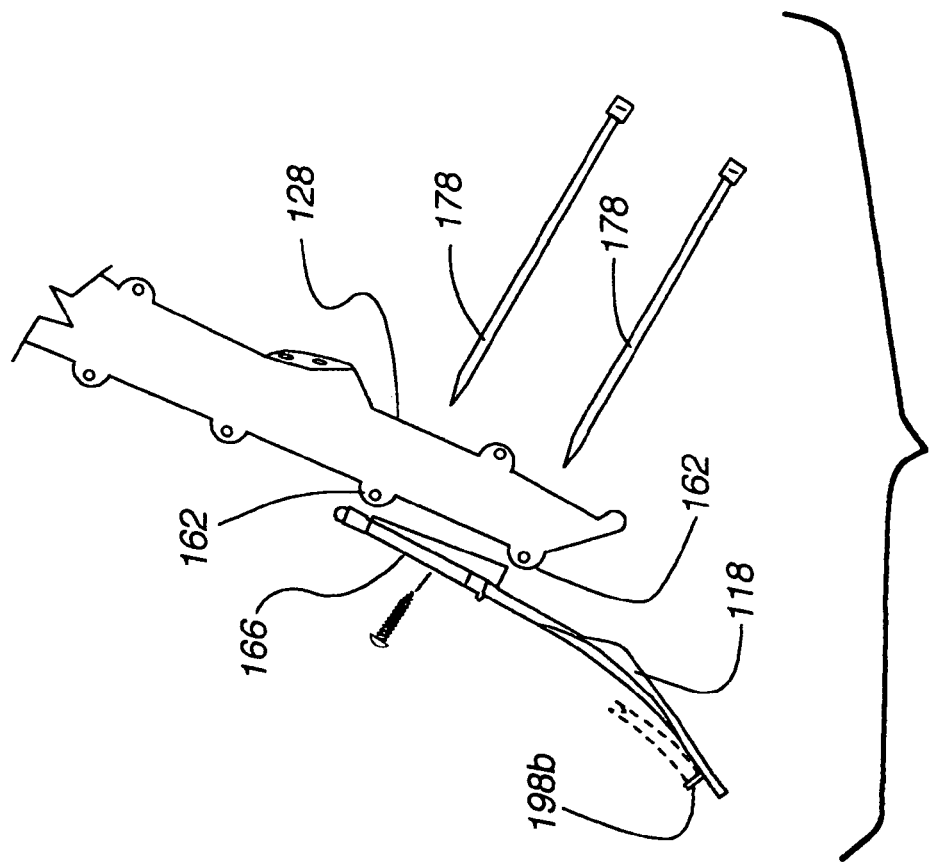
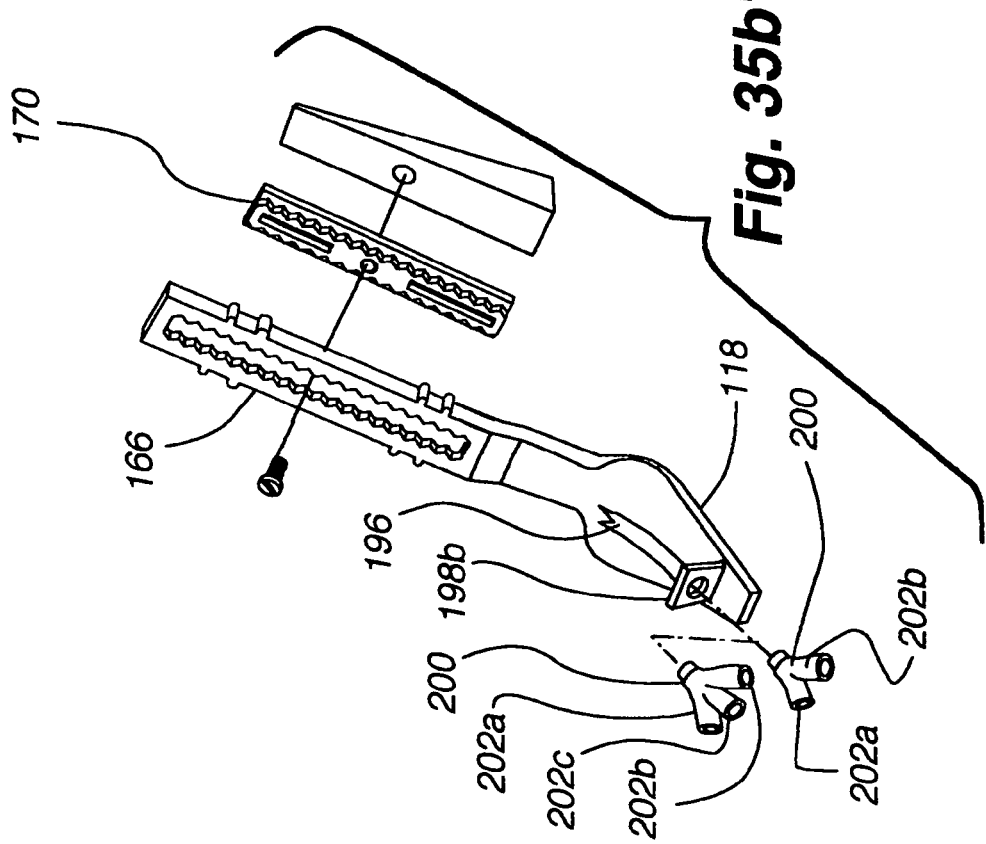
Fig. 35b
Fig. 35b'

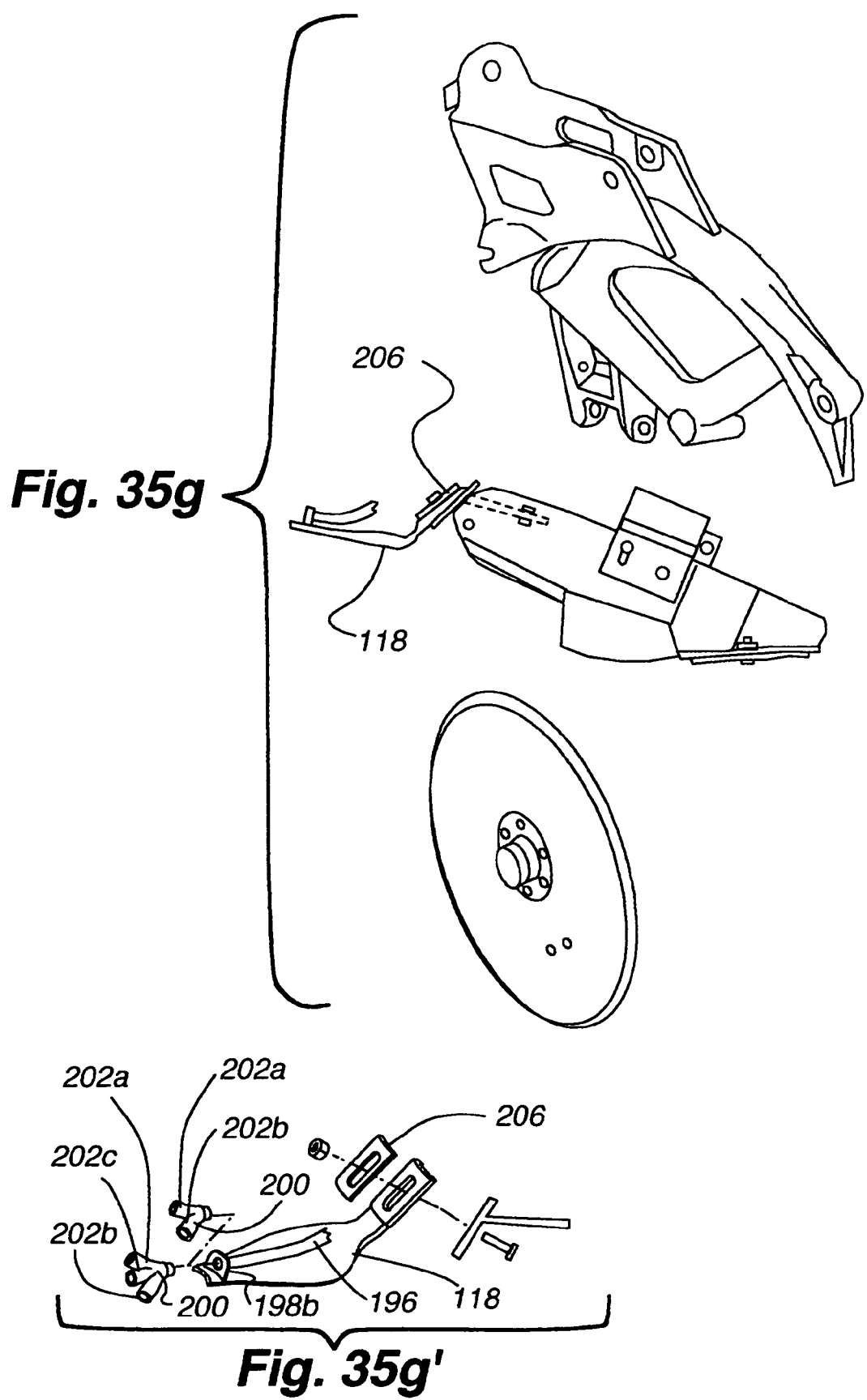

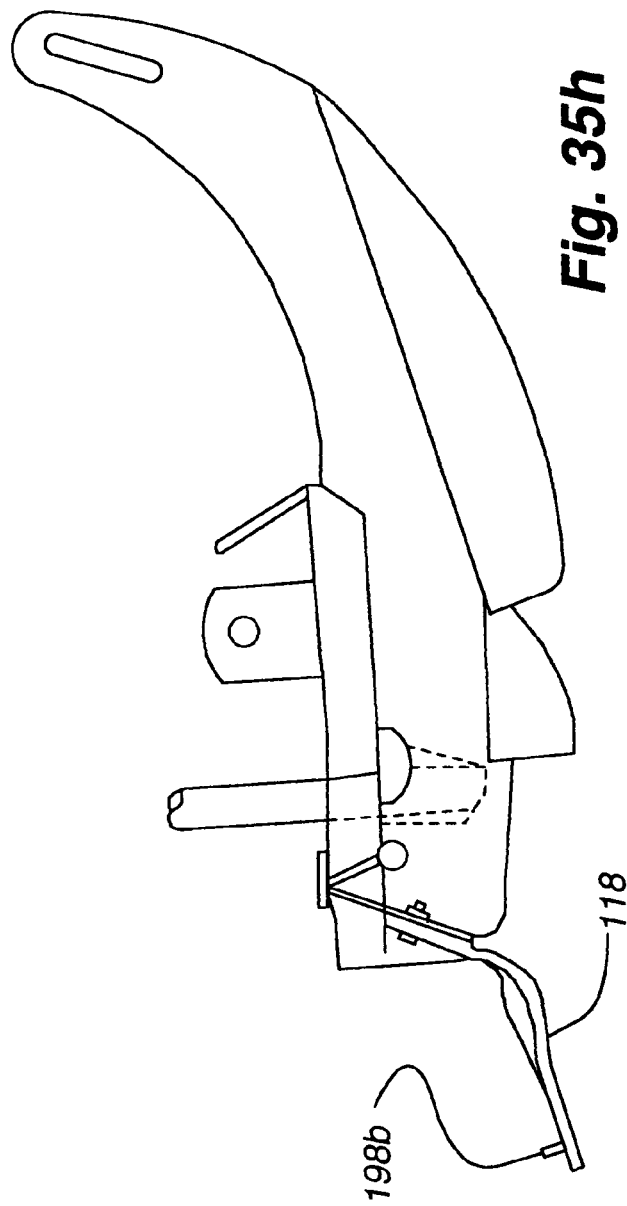
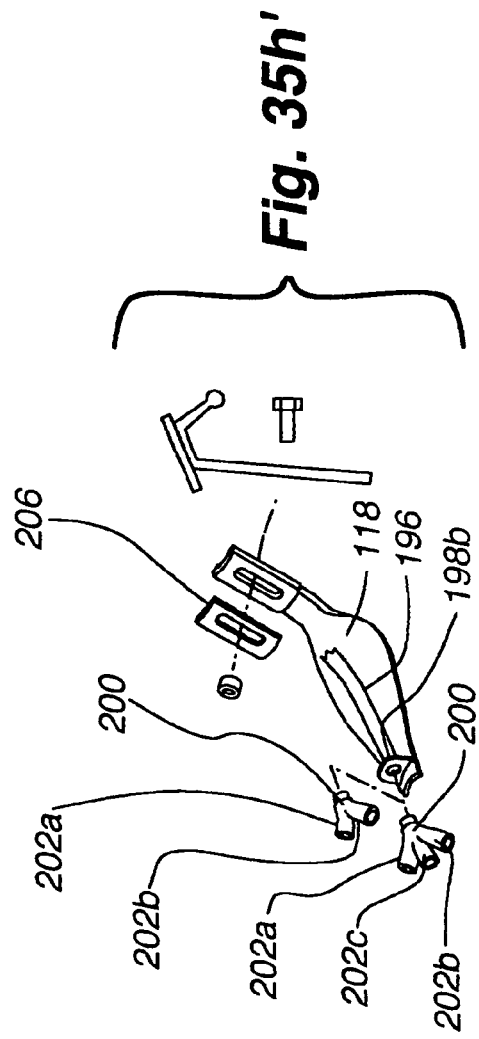
Fig. 35h
Fig. 35h'

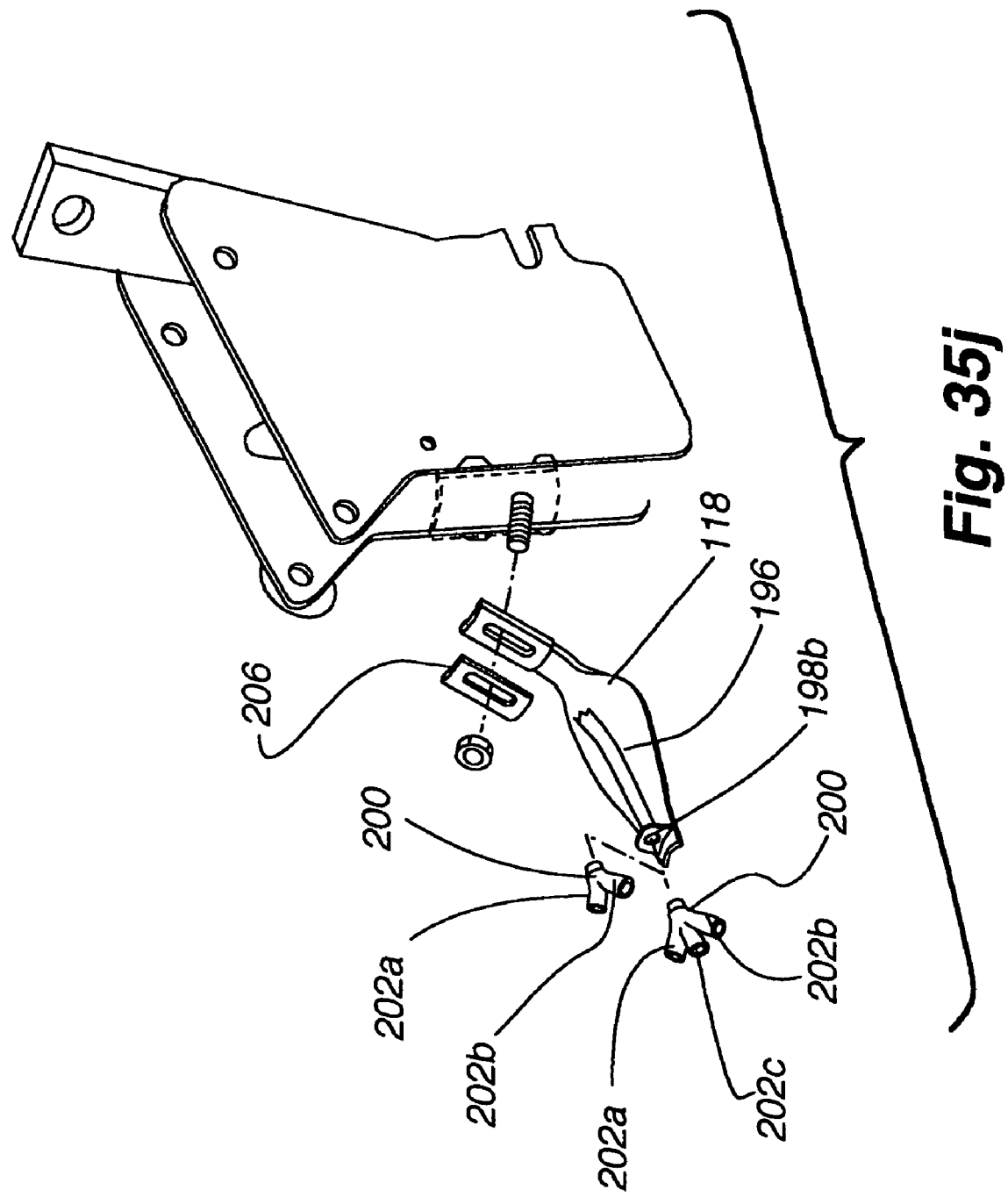

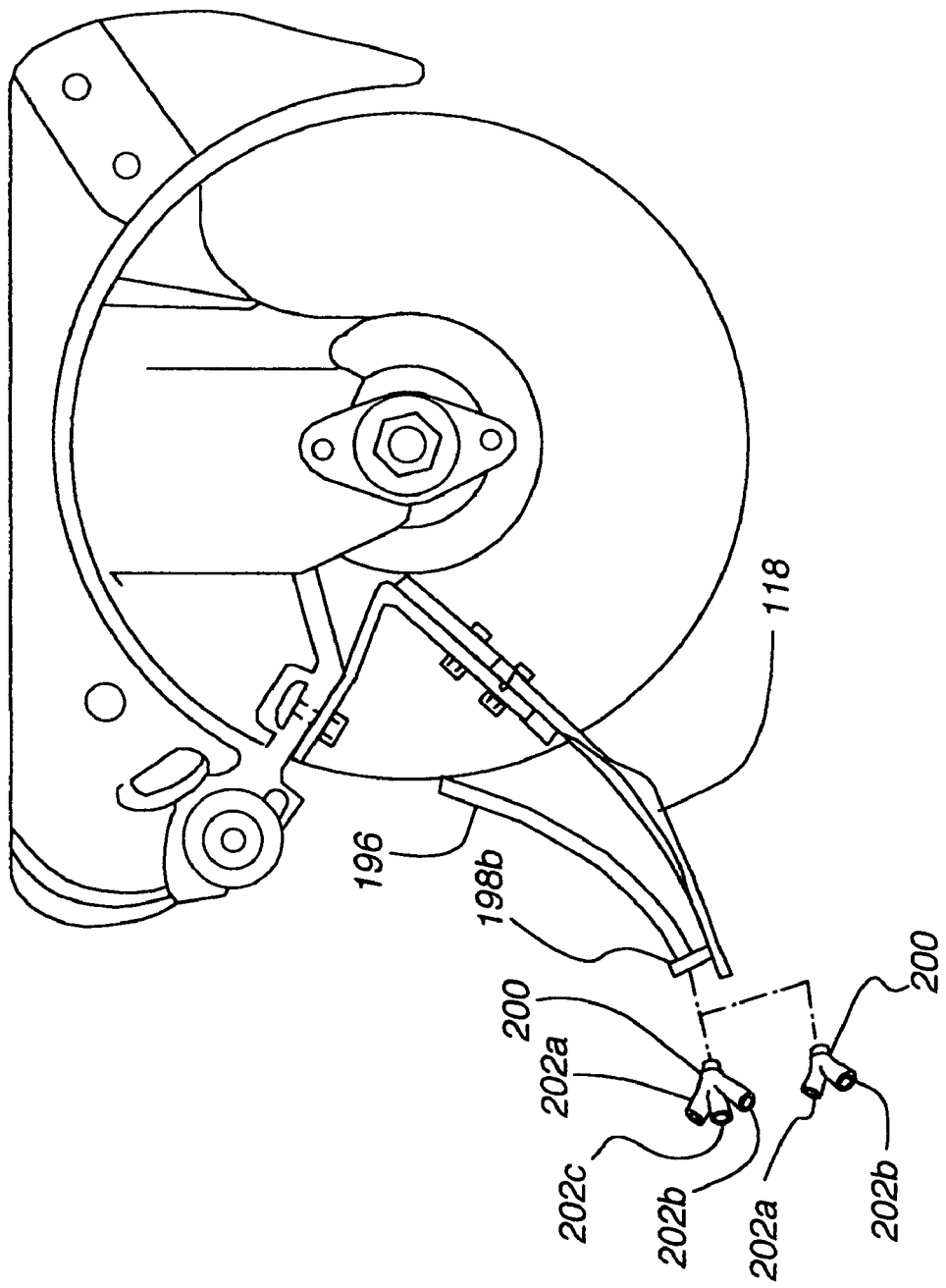

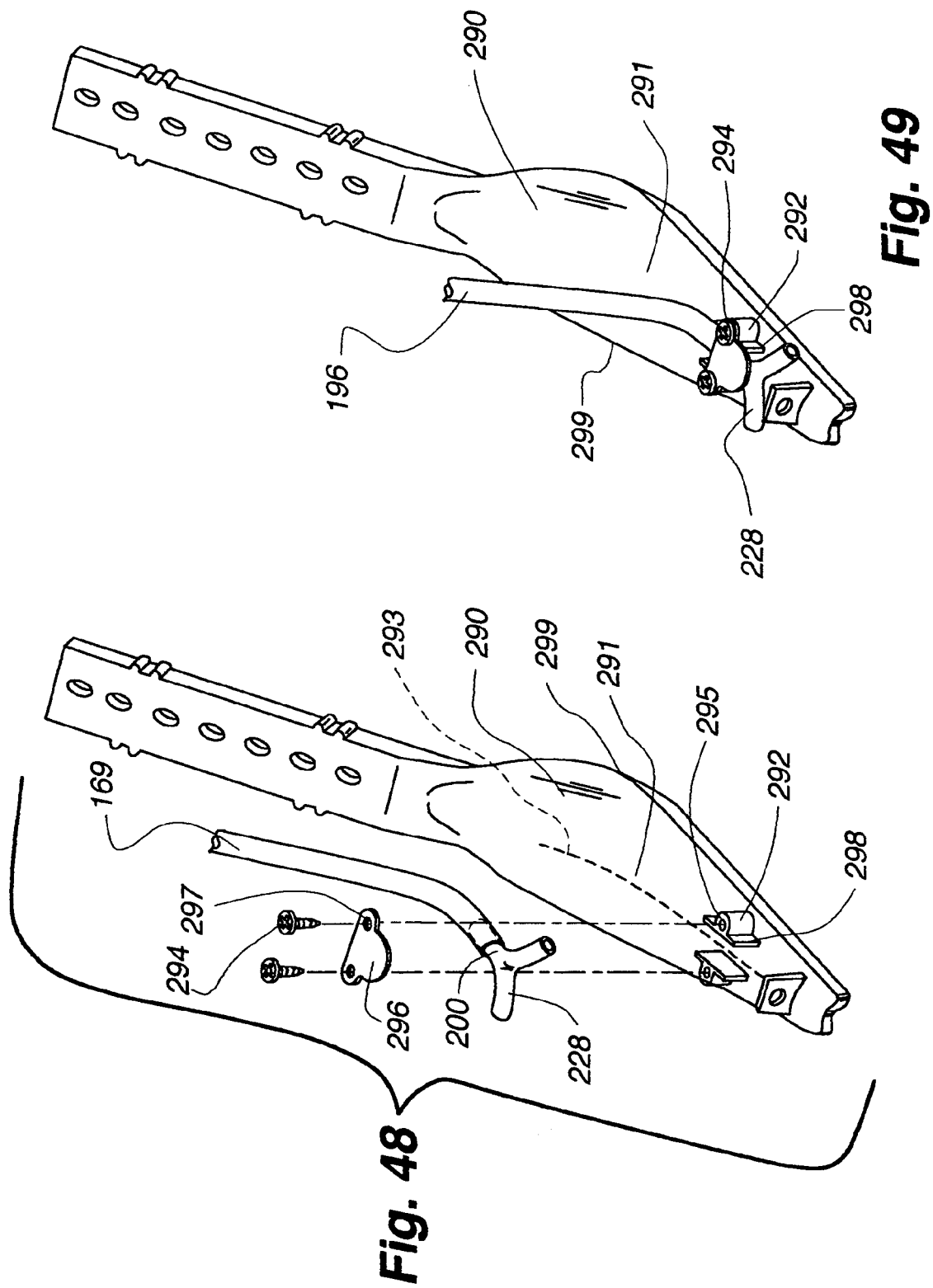

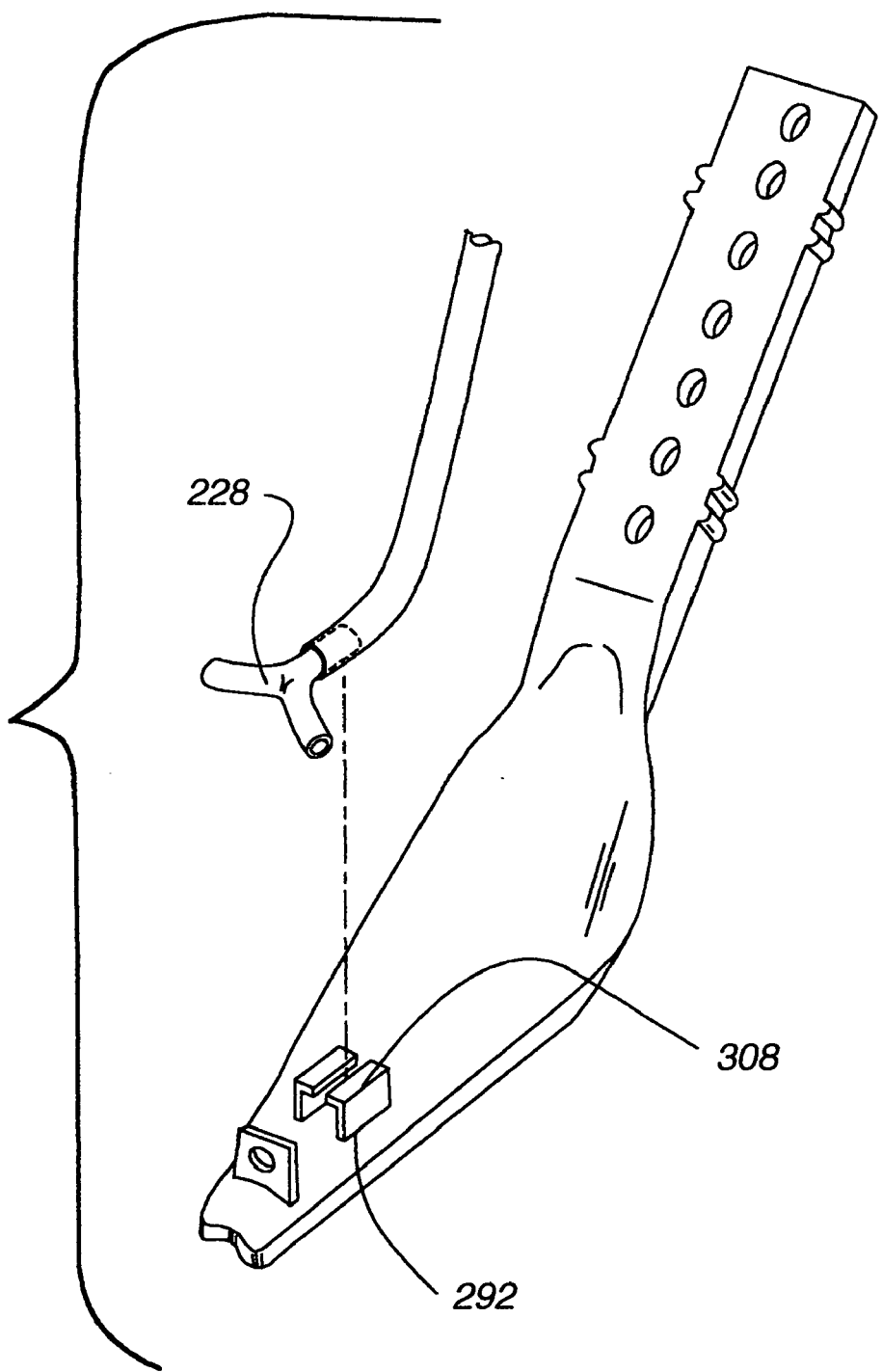

LIQUID DISTRIBUTION APPARATUS FOR DISTRIBUTING LIQUID INTO A SEED FURROW

CROSS REFERENCES TO RELATED APPLICATIONS

This application is a continuation-in-part of application Ser. No. 10/228,688 entitled "Liquid Distribution Apparatus for Distributing Liquid into a Seed Furrow" filed Aug. 26, 2002 now U.S. Pat. No. 6,763,773, which is a continuation-in-part of Ser. No. 09/832,740 entitled "Liquid Distribution Apparatus for Distributing Liquid Into a Seed Furrow" filed Apr. 9, 2001, now U.S. Pat. No. 6,453,832 B1, which is a non-provisional application claiming priority to provisional application 60/195,942 filed Apr. 10, 200, and which is a continuation-in-part of application Ser. No. 09/563,106 entitled "Extension for Reducing Seed Bounce and Associated Hose Attachment" filed May 2, 2000, now U.S. Pat. No. 6,283,050 B1, which is a continuation of application Ser. No. 08/881,177 entitled "Extension for Reducing Seed Bounce and Associated Attachment Brackets" filed Jun. 23, 1997, now U.S. Pat. No. 6,082,275, which is a continuation-in-part of application Ser. No. 08/550,088 entitled "Extension for Reducing Seed Bounce" filed Oct. 30, 1995, now U.S. Pat. No. 5,640,915. The contents of these applications are hereby incorporated by reference in their entirety.

FIELD OF THE INVENTION

The invention relates to agricultural seed planters and drills, and more particularly to seed planters and drills that include apparatus adapted to properly place seeds in a seed furrow and further include liquid distribution apparatus for distributing liquids within the seed furrow.

BACKGROUND OF THE INVENTION

Agricultural seed planting is typically accomplished by multi-row planters and drills. Each planter and drill comprise a plurality of row units adapted for opening a seed furrow, depositing seeds within the furrow, and closing the seed furrow around the seeds.

The placement of the seeds in the furrow greatly effects the growth characteristics of the plants. The seeds are deposited in the seed furrow through a seed tube attached to the row unit. The seed tube is designed to deposit the seeds in the bottom of the furrow. However, as the seeds descend through the seed tube, they are prone to bouncing, which ultimately affects where the seeds lie in the furrow. In addition, the seeds may bounce off the soil when they land in the furrow, which also affects where the seeds lie in the furrow. To properly place the seeds in the bottom of the furrow an extension may be fixed to the seed tube to properly direct the seeds into the vertex of the furrow.

In addition to properly placing the seeds in the vertex of the furrow, it is oftentimes also desirable to provide various liquids in the furrow along with the seeds to facilitate plant growth and the ultimate crop yield. The liquids included in the furrow may be liquid fertilizers, liquid insecticides, liquid starters, inoculants, and water. However, problems can arise when providing liquid directly into the furrow along with the seeds. Drenching the seed in fertilizer may result in burning the seed which has a negative impact on plant growth and the ultimate crop yield. Accordingly, it is desirable to place liquids in the furrow along with the seeds without drenching seeds. In some instances, it is desirable to place liquid in the furrow well above the seeds to further avoid the risk that the liquid will come in contact with the seeds. Distributing a liquid higher on the seed V walls also allows a higher concentration of fertilizer, insecticide, or other liquid to be distributed in the furrow without negatively impacting seed growth.

Numerous benefits are derived from in-furrow liquid distribution, such as maximizing the effectiveness of the liquid introduced into the furrow, in some situations reducing the volume of a particular liquid required to achieve a desired effect in other situations increasing the volume or concentration of a liquid to achieve a desired effect, and minimizing the time required for a particular liquid to effect the seed.

Liquid fertilizer placement disks may be added to the planter row units for placing liquid in a separate trench next to the seed furrow. The liquid fertilizer placement disks create a trench about 2 inches to the side of the seed furrow and about two inches deep and deposit liquid into the trench, which is commonly referred to as 2×2 fertilizer application. The liquid fertilizer disks, however, are very expensive, require large amounts of fertilizer because of the remote location from the seeds, and do not provide for in-furrow distribution of liquid.

Referring to FIGS. 1A–1E, an in-furrow liquid dispensing device is illustrated, the device connected with a KEETON SEED FIRMER™. The seed firmer is adapted to press seeds into the seed furrow as shown in FIG. 1A. The device includes a diverter, which is shown in FIG. 1D and shown in section in FIG. 1F, plugged into a hose running along the length of the seed firmer. The diverter defines a first liquid diversion channel and a second liquid diversion channel for diverting liquid adjacent the seeds embedded in the furrow by the seed firmer as shown in FIG. 1B. Referring to FIGS 1F–1G, a liquid dispensing device as illustrated in U.S. Pat. No. 6,082,274 to Jeffrey Peter is shown connected with a Keeton Seed Firmer.

There are several potential disadvantages and problems with the liquid dispensing devices illustrated in FIGS 1A–1G. One potential problem is that these liquid dispensing devices have small diameter openings for the liquids to pass through. For example, the liquid diversion channels of the diverter are about $1/16"$ diameter outlets. Heavier fertilizers in some instances do not flow evenly from these small diameter outlets. Additionally, when used with heavy materials such as fertilizer that require a larger opening to pass through, these devices may plug-up and stop the flow of material. When plugging occurs, inadequate amounts of product will be placed in the furrow by the plugged lines.

Another problem is that to avoid plugging, the liquid must be diluted with water. For heavy liquid fertilizers, it has been found that the liquid dispensing device in some instances functions most efficiently if the liquid fertilizer is diluted so that the fertilizer flows evenly and without plugging. Diluting the fertilizer, however, causes problems for the application because to obtain the appropriate amount of liquid in the furrow a greater volume of liquid (fertilizer diluted with water) has to be delivered into the furrow through the smaller holes in the delivery system. The greater volume of liquid in the furrow additionally produces wetness in the furrow that can cause the press wheels to build up with mud, which, in turn, leads to closing problems with the press wheels.

Another important consideration is location—just where in the furrow the liquid is placed. The devices illustrated in FIGS. 1A–1G in some instances distribute liquid on the seeds, or oftentimes within $1/4"$ on each side of the seeds in the furrow. Accordingly, the seeds are many times drenched in liquid, or the liquid is within from about 1/8" to about 1/4" of the seed. Besides the unwanted effects caused by drenching the seeds in some liquids, putting any fertilizer in such close proximity to the seed, especially in drier soil, draws the moisture out of the soil around it, pulling it in close to the seed. The concentration of liquid adjacent the seed may cause it to germinate more quickly than it would have under normal conditions, and early growth may be accelerated. If dry soil conditions persist, then the seed may run out of moisture for the tap root and nodule roots to pick up, which may stunt the growth of the emerging crop and in some instances result in the death of the crop.

It is to overcome the problems that arise when seeds are directly immersed in various liquids and the cost and effectiveness of other devices that may be used to introduce liquids into a furrow that the present invention and its various embodiments were developed.

There are some instances, however, when it is preferable to distribute liquids such as fertilizer directly on the seeds in the furrow, as may be achieved with a single outlet hose device. Accordingly, it was recognized that it would be desirable to provide a single device that may distribute liquid in the furrow without drenching the seeds, and have the same device be convertible to also distribute fertilizer directly on the seeds, as needs dictate. This convertible embodiment of the present invention would have the benefit of allowing farmers to quickly reconfigure the device from, for example, a seed drenching configuration to an in-furrow liquid distribution that does not drench the seeds.

It was further recognized that it would be beneficial to be able to reconfigure the device from a single outlet configuration to a two outlet configuration, or vice versa, at the liquid supply tank or at the extension. If reconfigured at the extension, such reconfiguration should be consistently achieved. Furthermore, when the liquid distribution device is being used, the risk that it is inadvertently dislodged by debris in the furrow, the jostling of the tractor, and the like, or misoriented during installation or reconfiguration should be lessened to the extent possible so that liquids are not deposited in unintended portions of the furrow. It was also recognized that it would be desirable to be able to distribute one type of liquid directly on the seed while distributing a second liquid adjacent the seeds.

SUMMARY OF THE INVENTION

One aspect of the present invention involves an extension and liquid distribution apparatus that may be used with a planter, drill or other farm implement. Particularly, the extension may be used with a planter for properly placing seeds in a furrow. The planter includes a liquid supply hose for use in distributing liquid into the seed furrow. The seed furrow typically has a centrally located bottom portion and a first sidewall and a second sidewall, the sidewalls extending upwardly and outwardly from the centrally located bottom portion of the furrow. The extension comprises an elongate flexible body member defining a generally arcuate shape which provides a generally downwardly and rearwardly sweeping orientation, and also defining an upper segment and a lower segment. The upper segment may be attached to the planter.

The lower segment is configured to depend downwardly and rearwardly from the planter and extend into the furrow. A first and second protrusions extend upwardly from the upper surface of the lower segment, and are adapted to support a liquid distribution apparatus therebetween.

Embodiments of the present invention may be used to distribute liquid well above the seeds in the vertex of the furrow and may be used to distribute liquid directly on the seeds in the vertex of the furrow depending on the liquid being applied. Embodiments of the present invention may also be readily converted from a configuration that deposits liquids directly on the seeds in the vertex of the furrow to a configuration that deposits liquid well above the seeds along the sidewalls of the furrow, or vice versa. Embodiments of the present invention may also be configured to distribute more than one type of liquid into the furrow. Embodiments of the present invention may also direct seeds into the vertex of the furrow.

The foregoing and other features, utilities and advantages of the invention will be apparent from the following more particular description of various embodiments of the present invention as illustrated in the accompanying drawings.

BRIEF DESCRIPTION OF THE DRAWINGS

FIG. 8 is an exploded view showing a seed tube, one embodiment of the extension for reducing seed bounce, a liquid supply hose and the liquid distribution apparatus of the present invention, with a mounting apparatus for mounting the extension to the seed tube;

FIG. 9 is a perspective view of a Case/IH model planter with one embodiment of the liquid distribution apparatus;

FIG. 10 is an exploded view of the Case/IH model planter shown in FIG. 9;

FIG. 24 is perspective view of an alternative embodiment of a diverter for use, in one example, in conjunction with the two outlet embodiment of the liquid distribution apparatus;

FIG. 25 is a front view of the diverter illustrated in FIG. 24;

FIG. 26 is a side view of the diverter illustrated in FIG. 24;

FIG. 32 illustrates a seed firmer having a three outlet embodiment of the present invention connected therewith FIG. 33a is a section view taken along line 33—33 of FIG. 32 illustrating the three outlet embodiment of the present invention with all of the outlets unplugged;

FIG. 33b is a section view taken along line 33—33 of FIG. 32 illustrating the three outlet embodiment of the present invention with the center outlet plugged, the three outlet embodiment configured to distribute liquid on the sidewalls of the furrow;

FIG. 33c is a section view taken along line 33—33 of FIG. 32 illustrating the three outlet embodiment of the present invention with the side outlets plugged, the three outlet embodiment configured to distribute liquid in the vertex of the furrow;

FIG. 34 is a perspective view of one embodiment of a plug for use in plugging the outlets to reconfigure the three outlet embodiment;

FIG. 35b illustrates an exploded perspective view of a Landoll Quadra™ planter with one embodiment of an extension for reducing seed bounce attached thereto, the extension having an embodiment of the liquid distribution apparatus of the present invention coupled therewith;

FIG. 35g illustrates an exploded view of a Case IH™ model 400 or 500 planter having an Acra-Plant boot with one embodiment of an extension for reducing seed bounce attached thereto, the extension having an embodiment of the liquid distribution apparatus of the present invention coupled therewith;

FIG. 35h illustrates an exploded view of a Case IH™ 400 or 500 planter having an Acra-Plant runner with one embodiment of an extension for reducing seed bounce attached thereto, the extension having an embodiment of the liquid distribution apparatus of the present invention coupled therewith;

FIG. 35j illustrates an exploded view of a Case IH™ 1200 ASM planter with an embodiment of the liquid distribution apparatus of the present invention attached thereto;

FIG. 38j illustrates a John Deere™ model 8300 double disc drill having a press wheel not attached to the drill, with an embodiment of the liquid distribution apparatus of the present invention attached therewith;

FIG. 48 is an exploded isometric view of an embodiment of an extension having protrusions for attaching a liquid distribution apparatus to the extension by way of a retaining plate and fasteners.

FIG. 49 is an assembled isometric view of the extension of FIG. 48.

FIG. 51 is an exploded isometric view of an embodiment of an extension having protrusions with flanges for securing a liquid distribution apparatus to the extension.

DETAILED DESCRIPTION OF THE PREFERRED EMBODIMENT

While various embodiments of the liquid distribution apparatus can be used with a variety of planters, drills and liquid supply devices, it will be initially described as used with a double disk furrow opener style agricultural planter 102 pulled behind a tractor 104. Furthermore, the liquid distribution apparatus will be described in a configuration wherein a large liquid container 106 is pulled behind the planter 102 providing a liquid supply to the liquid distribution apparatus through a liquid supply hose 196. The liquid container 106, however, is oftentimes integrated with the planter 102 or the tractor 104. Nonetheless, the liquid distribution apparatus functions equally well regardless of the location of the liquid container 106.

Figure 1:
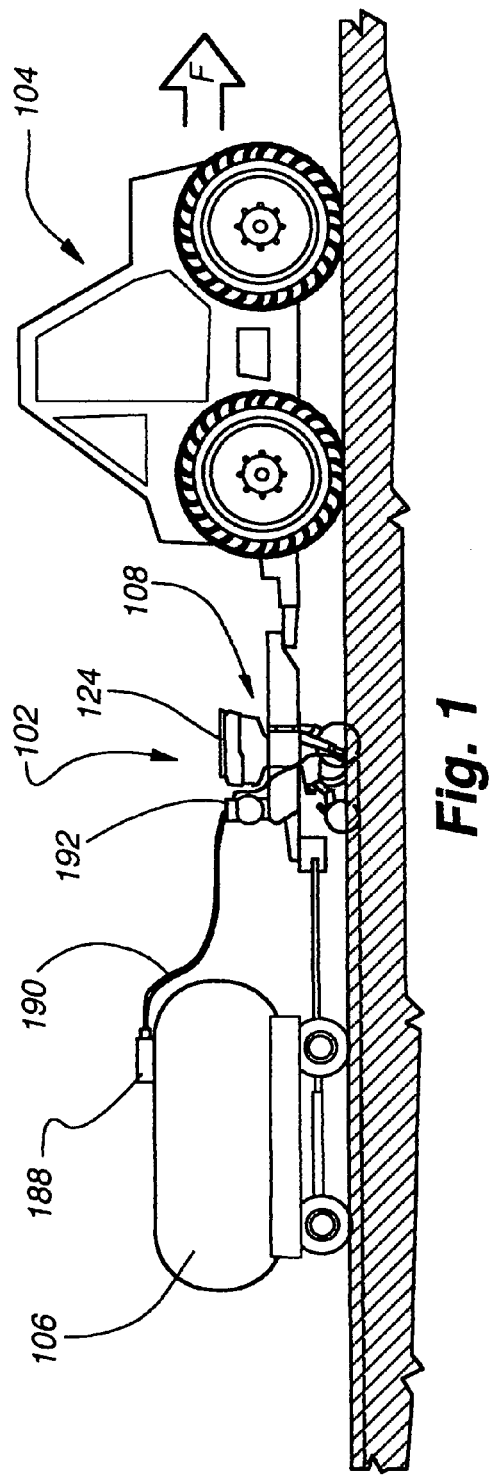
FIG. 1 is a side view of a tractor pulling an agricultural planter and associated liquid container.
Figure 2:
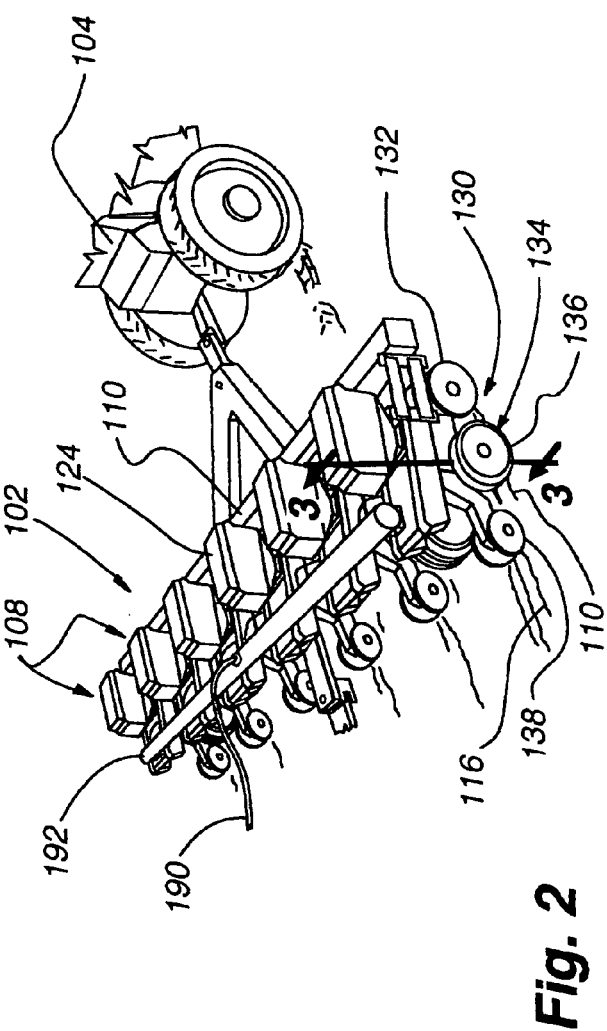
FIG. 2 is a perspective view of a planter encompassing one embodiment of the liquid distribution apparatus of the present invention, and illustrates a tractor pulling an agricultural planter including a plurality of row units.
Figure 1A:
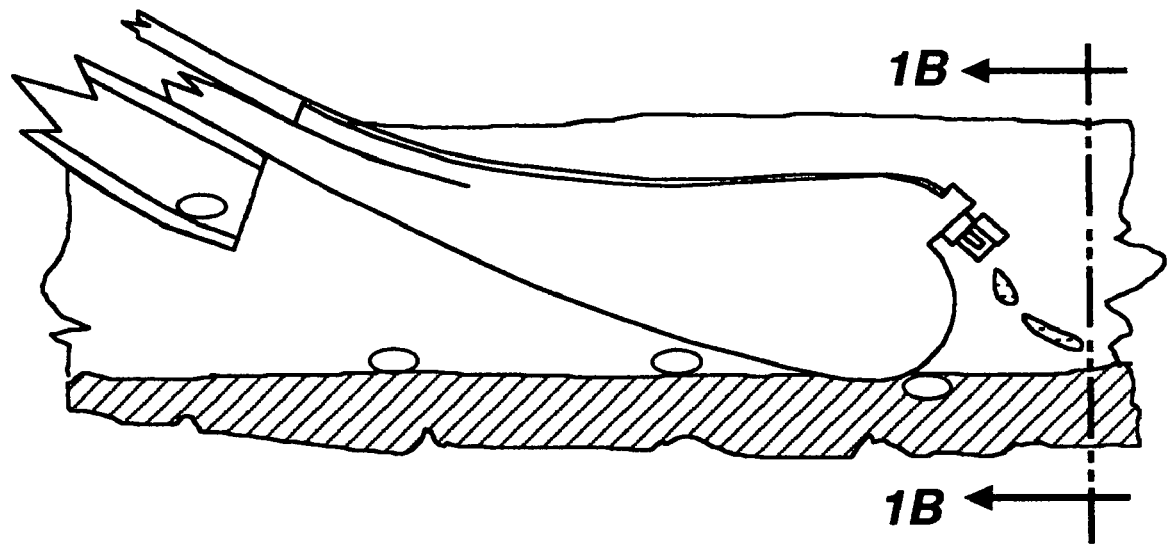
FIG. 1A is side view of a Keeton Seed Firmer™ having an in-furrow liquid dispensing device connected therewith.
Figure 1B:
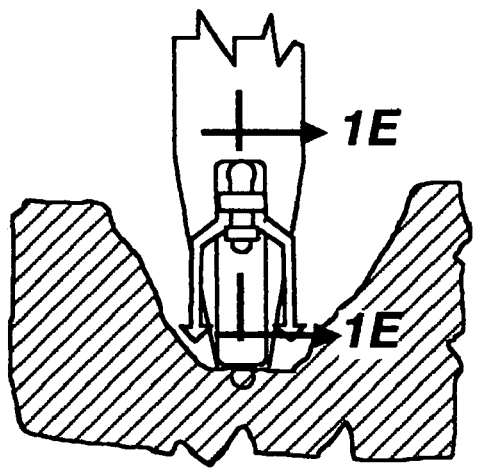
FIG. 1B is a section view taken along line B—B of FIG. 1A.
Figure 1C:
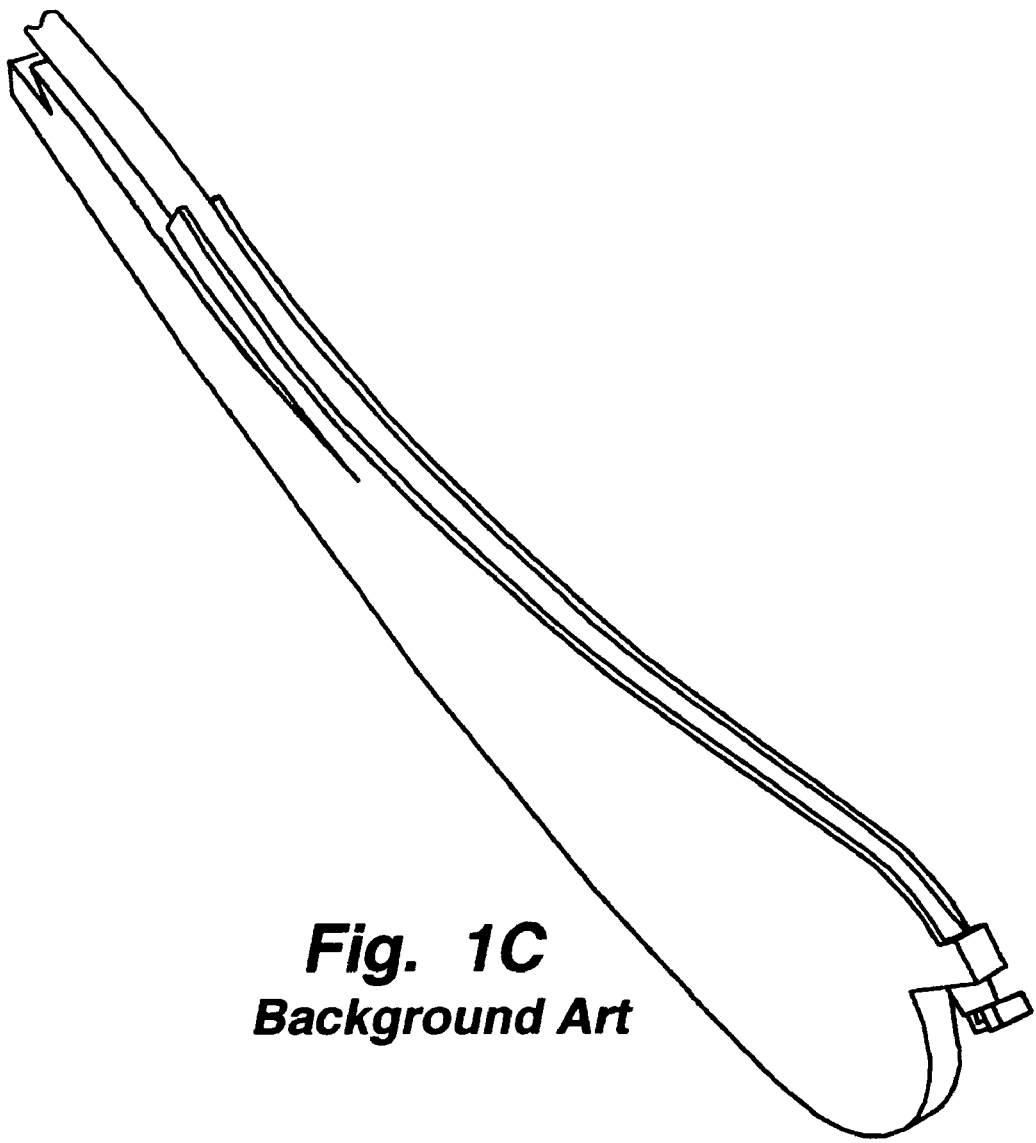
FIG. 1C is a perspective view of the Keeton Seed Firmer™ having an in-furrow liquid dispensing device connected therewith.
Figure 1D:
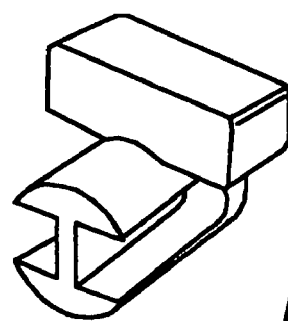
FIG. 1D is a perspective view of a diverter for use with the in-furrow liquid dispensing device of FIGS. 1A and 1C.
Figure 1E:
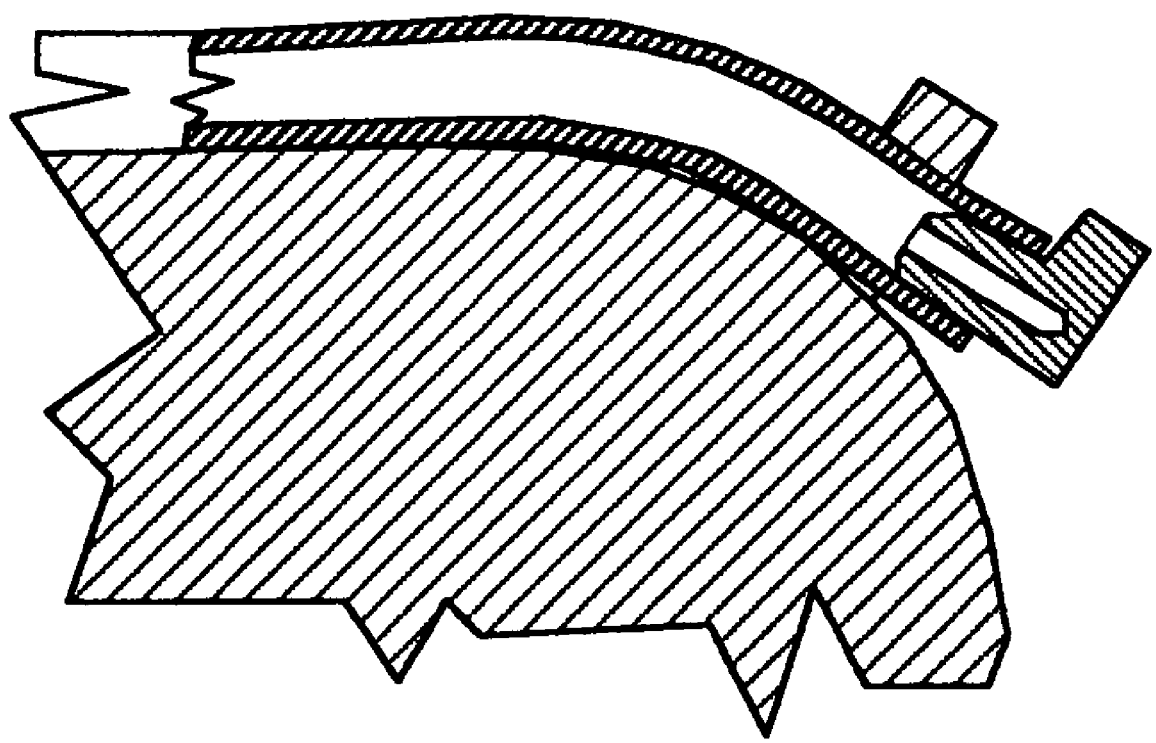
FIG. 1E is a section view taken along line E—E of FIG. 1B.
Figure 1F:
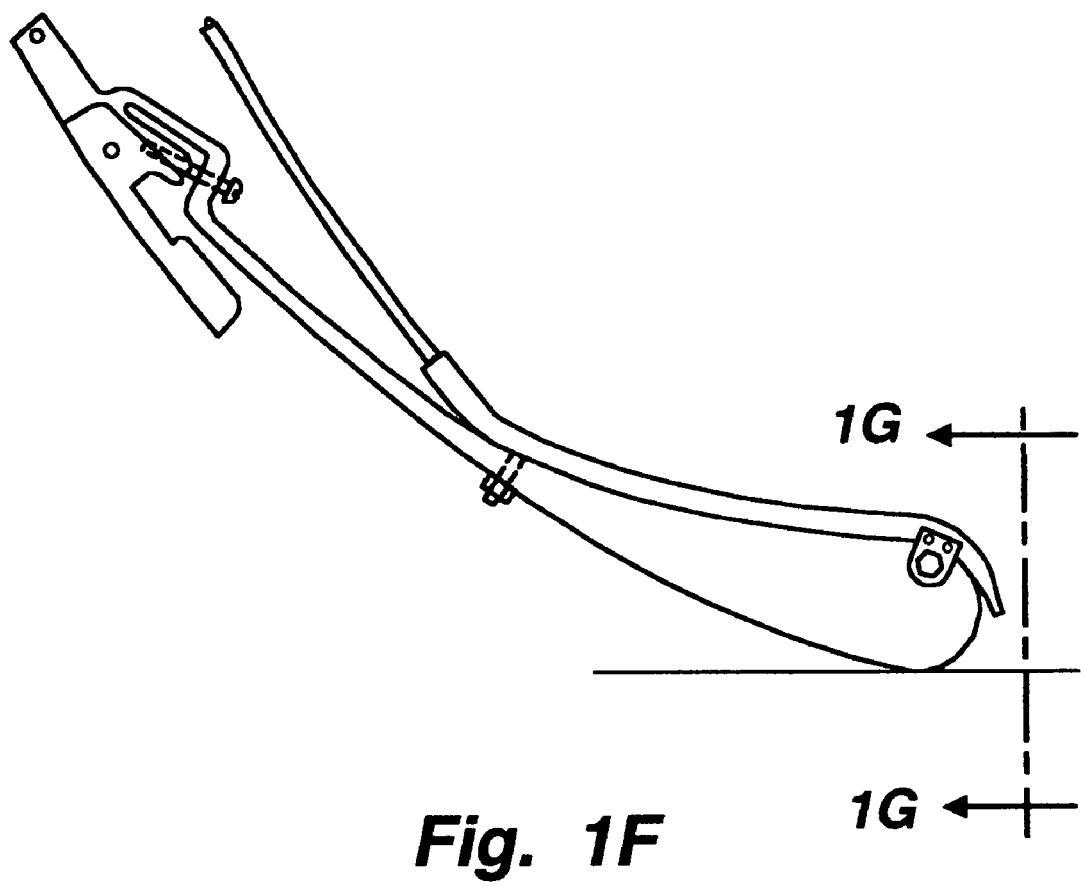
FIG. 1F is a side view of a liquid dispenser for a seed planter as shown in U.S. Pat. No. 6,082,274, the liquid dispenser connected with a Keeton Seed Firmer™.
Figure 1G:
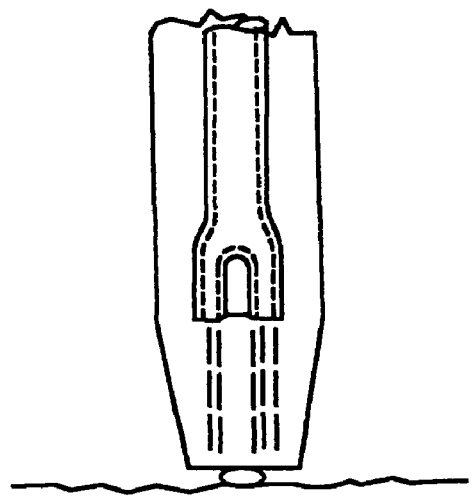
FIG. 1G is a front view of the liquid dispenser illustrated in FIG. 1F.
Figure 3:
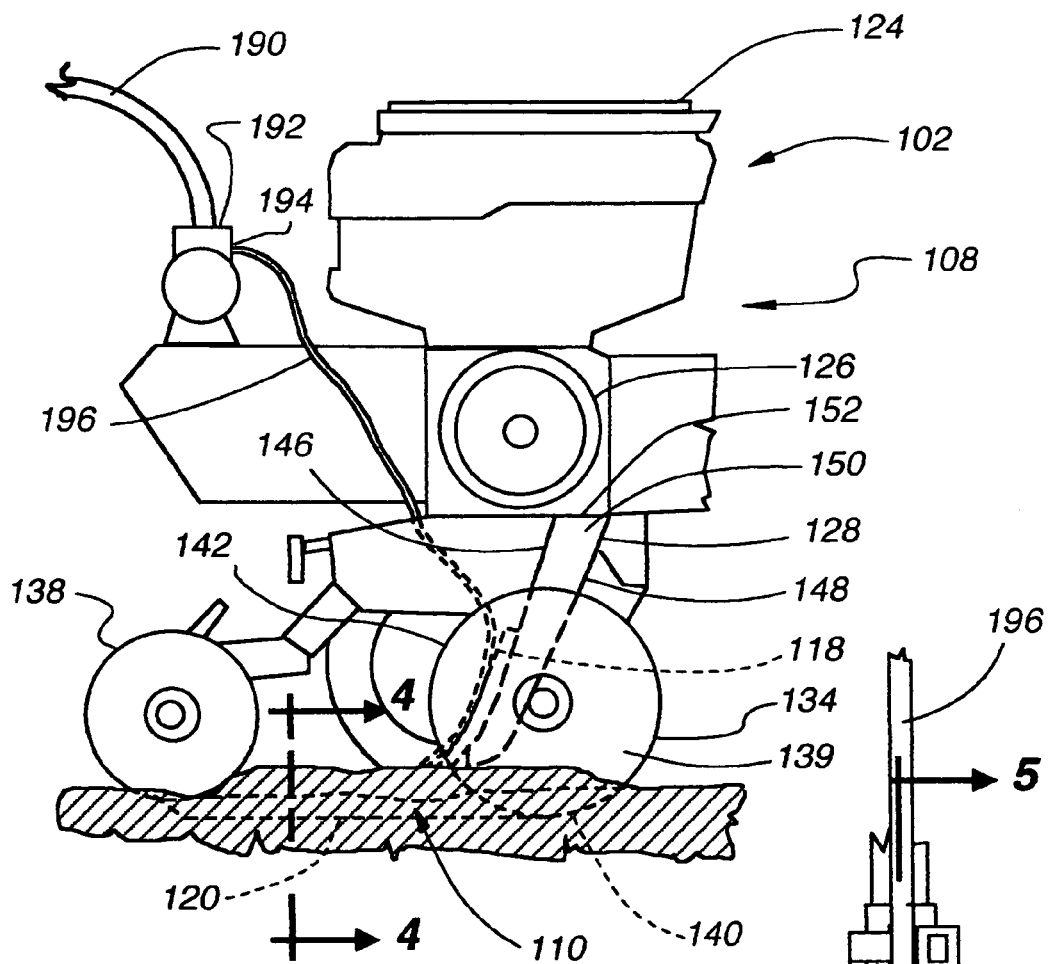
FIG. 3 is section taken along line 3—3 of FIG. 2, and illustrates a row unit having a hopper, a metering unit, a gage wheel, a closing wheel, a double disk blade furrow opener, and a seed tube depending from the metering unit with one embodiment of an extension for reducing seed bounce, with one embodiment of the liquid distribution apparatus depending from the attachment.

The agricultural planter 102, shown in FIGS. 1–3, typically includes a number of planter row units 108 mounted on a main frame member 110. The planter 102 is pulled in a forward direction F by the tractor 104. Each row unit 108 forms a seed furrow 110, deposits seeds 112 evenly along the seed furrow 110, supplies a liquid 114 in the furrow 110, and then closes the seed furrow 110 to form a seed bed 116. The liquid distribution apparatus 100 of the present invention is embodied in a two-outlet Y-shaped configuration 100, shown in FIGS. 4–10, that distributes the liquid 114 into the furrow 110 along with the seeds 112 without drenching the seeds 112. In this embodiment, the liquid distribution apparatus 100 is used along with an extension 118, shown in FIGS. 4–10, which reduces seed bounce as the seeds 112 exit each row unit 108, and helps position the seeds 112 optimally in the vertex or bottom portion 120 of the furrow 110 prior to closure of the furrow 110 by the row unit 108. To avoid drenching the seeds 112 in the liquid 114, the liquid distribution apparatus 100 deposits the liquid 114 on the sidewalls 122 of the furrow 110. Preferably, the liquid is deposited at least ½" above the bottom portion 120 of the furrow 110. More preferably, the liquid is deposited between about ½" and ¾" above the bottom portion 120 of the furrow 110.

Each row unit 108, as seen in FIGS. 1–3, comprises a seed hopper 124 for holding and dispensing seeds 112, a seed metering unit 126 positioned below the seed hopper 124 that receives the seeds 112 from the seed hopper 124, and a seed tube 128 positioned below the seed metering unit 126 that receives seeds 112 from the metering unit 126 to place in the furrow 110. A furrow opening apparatus 130 is positioned generally beneath the seed hopper 124, and includes a residue divider 132 at the leading edge of each row unit 108, and a furrow opener 134 positioned more centrally under the hopper 124. The furrow opener 134 is partially encompassed by a pair of gage wheels 136, and a pair of furrow closer wheels 138 which trail behind the furrow opener 134 and gage wheels 136.

The seed furrow 110 is formed by the furrow opener 134 attached to each row unit 108. Although numerous types of openers are known in the art such as double disc, single disc, shoe, boot, and runner style openers that the present invention may be used with, a double disk furrow opener 134 is shown in FIGS. 1–3. The double disk opener 134 includes two circular disk blades 139 rotatably mounted on a row unit 108 to form a V-shape at the point of seed placement. The disk blades 139 have a diameter, and the peripheral edges 140 of each disk blade 139 are adjacent to one another at the point where they form the V. The gage wheels 136 flank the disk blades 139 to support the row unit 108 and allow the disk blades 139 to mold a V-shaped seed furrow 110 at a predetermined depth within the soil.

Figure 4:
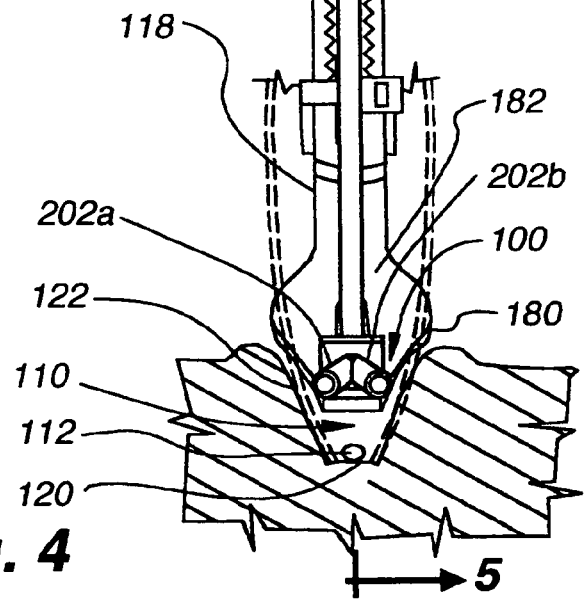
FIG. 4 is a section taken along line 4—4 of FIG. 3, and illustrates the liquid distribution apparatus connected to a liquid supply hose and attached to the extension.

The furrow 110 formed by the furrow opener 134 is generally V-shaped, as shown best in FIG. 4, with the bottom portion 120 forming the vertex where the upwardly and outwardly extending sidewalls 122 intersect. Under ideal soil conditions, the furrow 110 maintains the V-shape until closed by the furrow closer wheels 138. In moist conditions, the soil along the sidewalls 122 is pulled loose, causing portions of the soil to lodge in the bottom portion 120 of the furrow 110 and along the sidewalls 120. Also, as the disk blades 139 wear out, they become smaller in diameter and the adjacent edges 140 of the disk blades 139 become spaced apart. As the disk blades 139 wear down, the increased spacing between the adjacent edges 140 causes the furrow to gradually transform into a W-shape.

The seed tube 128 extends downwardly from the metering unit 126, between the disk blades 139 (or into the boot or shoe), and is positioned directly over the seed furrow 110 adjacent to the rear 142 of the double disk blades 139, as shown in FIG. 3. The metering unit 126 regulates the distribution of seeds 112 from the seed hopper 124 to the seed tube 128. Thus, the seeds 112 are optimally evenly spaced along the seed furrow 110 as they fall from the seed tube 128.

As shown in FIGS. 3, 5, 7 and 8 the seed tube 128 is attached to and extends downwardly from the meter unit 126. The seed tube 128 has an elongated hollow main body 144, with a generally rectangular cross-sectional structure defining a rearwardly facing surface 146, a forwardly facing surface 148, and opposing side facing surfaces 150. The seed tube 128 has a slight arcuate shape along its length in the rearward direction. An upper end 152 of the seed tube 128 is attached to the meter unit 126, while a downwardly depending lower and trailing end 154 of the seed tube 128 depends downwardly between the disk blades 139 so as to be positioned over the bottom portion 120 of the furrow 110. The downwardly depending end 154 defines an opening 156 through which the seeds 112 exit the seed tube 128 and fall into the furrow 110. The lower end 154 of the seed tube 128 is swept rearwardly from the upper end 152 as a result of the slight arcuate shape. The forwardly facing surface 148 of the seed tube 128 is longer than the rearwardly facing 146 surface of the seed tube 128, such that the forwardly facing surface 148 forms a lower edge 158 of the opening 156, while the rearwardly facing surface 146 of the seed tube 128 defines the upper edge 160 of the opening 156.

A pair of protrusions 162 extend from the rearwardly facing surface 146 of the seed tube 128. The protrusions 162 are spaced longitudinally with respect to one another along the length of the seed tube 128. Each protrusion 162 can have an aperture 164 formed laterally therethrough.

The seed tube 128 guides the seeds to the furrow 110, as seen in FIGS. 3–6. As the seeds 112 flow through the seed tube 128, they bounce around as a result of interaction with the walls 122 of the seed tube 128 as well as the movement of the planter 102 over the ground. The rearward curve of the seed tube 128, as well as the orientation of the exit opening 156, are designed to compensate for the forward motion of the planter 102, and ideally the seeds 112 drop into the furrow 110 very gently. However, since the seeds 112 bounce as they move through the seed tube 128, they oftentimes drop out of the seed tube 128 at a less than optimal angle, or the seeds 112 bounce outwardly from the opening 156 of the seed tube 128 prior to hitting the ground, causing the seeds 112 to then bounce upwardly when they hit the ground.

The bouncing of the seeds 112 results in the seeds being disbursed throughout the furrow 110, not only along the bottom portion 120, but along the sidewalls 122 and often outside the seed furrow. The bouncing seeds 112 result in the seeds being improperly positioned within the furrow 110. The improper placement of the seeds within the furrow 110 results in various growth related problems such as uneven pant emergence, poor stands, increased weed population, non uniform maturing, longer insect life cycles, higher susceptibility to chemical damage, and ultimately lower yields. Moving the planter 102 at a slower velocity reduces the bouncing problem, but does not eliminate it. Moving the planter 102 at a higher velocity to increase the planting process exacerbates the bouncing problem.

As seen in FIGS. 3–8, the extension 118 is preferably mounted on the rearwardly facing surface 146 of the seed tube 128 near its depending lower end 154. Alternatively, or as seen in FIGS. 9 and 10, the extension 118 may be mounted on other row unit structures such as a seed boot or shoe. The extension 118 facilitates the proper placement of seeds 112 in the bottom portion 120 of the furrow 110 thereby significantly reducing the problems associated with improper seed placement as discussed above. The extension 118 extends downwardly and rearwardly from the seed tube 128 into the furrow 110, minimizing contact with the sidewalls 122. Preferably, the extension 118 terminates at a position just above the vertex 120 of the furrow.

With the extension 118 mounted on the depending lower end 154 of the seed tube 128, as the seeds 112 exit the opening 156 of the seed tube 128 and bounce from the seed tube, the seeds 112 contact the extension 118 and deflect back into the furrow 110. If the seeds 112 bounce more than once within the furrow 110, they will again contact the extension 118 further along its length and will again be deflected back into the furrow 110. As the seeds 112 come to rest in the bottom portion 120 of the furrow 110, the trailing end 186 of the extension 118 passes over the seeds 112 without contacting the seeds 112. The extension effectively funnels the seeds to the bottom of the furrow. In the preferred embodiment when attached with the seed tube, the width of the extension decreases rearwardly along its length so that the width of the extension closely matches the width of the furrow as the extension extends rearwardly and downwardly into the furrow, thereby reducing the number of seeds that can bounce between the sidewall of the furrow and the extension.

In mounting the extension 118 to the seed tube 128, as best seen in FIGS. 4, 5, 7 and 8, the top segment 166 of the extension 98 is releasably attached to the seed tube 128. More particularly, in one embodiment of the extension, the protrusions 162 on the seed insert tube 128 are positioned within the apertures 168 formed in an attachment 170 having outwardly facing sidewalls defining a sawtooth pattern 172 complimentary to a sawtooth configuration 174 defined by an elongated slot 176 in the extension 118. The complimentary sawtooth configurations 172 and 174 provide an adjustment mechanism to place the extension at the appropriate depth into the furrow 110. The engagement of the protrusions 162 in the mounting apertures 168 properly position the extension 118 on the seed tube 128, and acts to inhibit any longitudinal or transverse movement of the extension 118 with respect to the seed tube 128. Two releasable fasteners 178, such as plastic tie straps, are positioned around the extension 118 and the seed tube 128, and are releasably fastened thereto to hold the extension 118 securely in position on the seed tube 128. The extension can also be fastened to the seed tube or planter in any known manner.

Figure 5:
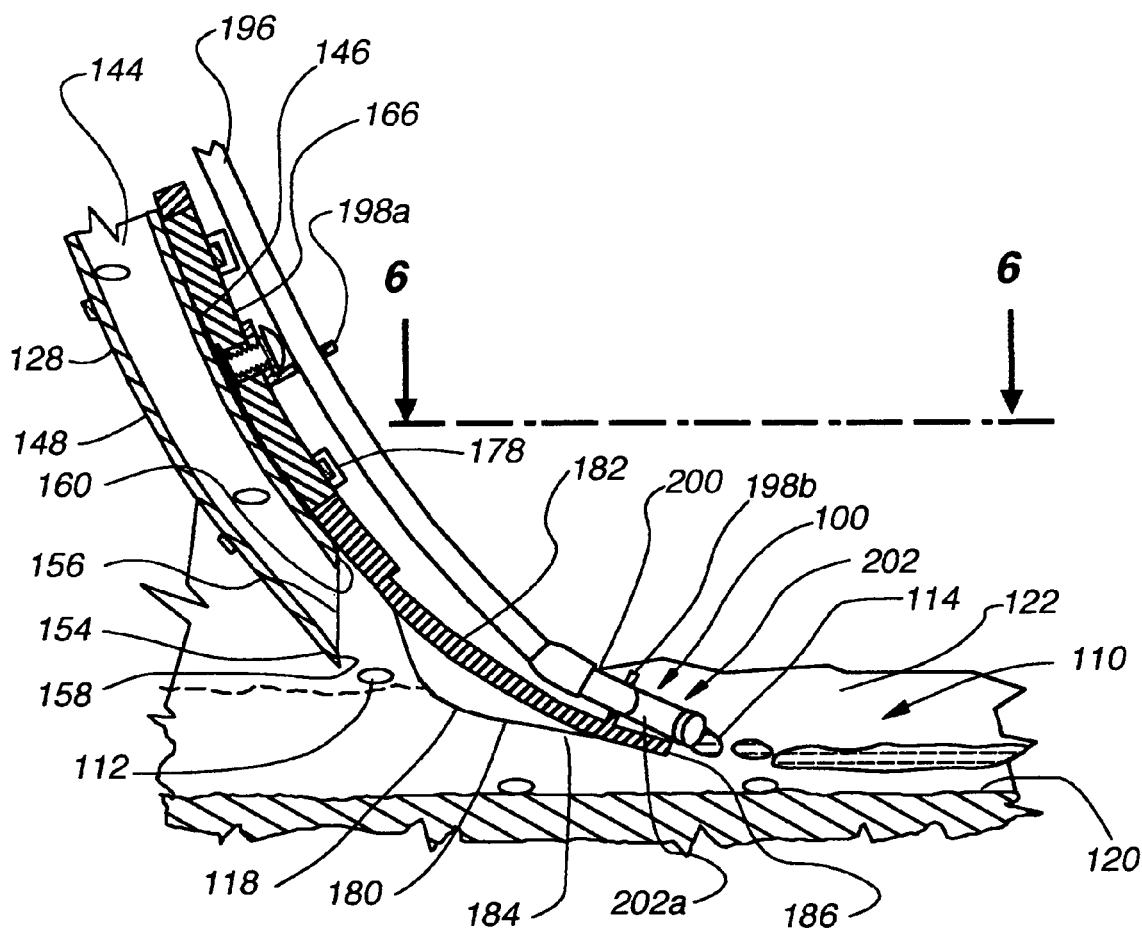
FIG. 5 is a section taken along line 5—5 of FIG. 4, and illustrates the liquid distribution apparatus dispersing liquid unto the sidewalls of a seed furrow.
Figure 6:
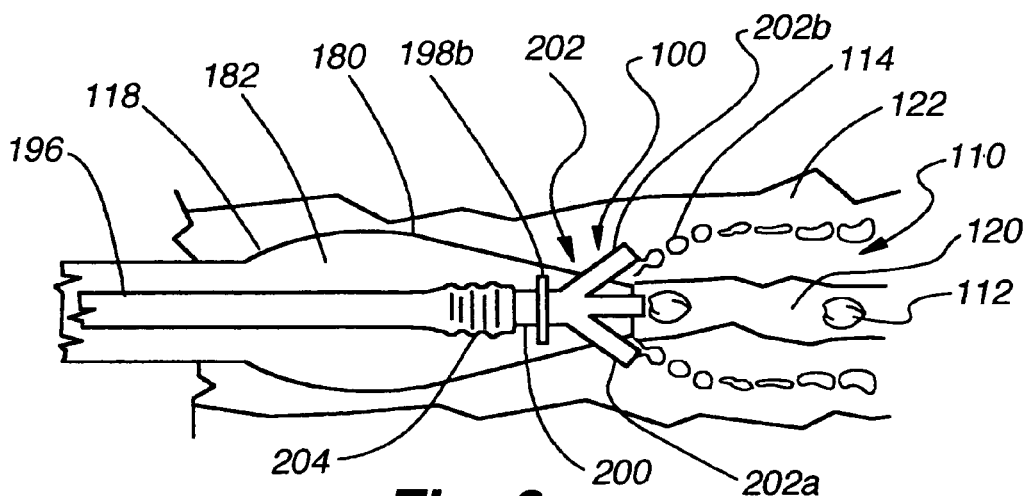
FIG. 6 is a top view of one embodiment of the liquid distribution apparatus of the present invention.
Figure 7:
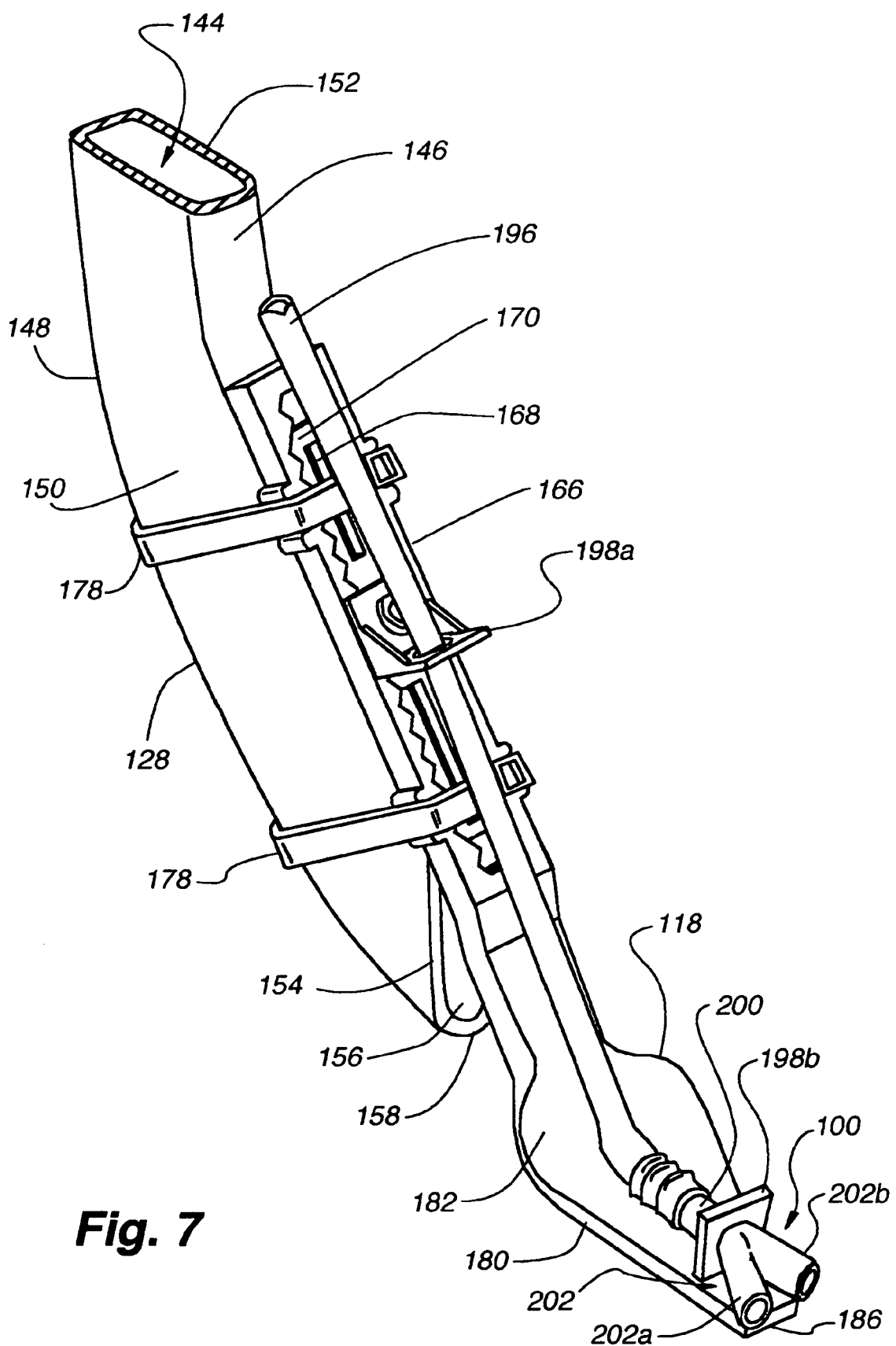
FIG. 7 is a perspective view of a seed tube, one embodiment of an extension for reducing seed bounce, and a liquid supply hose, with one embodiment of the liquid distribution apparatus of the present invention connected to the liquid supply hose and fixed to the extension.

In one embodiment, the bottom segment 180 of the extension 118 defines an upwardly convex top surface 182 and a downwardly concave lower surface 184. The downwardly concave lower surface 184 acts to deflect the bouncing seeds 112 toward the center 120 of the furrow 110. The seeds 112 are thus directed toward and land in the bottom portion 120 of the furrow 110. This helps place the seeds 112 in the optimal position within the furrow 110, and helps reduce the number of seeds which come to rest on the sidewalls 122 or outside of the furrow 110. In short, the downwardly concave lower surface 184 of the bottom segment 180 of the extension 118 focuses the deflection of the seeds 112 toward the bottom portion 120 of the furrow 110, as shown in FIGS. 4–6.

The transverse dimension of the lower surface 184 of the bottom segment 180 of the extension 118 preferably becomes substantially planar adjacent to the trailing end 186 because the transverse dimension of the extension 118 is substantially reduced, and a downwardly facing concave surface has less of an effect on the deflection of the seeds given the proximity of the trailing end 186 to the bottom portion 120 of the furrow 110. Also, very few seeds continue to bounce at that location on the extension.

The extension 118 is flexible along its entire length so that in the event the trailing end 186 of the extension comes into contact with the soil, the trailing end of the extension will easily bend upwardly to minimize any damage to a seed 112 that may be contacted. Furthermore, while the extension 118 is designed to not contact the sidewalls 122 of the furrow 120 during use, some incidental contact may occur. Any incidental contact with furrow may have the affect of covering the seeds 112 in the bottom portion 120 of the furrow 110 with a thin layer of soil. This helps to protect the seeds from any incidental contact with the liquid 114 that may occur. The extension can also have any number of shapes and cross-sections, and can contact the furrow bottom or sidewalls.

Including liquids 114 such as liquid fertilizer, liquid starter, liquid insecticides, liquid inoculants, and water in the furrow 110 along with the seeds 112 at the time of planting advantageously affects the growth of the plants and the ultimate yield of the crop as discussed above. The provision of some types of liquid 114 directly into the furrow 110, however, can actually negatively affect plant growth and the ultimate crop yield if liquid 114 is distributed directly unto the seeds 112. Accordingly, one embodiment of the liquid distribution apparatus 100 of the present invention directs liquid 114 unto the sidewalls 120 of the furrow, above the seeds 112, thus providing liquid 114 directly into the furrow 120 along with the seeds 112 without drenching the seeds 112 in the liquid 114. Although the liquid distribution apparatus 100 of the present invention is shown in the Figures in conjunction with one embodiment of the extension 118, a Schaffert Manufacturing Co., Inc., Rebounder™, the liquid distribution apparatus may also be used in the absence of the extension 118. In the absence of the extension 118, however, a larger proportion of seeds 112 may become deposited on the furrow sidewalls 122 and hence come in direct contact with the distributed liquid 114 from the present invention. The majority of seeds 112, however, will still be deposited in or near the bottom portion 120 of the furrow 110, therefore the present invention is advantageous to plant growth and crop yield even in the absence of the extension 118. The present invention may also be used in conjunction with other available seed placement attachments such as a Keeton Seed Firmer™.

Liquid 114 is supplied to the liquid distribution apparatus 100 of the present invention from the liquid container 106. The liquid container includes a pump 188 in fluid connection with the contents of the liquid container 106 for supplying liquid under pressure. As shown in FIG. 1, a main hose 190 connects to the pump 188 to the liquid distribution tube 192 at the upper rear of the planter 102. The liquid distribution tube 192 on the planter 102 traverses the width of the planter 102 across the planter row units 108. Adjacent each row unit 108, the liquid distribution tube 192 has an outlet 194 that is fluidly coupled to a liquid supply hose 196. Each row unit 108 has the liquid supply hose 196 for distributing liquid to the furrow 110 associated with each row unit 108.

The liquid supply hose 196 extends generally downwardly from the distribution tube 192 to the seed tube 128 and is attached to the extension 118. The extension 118 attached to the seed tube 128 preferably includes at least two eyelets 198a and 198b along its length. The first eyelet 198a is located along the top segment 166 of the extension 118. The liquid supply hose 196 extends through the first eyelet 198a and is thereby held in place along the center of the extension 118. Preferably, the first eyelet 198a fits loosely around the hose 196 so that as the extension lexes the hose may move freely with the eyelet 198a, which helps to prevent the hose 196 from disconnecting the hose 196 from the liquid distribution apparatus. A second eyelet 198b is located along the top of the extension 118 adjacent the bottom segment 180 of the extension 118 that extends into the furrow 110. Preferably, the second eyelet 198b grips the supply hose 196 firmly to help prevent the hose 196 from disconnecting from the liquid distribution apparatus 100. An additional third eyelet 198c may be included along the length of the extension between the first eyelet 198a and the second eyelet 198b. The third eyelet 198c helps to hold the hose 196 secure so that residue flowing over the top of the extension does not disconnect the hose 196 from the liquid distribution apparatus.

The liquid distribution apparatus 100 is preferably attached to the bottom segment 180 of the extension 118 adjacent the furrow 110. The liquid distribution apparatus 100 is preferably secured to the extension 118 with the second eyelet 198b and is in fluid connection with the liquid supply hose 196. In the two-eyelet embodiment of the liquid distribution apparatus 100, shown in FIGS. 4, 5, 7 and 8, the liquid distribution apparatus 100 generally defines a Y-shaped tubular structure having a supply tube 200 in fluid connection with the liquid distribution hose 196 and two distribution tubes 202a and 202b in fluid connection with the supply tube 200, the distribution tubes distributing liquid 114 on the sidewalls 122 of the furrow 110 generally above the two vertexes of the furrow.

Generally speaking, the liquid distribution apparatus 100 includes a supply channel 200 and a distribution channel 202 having at least two outlets 202a and 202b. However, it is to be understood that the distribution channel 202 may comprise any structure that distributes liquid unto one or both sidewalls 122 of the furrow 110. The supply channel 200, as shown in FIGS. 4–10, comprises a tubular structure or hose that is in fluid connection with the liquid supply hose 196 at its rear end. Preferably, the inlet portion of the supply channel 200 includes a barbed or ribbed portion 204 to engage the liquid supply hose 196. The outlet portion of the supply channel 200 is in fluid connection with the distribution channel 202.

The distribution channel 202 as shown in the embodiment of the liquid distribution apparatus show in FIGS. 4–10, includes two outlets 202a, 202b, angularly oriented with respect to the supply channel 200, that distribute liquid along one or both sidewalls 122 of the furrow 120. The outlets 202a, 202b, in this embodiment, comprise tubular structures or hoses. The front portion of the distribution channel 202 is attached to the center of the extension 118 by the second eyelet 198b. The liquid distribution apparatus 100 may be held in place in the second eyelet 198b by an adhesive or a tie strap. Accordingly, the outlets 202a, 202b, are oriented along the bottom segment 180 of the extension with the first outlet 202a extending outwardly to one side of the extension 118 and the second outlet 202b extending outwardly to the opposite side of the extension 118. As shown in the Figures, the outlets 202a, 202b, along with the supply tube 200 form a generally Y-shaped structure.

As shown in FIGS. 5 and 6, when liquid 114 flows from the outlets 202a, 202b, the liquid 114 is preferably distributed above the bottom portion 120 of the furrow 110 along the sidewalls 122 of the furrow. By distributing the liquid 114 along the sidewalls 122 of the furrow 110, the seeds 112 are not drenched in the liquid 114 because most of the seeds 112 are deflected by the extension 118 to the bottom portion 120 of the furrow 110 below where the liquid is distributed.

As shown in FIGS. 4–10, the liquid distribution apparatus 100 is attached along the bottom segment 180 of the extension 118 bye the second eyelet 198b. The liquid supply hose 196, that is attached to the extension 118 at the first eyelet 198a, is in fluid connection with the liquid distribution apparatus 100 adjacent the second eyelet 198b. As mentioned above, the use of the extension 118 is considered preferable, but is not necessary to the proper functioning of the liquid distribution apparatus 100. For example, the liquid distribution apparatus 100 can be attached along the center top portion of the seed tube 128 directly above the opening 156 where the seeds 112 exit the seed tube 128. Attached to the seed tube 128, the outlets 202a, 202b, will extend outwardly and to either side of the seed tube 128 thereby depositing liquid 114 along the sidewalls 122 of the furrow 110.

Generally, the liquid distribution apparatus 100 may be attached to any part of the planter row unit 108. Preferably, the liquid distribution apparatus 100 (when not attached to the extension 118) is attached at a location between the double disk opener 134 and the furrow closer wheel 138 centered along the vertex 120 of the furrow so as to orient the outlets 202a, 202b above the sidewalls 122 of the seed furrow 110 before the furrow 110 is closed.

The embodiments of the liquid distribution apparatus 100 are shown and described as being attached to the bottom segment 180 of the extension 118. The various embodiments of the liquid distribution apparatus may, however, be attached anywhere along the extension so long as, in the case of the two-outlet embodiment, the outlets 202a, 202b are oriented so as to distribute liquid 114 along the sidewalls 122 of the furrow. The location of the liquid distribution apparatus 100 on the extension as shown in the Figures is considered preferable.

Additionally, while the various embodiments of the liquid distribution apparatus are shown as a separate structure attached to the extension 118, they may, however, be integrated into the extension 118. To integrate the liquid distribution apparatus 100 into the extension the supply channel 200 and distribution channel 202 can be molded directly into the extension in a single plastic injection mold. In the integrated liquid distribution apparatus, the supply channel 200 is in fluid connection with the liquid supply hose 196 and a plurality of outlets from the distribution channel 202 are oriented so as to distribute liquid into the furrow 110.

FIGS. 9 and 10 show the two outlet embodiment of the liquid distribution apparatus 100 of the present invention connected to an extension that is attached to a Case/IH style planter having a seed boot 204 positioned between the disks (not shown). The extension 118 is attached directly to the seed boot 204. A brace plate 206 may be necessary to properly attach the extension 118 to the seed boot 204. The seed tube 128 (not shown) typically extends through the seed boot.

The liquid supply hose 196 is connected to the outside of the seed boot 204 using a tie strap 208. The lower end of the liquid supply hose 196 is in fluid connection with the liquid distribution apparatus 100 connected to the extension 118. Accordingly, the outlets 202a and 202b of the two outlet embodiment of the liquid distribution apparatus 100 distribute liquid 114 unto the sidewalls 122 of the furrow 110.

Figure 11:
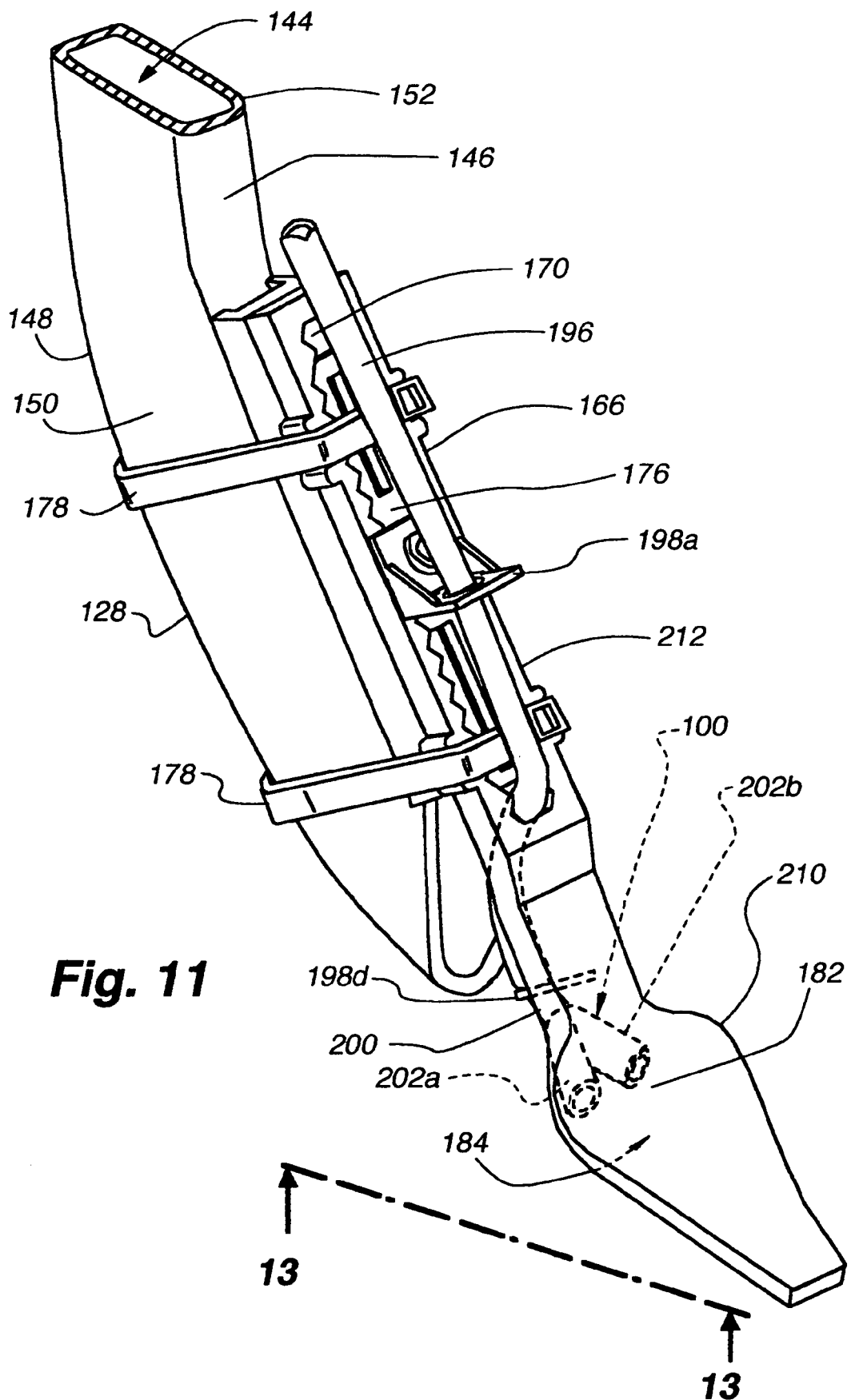
FIG. 11 is a perspective view of a seed tube, an embodiment of an extension for reducing seed bounce, a liquid supply hose, and an embodiment of the liquid distribution apparatus wherein the liquid distribution apparatus is connected with the underside of the extension for reducing seed bounce.

In an alternative embodiment illustrated in FIG. 11, the liquid distribution apparatus 100 is connected to an extension 210 adjacent the downwardly concave lower surface 184 of the extension 210. Preferably, in this embodiment the outlets 202a, 202b of the liquid distribution apparatus 100 are located between the underside 184 of the extension 210 and the seed chute 128. The liquid supply hose 196 extends generally downwardly from the distribution tube 192 to the seed tube 128, and extends through a first eyelet 198a which projects upwardly from the extension 210. Rearwardly of the eyelet 198a, the liquid supply hose 196 extends from the top surface 212 of the extension 210 through the elongated slot 176 to the underside 214 of the extension 210, where it is fluidly connected with the supply channel 200 of the apparatus 100. The extension 210 preferably includes an eyelet 198d projecting downwardly, and generally transversely, from the extension 210. The eyelet 198d couples the apparatus 100 to the extension 210, and properly orients the outlets 202a, 202b of the apparatus 100 to distribute liquid on the sidewalls 122 of furrow 110. The liquid distribution apparatus 100 extends through the eyelet 198d, and is fluidly connected with the liquid supply hose 196 adjacent thereto. In the case of the distribution apparatus 100 having three outlets, the center outlet is oriented to distribute liquid in the vertex 120 of the furrow 110.

Figure 12:
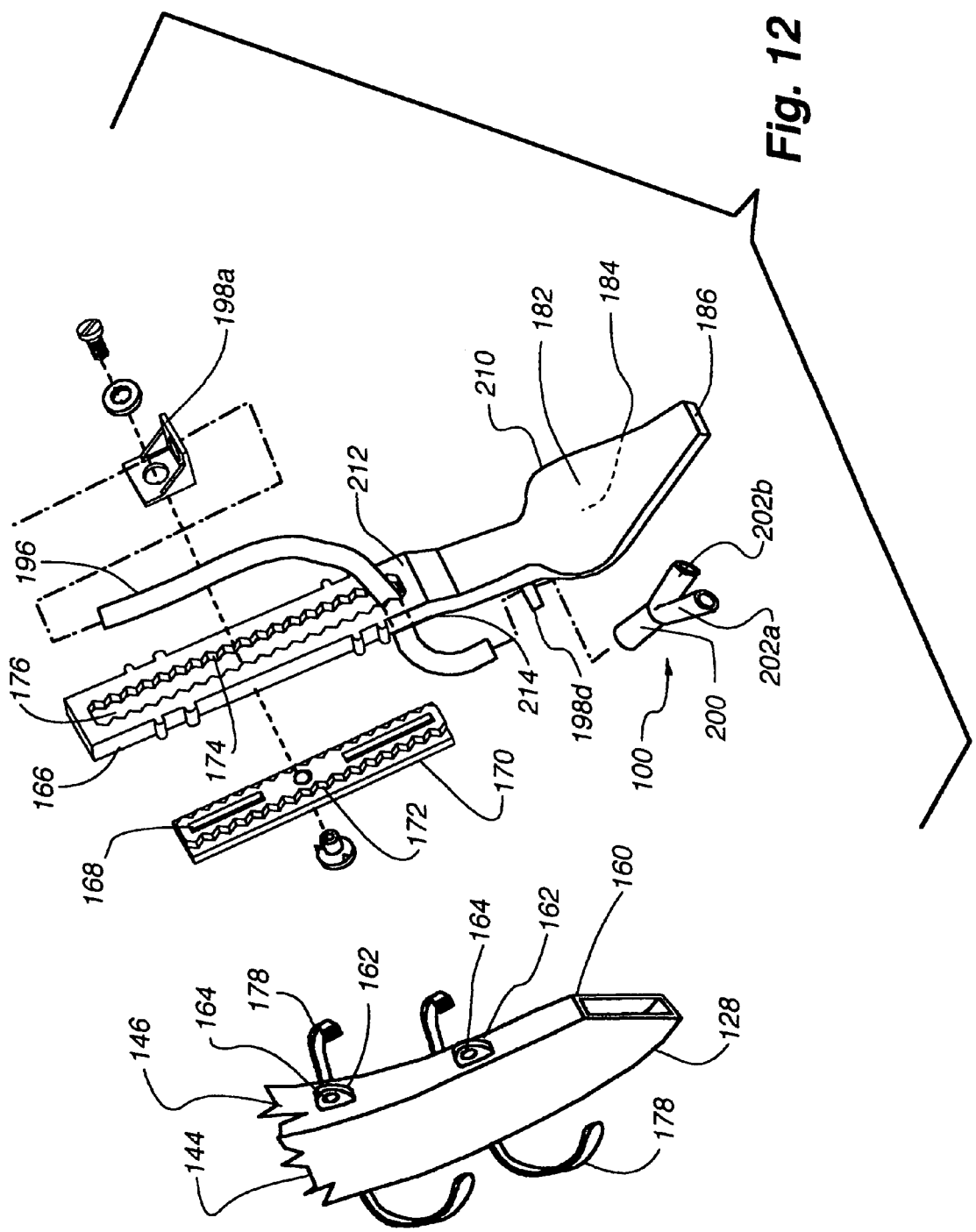
FIG. 12 is an exploded view of the seed tube, the embodiment of the extension for reducing seed bounce, the liquid supply hose, and the embodiment of the liquid distribution apparatus as shown in FIG. 11.

FIG. 12 is an exploded view showing the top section 166 of the extension 210 connected with the seed tube 128. This connection is shown and described in detail above with respect to FIG. 8, the only difference in FIG. 12 is the presence of an alternative embodiment of the extension 210 which has an eyelet 198d extending downwardly, and generally transversely, from extension 210. This eyelet 198d properly orients the outlets 202a, 202b of the liquid distribution apparatus 200 below the extension 210.

Figure 13:
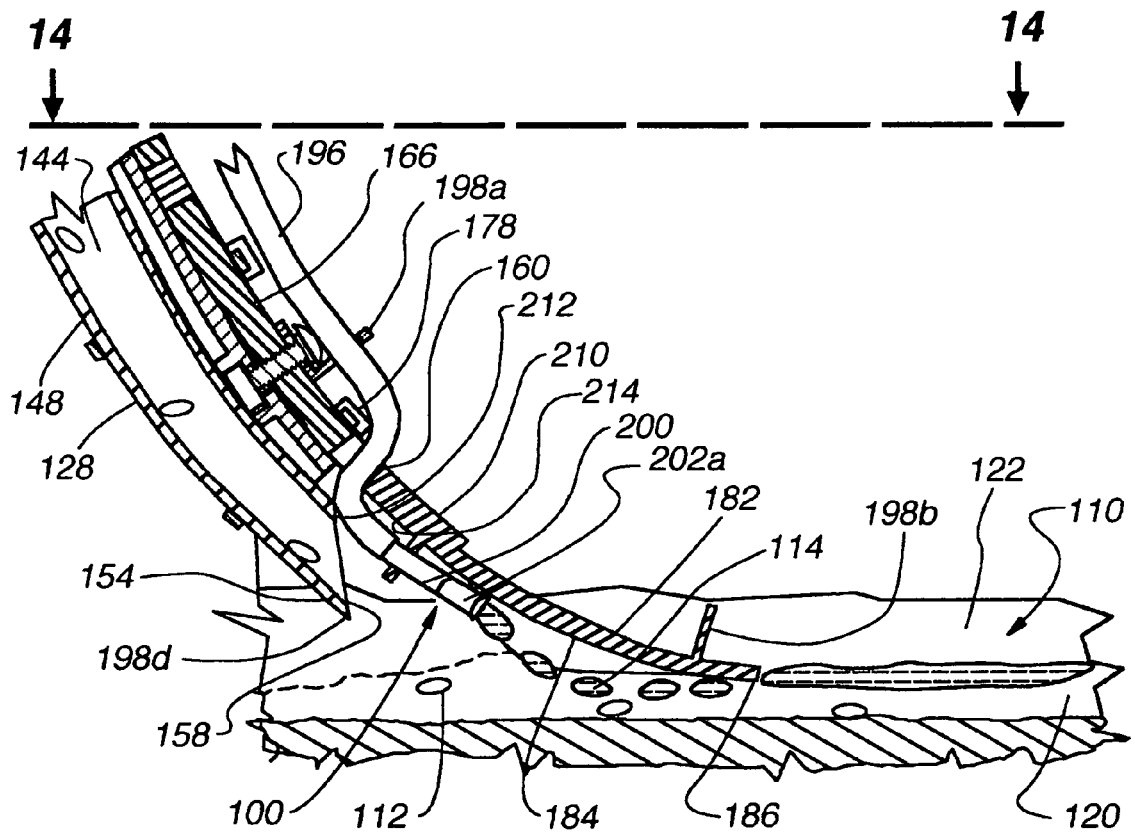
FIG. 13 is a section taken along line 13—13 of FIG. 11.
Figure 14:
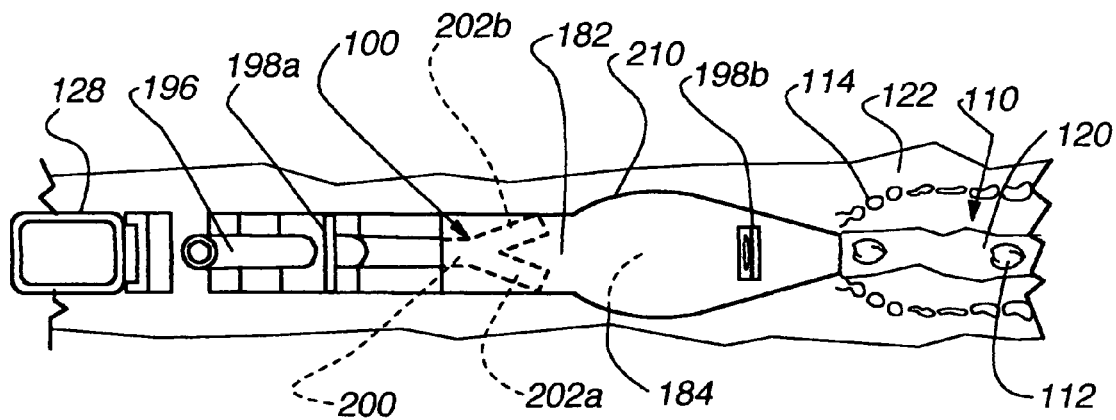
FIG. 14 is a section taken along line 14—14 of FIG. 13.
Figure 15:
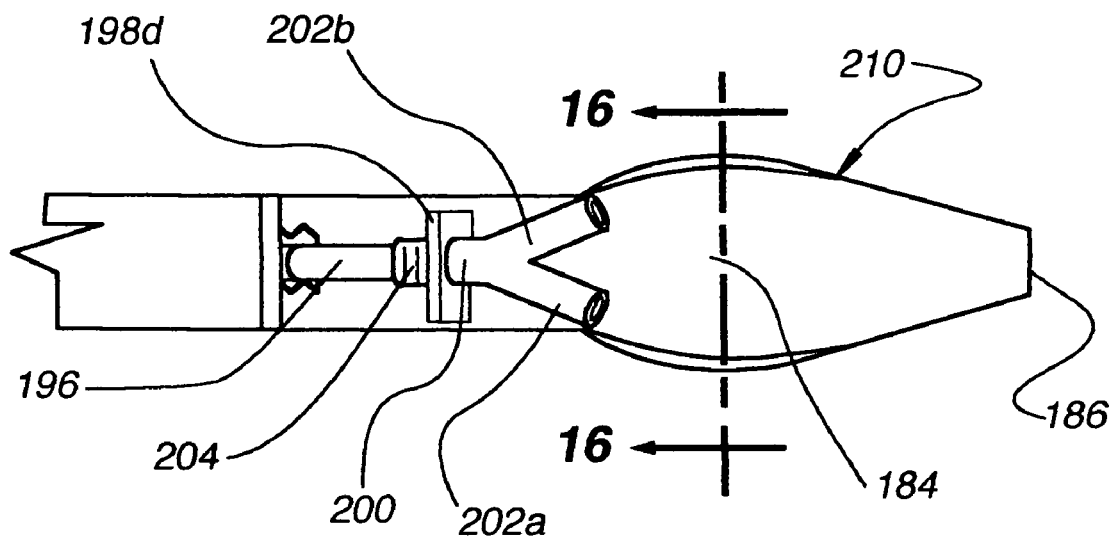
FIG. 15 is a bottom view of the embodiment of an extension for reducing seed bounce, and the embodiment of the liquid distribution apparatus wherein the liquid distribution apparatus is connected with the underside of the extension.
Figure 16:
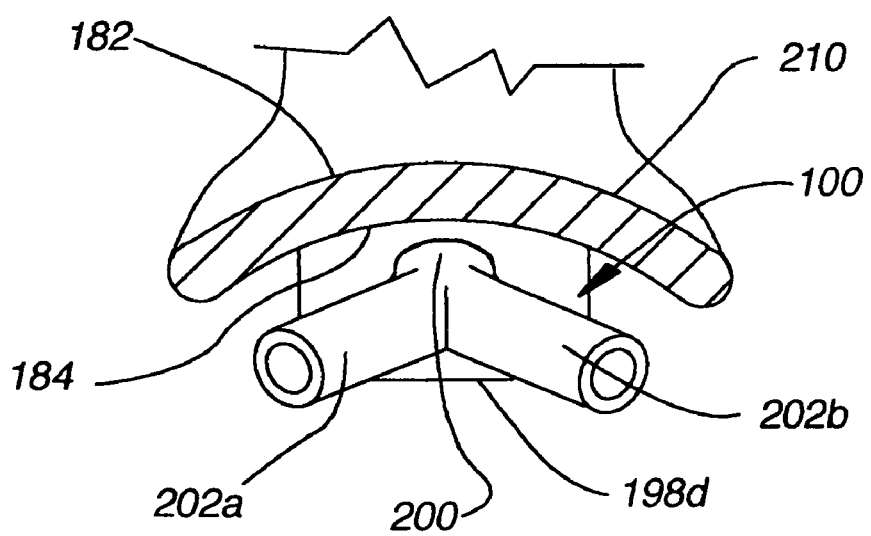
FIG. 16 is a section taken along line 16—16 of FIG. 15.

FIG. 13 is a section taken along 13—13 of FIG. 11. This view shows the orientation of the distribution apparatus 100 extending through the eyelet 198d for distribution of liquid beneath the extension 210 on the sidewalls 122 of the furrow 110. FIG. 13 also shows the liquid supply hose 196 passing through the elongated slot 176 from the top surface 212 of the extension 210 to the underside surface 214. FIGS. 14–16 are views which show the alternative embodiment of the extension 210 and the orientation of the liquid supply tube and the liquid distribution apparatus 100 coupled therewith.

This alternative embodiment provides for the additional advantage of preventing the outlets 202a, 202b of the liquid distribution apparatus 100 from becoming clogged with soil during use. The location of the liquid distribution apparatus 100 underneath the extension 210 shields the outlets 202a, 202b from any soil that may inadvertently fall on the extension from the filling of the furrow 110 by the furrow closer wheels (not shown) occurring behind the extension 210 after depositing the seeds and the liquid into the furrow 110.

Figure 17:
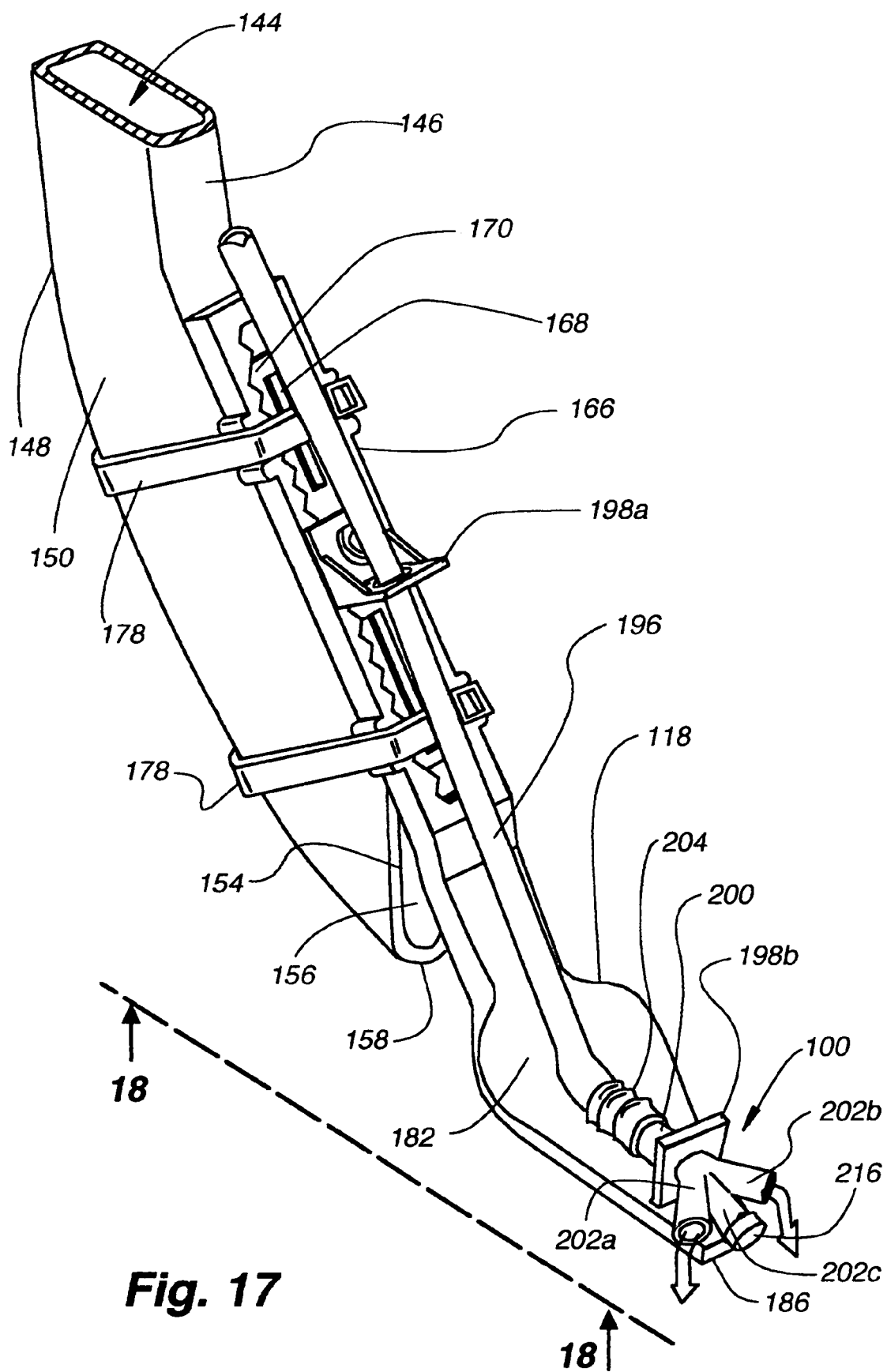
FIG. 17 is a perspective view of a seed tube, one embodiment of an extension for reducing seed bounce, and a liquid supply hose, with one embodiment of the liquid distribution apparatus having three outlets connected to the liquid supply hose and fixed to the extension.
Figure 18:
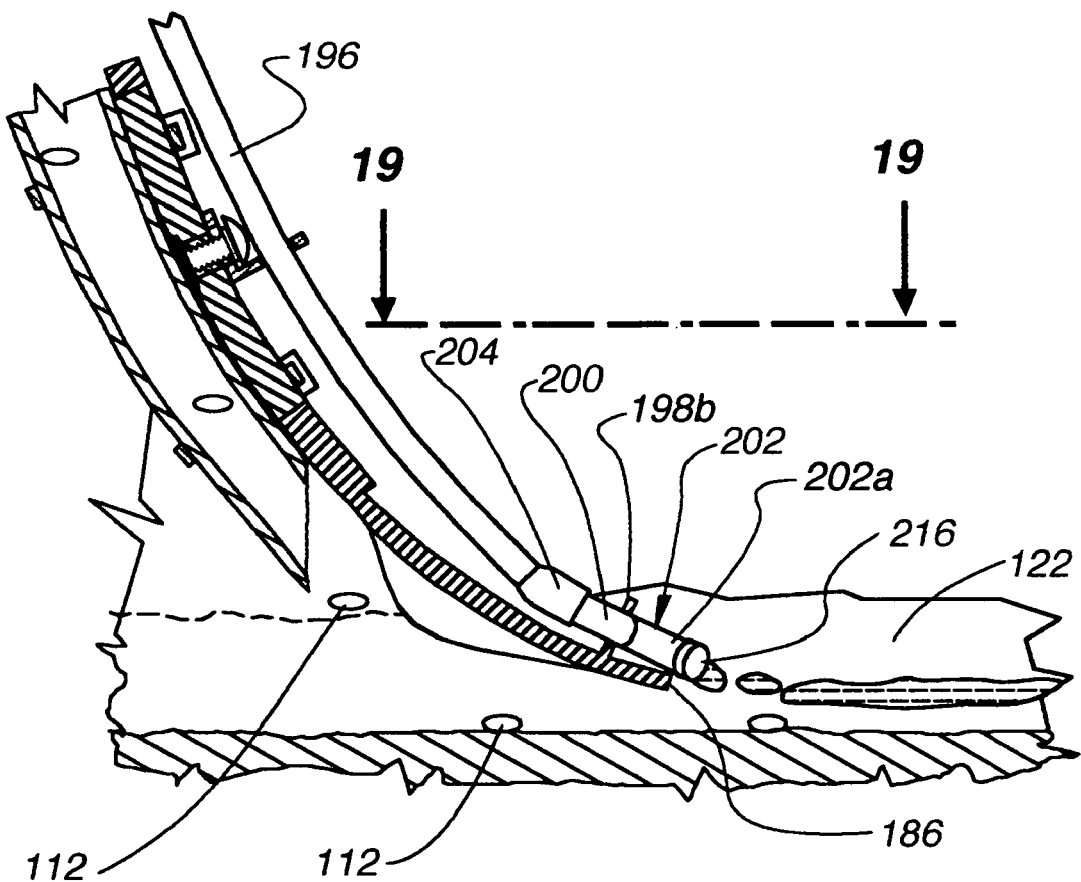
FIG. 18 is a section view taken along line 18—18 of FIG. 17.
Figure 19:
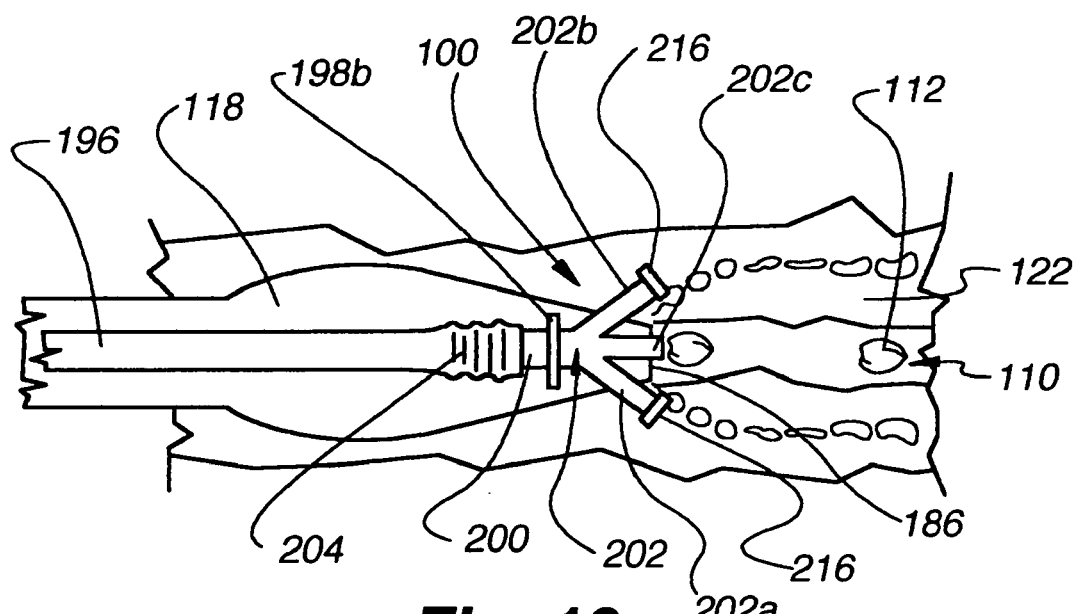
FIG. 19 is a section view taken along line 19—19 of FIG. 18.

Referring to FIGS. 17–19, an alternative embodiment of the liquid distribution apparatus 100 includes three outlets 202a, 202b, 202c in a preferably fork shaped configuration (ψ) with respect to the supply channel 200, wherein one of the outlets 202c is oriented to distribute liquid 114 in the centrally located bottom portion 120 of the furrow, and the other two outlets 202a, 202b are oriented to distribute liquid 114 on opposing sidewalls 122 of the furrow 110. Generally, this embodiment provides a farmer or other user with a convertible liquid distribution apparatus 100 that may distribute liquid on the sidewalls 122 of the furrow 110, in the vertex 120 of the furrow 110, or in any combination thereof. This allows the farmer to rapidly convert the liquid distribution portion of the planter for planting seeds that benefit from liquid distributed on the furrow sidewalls to planting seeds that benefit from liquid distribution directly on the seeds.

Preferably, the liquid distribution apparatus 100 includes a supply channel 200 similar to other embodiments described herein and a distribution channel 202. The distribution channel 202 preferably having three outlets 202a, 202b, 202c, wherein a first 202a and a second side outlet 202b are preferably angularly oriented with respect to the supply channel 200, which may distribute liquid along one or both sidewalls 122 of the furrow 110, and a third or center outlet 202c that is preferably co-linear with the supply channel 200, which may distribute liquid 114 centrally located in the bottom or vertex 120 of the furrow 112. This embodiment is described as preferably having three outlets; it is envisioned, however, that this embodiment could include more than three outlets.

As with preceding exemplary embodiments of the liquid distribution apparatus 100, the inlet portion of the supply channel includes a barbed or ribbed portion 204 at its rear end to engage the liquid supply hose 196. The outlet portion of the supply channel 200 is in fluid connection with the distribution channel 202. Accordingly, fluid flows from the first hose 196 into the supply channel 200 and then out to the outlet(s) 202a, 202b, 202c of the distribution channel 202.

This alternative convertible embodiment preferably also includes at least one stopper or plug 216 adapted to stop or reduce the flow of liquid 114 from any of the outlets 202a, 202b, 202c, thereby allowing the device to be converted to different liquid distribution patterns. In one embodiment, the stopper or plug 216 may be connected with the liquid distribution apparatus 100, with the extension 118 or 210 for reducing seed bounce, or with whatever device the apparatus 100 is connected with, for example a drill, by way of a cable or other such connection device so that when not in use the plug 216 stays connected with the liquid distribution apparatus 100. Preferably, the plug 216 is held to the apparatus by way of some retentive means such as a snap, clamp, or the like (not shown). Alternatively, the plug 216 may be supplied in a kit along with the liquid distribution apparatus 100.

The plug 216 is adapted to be inserted into the outlets 202a, 202b, 202c thereby prohibiting the flow of liquid 114 from the plugged outlet. This allows the apparatus 100 to be converted to any liquid distribution configuration the farmer desires. For example, for certain applications, such as placing liquid fertilizers in the furrow 110, it is desirable to distribute liquid 114 on the sidewalls 122 of the furrow 110 and not directly on the seeds 112; accordingly, the farmer will insert a plug 216 into the center outlet 202c. In another example, if the farmer is distributing liquid inoculant in the furrow 110 along with the seeds 112, it is desirable to place the inoculant directly on the seed 112; accordingly, the farmer will insert a plug 216 in the first 202a and second 202b side outlets.

In an alternative embodiment, the plug 216 is preferably permanently coupled within the distribution end 202 of the outlet. In this embodiment, liquid flow may be adjusted by pulling the plug 216 outward to allow full flow, or pressing the plug inwardly to decrease the flow. Fully depressed, the plug 216 prohibits liquid flow from the outlet(s) 202a, 202b, 202c altogether.

One advantage of this convertible embodiment is the ease by which a farmer may change from an in-furrow on-seed liquid distribution set-up (where the first 202a and second 202b outlets are plugged) to an in-furrow sidewall distribution set-up (where the center outlet 202c is plugged) or vice versa. For example, a farmer may desire to plant corn seeds and distribute inoculants (which facilitate rapid germination and growth) directly on the seeds 112 in one portion of the farm, and then change seed types to soy beans and distribute fertilizer on the sidewalls 122 of the furrow 110 above the soy bean seeds for planting in a different portion of the farm. Changing from the on-seed liquid distribution for the corn seeds to the furrow sidewall distribution for the soy beans simply requires that the farmer prohibit the liquid flow from the center outlet 202c, and allow the liquid flow from the side outlets 202a, 202b. In one embodiment, the farmer will remove the side plugs, and insert a center plug; or, in are alternative embodiment, the farmer will depress the center plug, and pull-out the side plugs.

Figure 22:
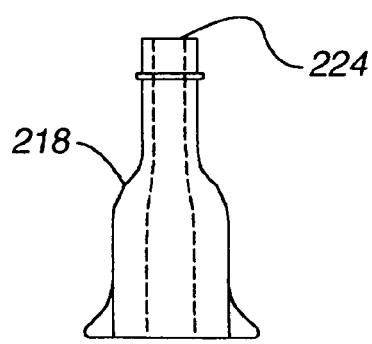
FIG. 22 is top view of the diverter illustrated in FIG. 20.
Figure 23:
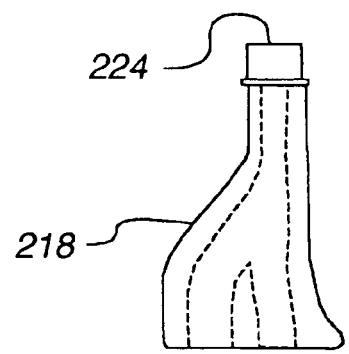
FIG. 23 is a side view of the diverter illustrated in FIG. 20.
Figure 21:
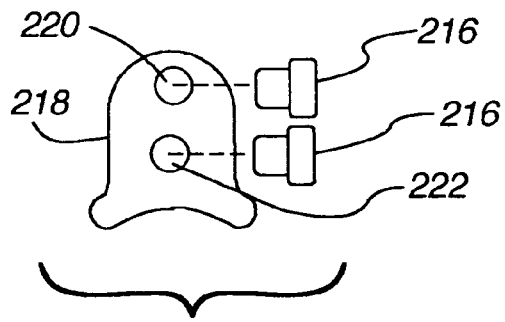
FIG. 21 is a front view of the diverter illustrated in FIG. 20.
Figure 20:
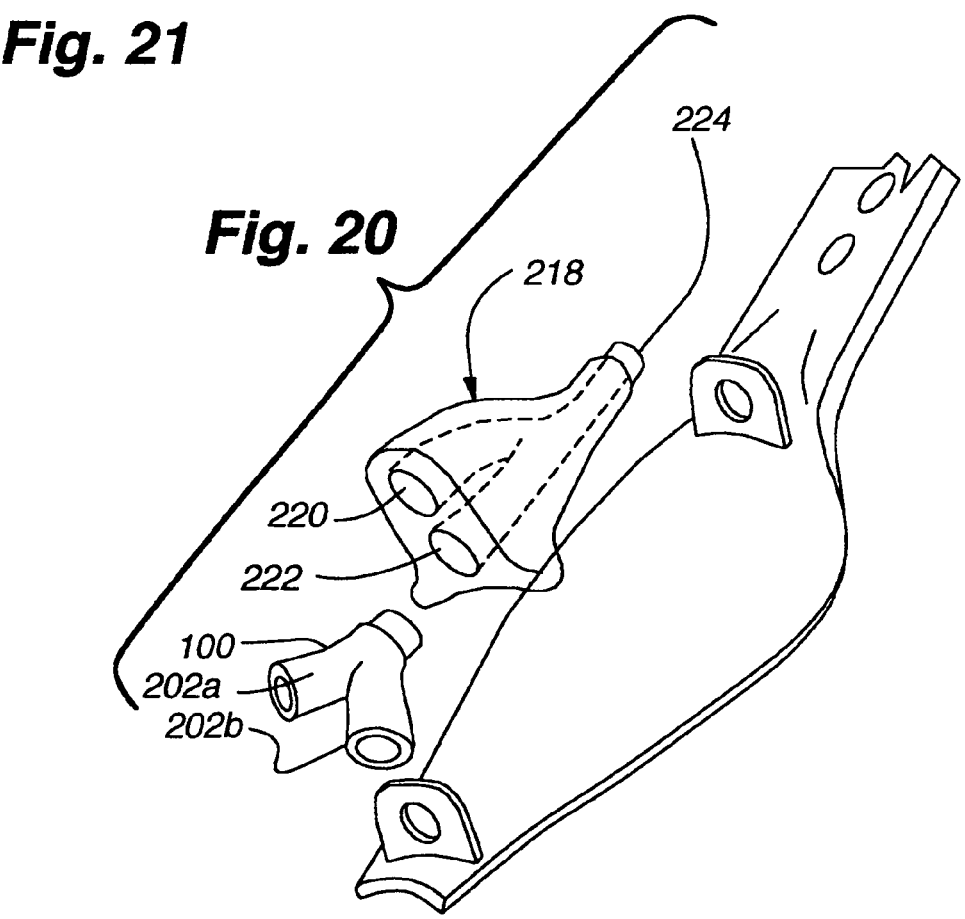
FIG. 20 is a perspective view of one embodiment of a diverter for use, in one example, in conjunction with the two outlet embodiment of the liquid distribution apparatus.

Referring to FIG. 20, a perspective view of one embodiment of a diverter 218 is shown for use, in one example, in conjunction with the two outlet 202a, 202b embodiment of the liquid distribution apparatus 100. FIG. 21 is a front view of the diverter 218 illustrated in FIG. 20; FIG. 22 is top view of the diverter 218 illustrated in FIG. 20; and FIG. 23 is a side view of the diverter 218 illustrated in FIG. 20. The diverter may be used to configure the two-outlet 202a, 202b embodiment of the liquid distribution apparatus 100 for either on-seed liquid distribution, or liquid distribution on the sidewalls 122 of the furrow 110 above the seeds 112. The diverter 218 includes an integrated upper outlet 220 and an integrated lower outlet 222 in fluid connection with an integrated supply channel 224 which is adapted to be fluidly coupled with the liquid supply hose (not shown). The rearward portion of the diverter is insertable into the eyelet 198c and thereby is connected with the extension 118. As shown and described above, the liquid distribution apparatus 100 extends through the rearward most eyelet 198b of the extension. Rather than connecting directly with the liquid supply hose as shown above, the liquid distribution apparatus 200 plugs into one of the two outlets 220, 222 of the diverter which supplies liquid to the liquid distribution apparatus 100.

The farmer may then through the use of plugs 216 configure the device 218 for distribution of liquid directly into the furrow 110 (by plugging the outlets of the liquid distribution apparatus 100, and leaving the outlet not occupied by the liquid distribution apparatus unplugged) or configure the device for distribution of liquid on the sidewalls 122 of the furrow 110 (by plugging the outlet not occupied by the liquid distribution apparatus, and leaving the outlets 202a, 202b of the liquid distribution apparatus unplugged).

Referring to FIG. 24 an alternative embodiment of a diverter 218 for use, in one example, in conjunction with the two outlet embodiment of the liquid distribution apparatus 100. FIG. 25 is a front view of the diverter 218 illustrated in FIG. 24; and FIG. 26 is a side view of the diverter 218 illustrated in FIG. 24. The diverter 218 may be used to configure the two outlet embodiment of the liquid distribution apparatus 100 for either on-seed liquid distribution, or liquid distribution on the sidewalls 122 of the furrow 110 above the seeds 112. The diverter 218 includes an upper distribution tube 220 and a lower distribution tube 222 in fluid connection with a supply tube 224 which is adapted to be fluidly coupled with the liquid supply hose (not shown). The rearward portion of the diverter is insertable into the eyelet 198c and thereby is connected with the extension 118. As shown and described above, the liquid distribution apparatus 100 extends through the rearward most eyelet 198b of the extension 118. Rather than connecting directly with the liquid supply hose as shown above, the liquid distribution apparatus plugs into one of the two liquid distribution tubes 220, 222 of the diverter 218 which supplies liquid 114 to the liquid distribution apparatus 100.

The farmer may then, through the use of plugs 216, configure the device for distribution of liquid directly into the furrow 110 (by plugging the outlets of the liquid distribution apparatus, and leaving the liquid distribution tube not occupied by the liquid distribution apparatus unplugged) or configure the device for distribution of liquid on the sidewalls 122 of the furrow 110 (by plugging the liquid distribution tube not occupied by the liquid distribution apparatus, and leaving the outlets 202a, 202b of the liquid distribution apparatus unplugged).

Figure 27:
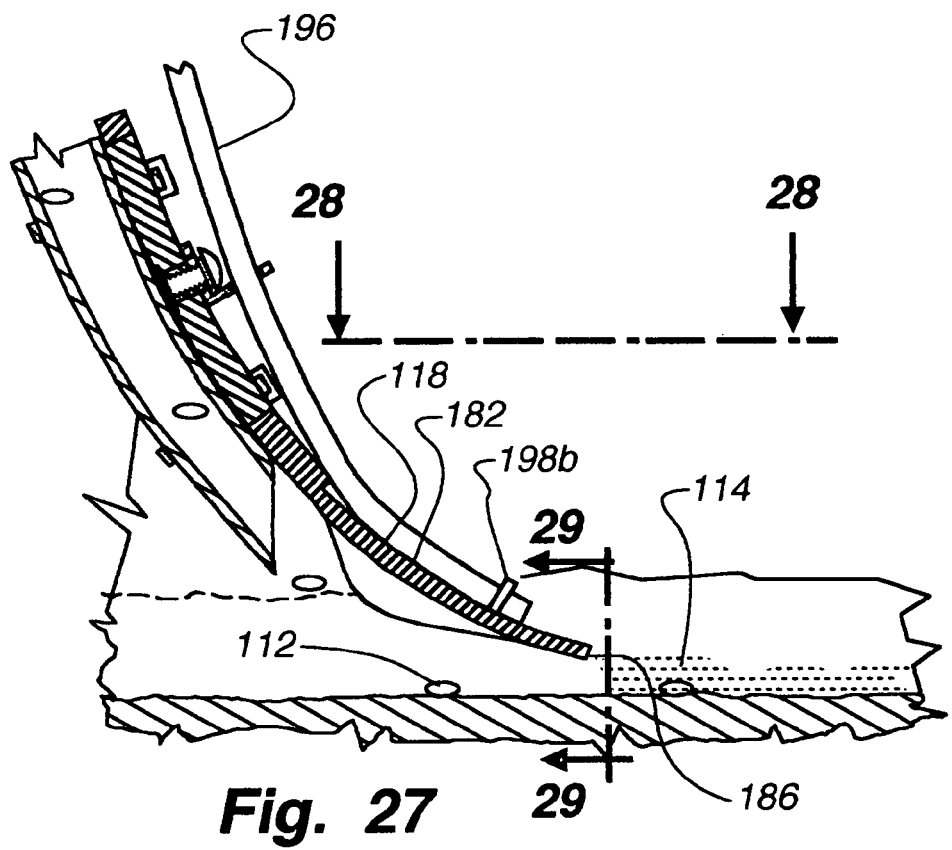
FIG. 27 is a side view of a seed tube, one embodiment of an extension for reducing seed bounce, and a liquid supply hose, with a single outlet liquid distribution apparatus connected to the liquid supply hose and fixed to the extension, the outlet being forward of the trailing end of the extension so that the liquid disperses over the top of the extension and into the furrow.
Figure 28:
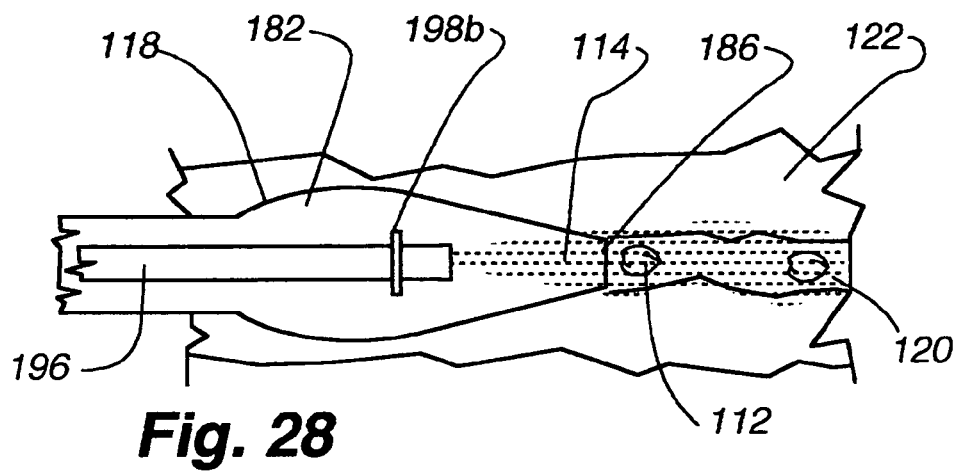
FIG. 28 is a section view taken along line 28—28 of FIG. 27, illustrating the dispersion of the liquid across the vertex of the furrow and extending partially up the sidewalls of the furrow.
Figure 29:
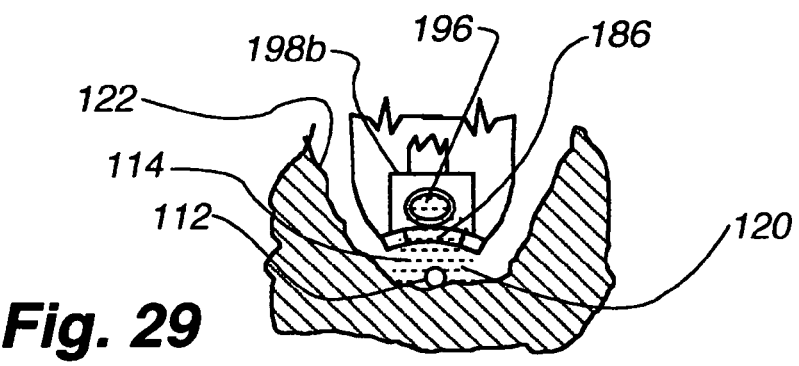
FIG. 29 is a section view taken along line 29—29 of FIG. 27, illustrating the dispersion of liquid across the vertex of the furrow and extending partially up the sidewall of the furrow.

FIGS. 27–29 illustrate an alternative embodiment of the present invention wherein the liquid tube 196 extends along the length of the extension 118, nearly to the trailing end 186 of the extension, but not past the end of the extension 118. Preferably, the end of the tube is placed on the longitudinal centerline of the extension 118. In this embodiment, the liquid 114 flowing from the tube 196 spreads out over the surface 182 of the extension 118 and flows into the furrow 110. The upwardly convex shape of the upper surface 182 of the extension 118 causes the liquid flowing from the tube 196 to spread out fairly evenly in about a 180-degree radius from the end of the tube 196, depending on the pressure that the fluid is flowing out of the tube. Under fairly low-pressure conditions, if the tube is placed very near the trailing end 186 of the extension 118, then fluid will flow unto both sidewalls 112 of the furrow 110 and into the vertex 120 of the furrow 110. In contrast, if the end of the tube is placed toward the middle or widest point of the extension 118, then the vast majority of the fluid 114 flowing from the tube is deposited on the sidewalls 122 of the furrow 110.

The width of the extension 118 narrows along its length from about its midpoint to the trailing end 186. Accordingly, at the widest point of the extension the fluid is distributed well above the vertex 120 of the furrow 110. Whereas, at the trailing end 186 of the extension 118 the fluid 114 is deposited primarily in the vertex 120 of the furrow 118. The amount of fluid deposited on the sidewalls 122, as compared to the amount deposited in the vertex 120 of the furrow 110, will change depending on the location of the end of the tube 196 along the length of the extension 118 and the pressure at which the fluid 114 is flowing out of the tube 196.

Figures 30, 31:
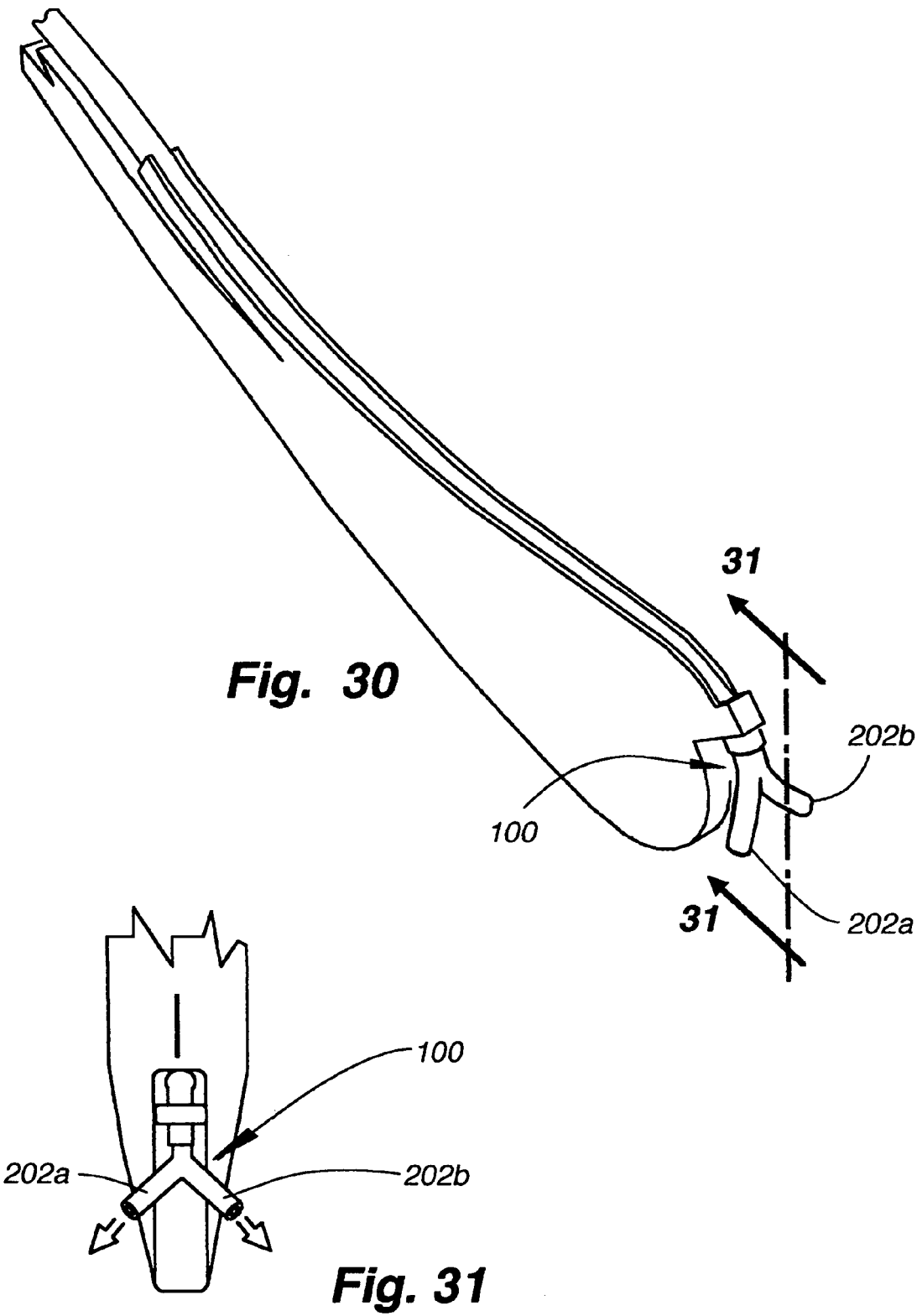
FIG. 30 is a perspective view of a seed firmer having a two outlet embodiment of the present invention connected therewith.
FIG. 31 is a section view taken along line 31—31 of FIG. 30.

FIGS. 30–31 illustrate a seed firming device such as the Keeton Seed Firmer™ with the two outlet embodiment of the liquid distribution apparatus 100 connected therewith. FIGS. 32–33c illustrate the seed firming device with the three outlet embodiment of the liquid distribution apparatus 100 connected therewith. During planting, the seed firmer generally drags behind the planter, drill or other implement in the furrow 110 contacting the bottom portion 120 of the furrow 110. In contacting the bottom portion of the furrow, the seed firmer contacts the seeds 112 that are in the bottom of the portion of the furrow and embeds the seeds in the dirt. The firmer includes an arm adapted to contact the seeds in the furrow during planting which is attached to the planter. The arm is adapted to contact the seeds in the furrow. It is envisioned that the various embodiments of the liquid distribution apparatus may be used with the seed firmer to distribute liquid in the furrow while the seed firmer is embedding the seeds in the furrow.

FIG. 34 illustrates is a perspective view of one embodiment of a plug used in connection with any of the above-described embodiments of a liquid distribution apparatus to reduce or eliminate the flow of liquid therefrom.

Figure 35A:
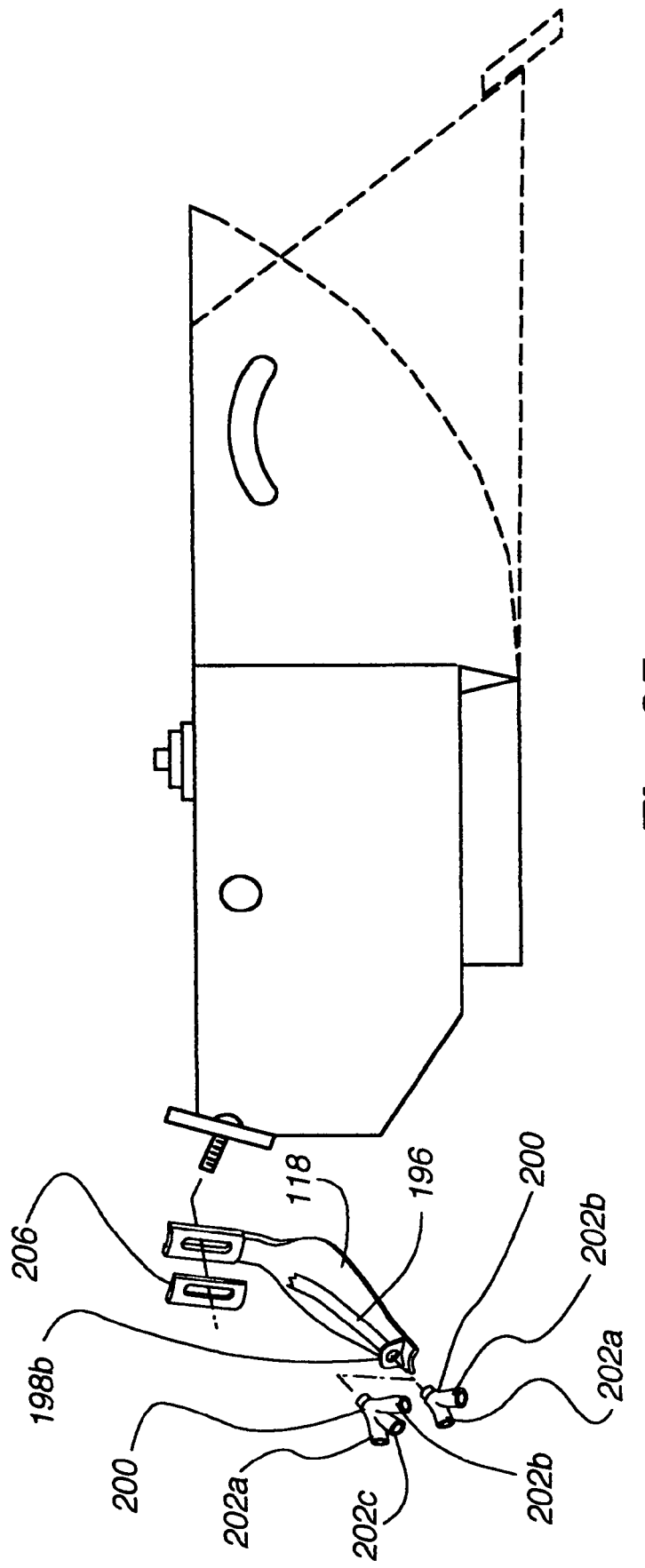
FIG. 35a illustrates an exploded perspective view of a Buffalo™ planter with one embodiment of an extension for reducing seed bounce attached thereto, the extension having an embodiment of the liquid distribution apparatus coupled therewith.
Figure 35C:
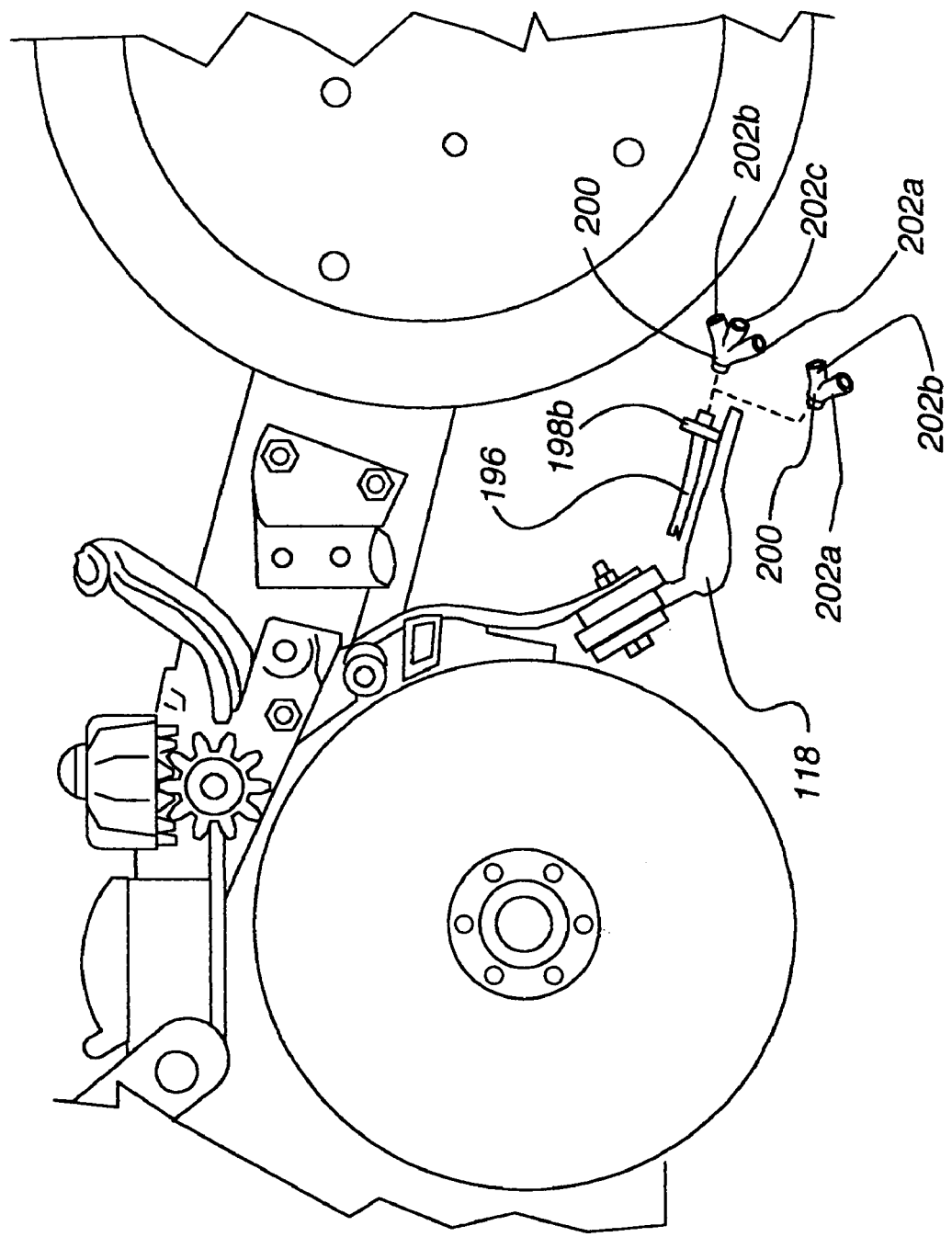
FIG. 35c illustrates a side view of a John Deere 71 Flex™ planter with one embodiment of an extension for reducing seed bounce attached thereto, the extension having an embodiment of the liquid distribution apparatus of the present invention coupled therewith.
Figure 35D:
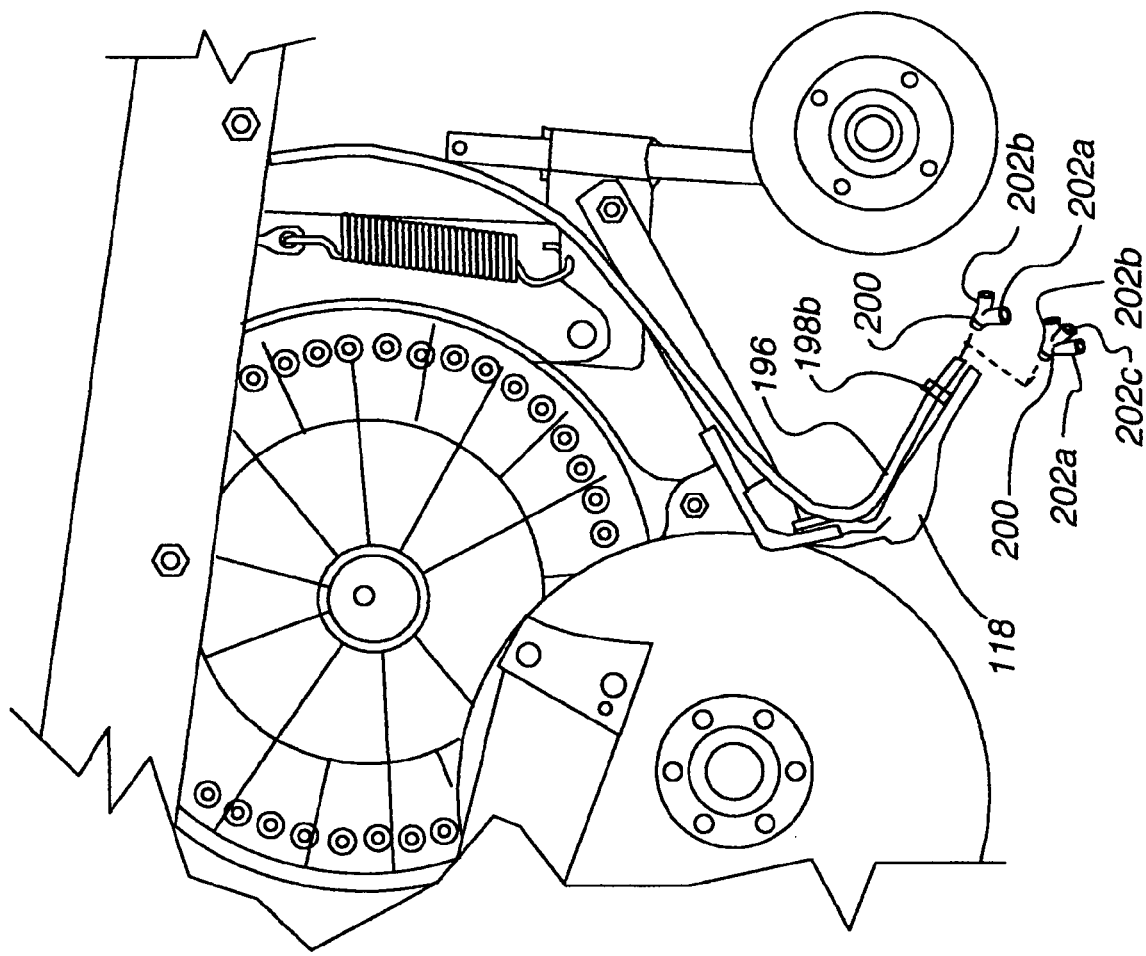
FIG. 35d illustrates a side view of an Allis Chalmers™ model 78 or 79 planter with one embodiment of an extension for reducing seed bounce attached thereto, the extension having an embodiment of the liquid distribution apparatus of the present invention coupled therewith.
Figure 35E:
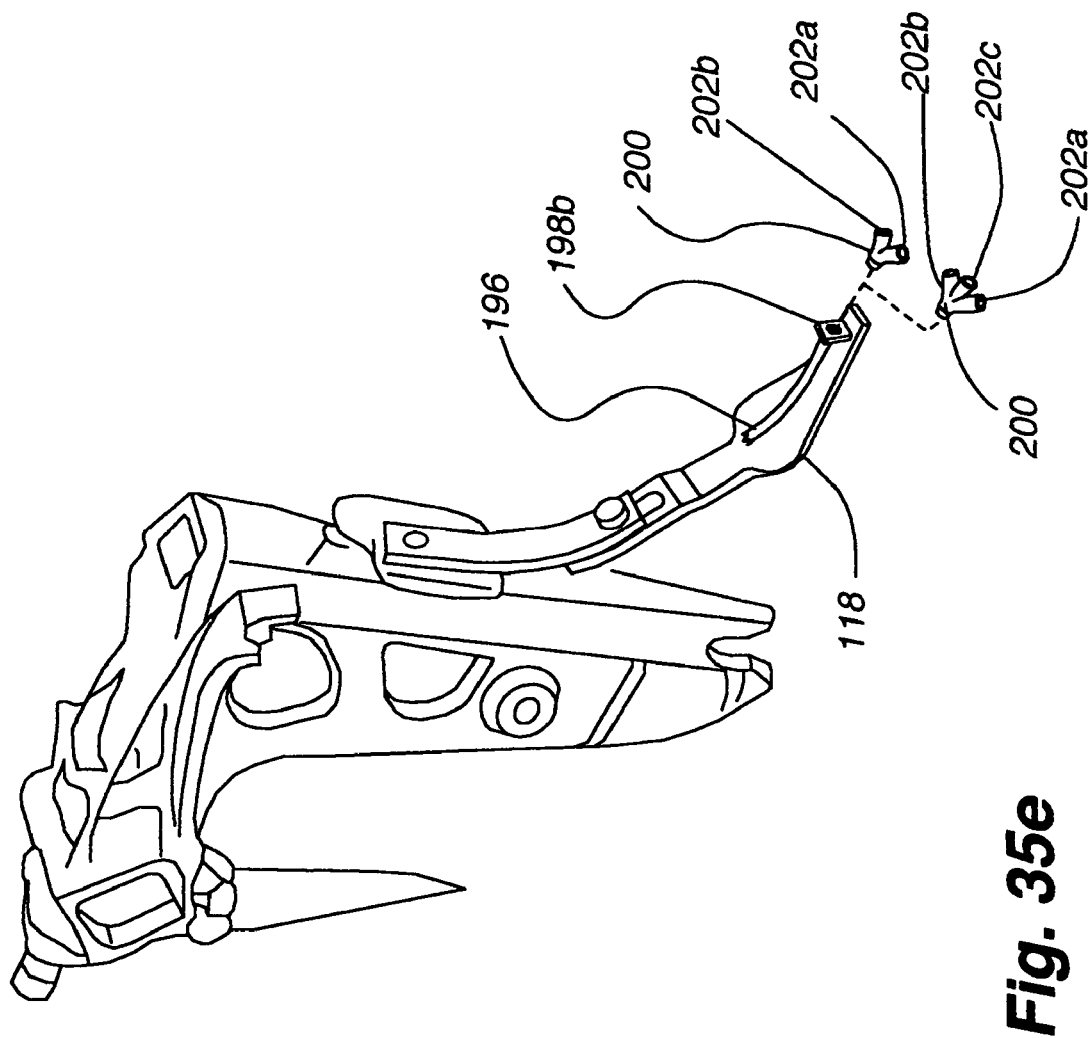
FIG. 35e illustrates a perspective view of Allis Chambers™ model 500 or 600 planter with one embodiment of an extension for reducing seed bounce attached thereto, the extension having an embodiment of the liquid distribution apparatus of the present invention coupled therewith.
Figure 35F:
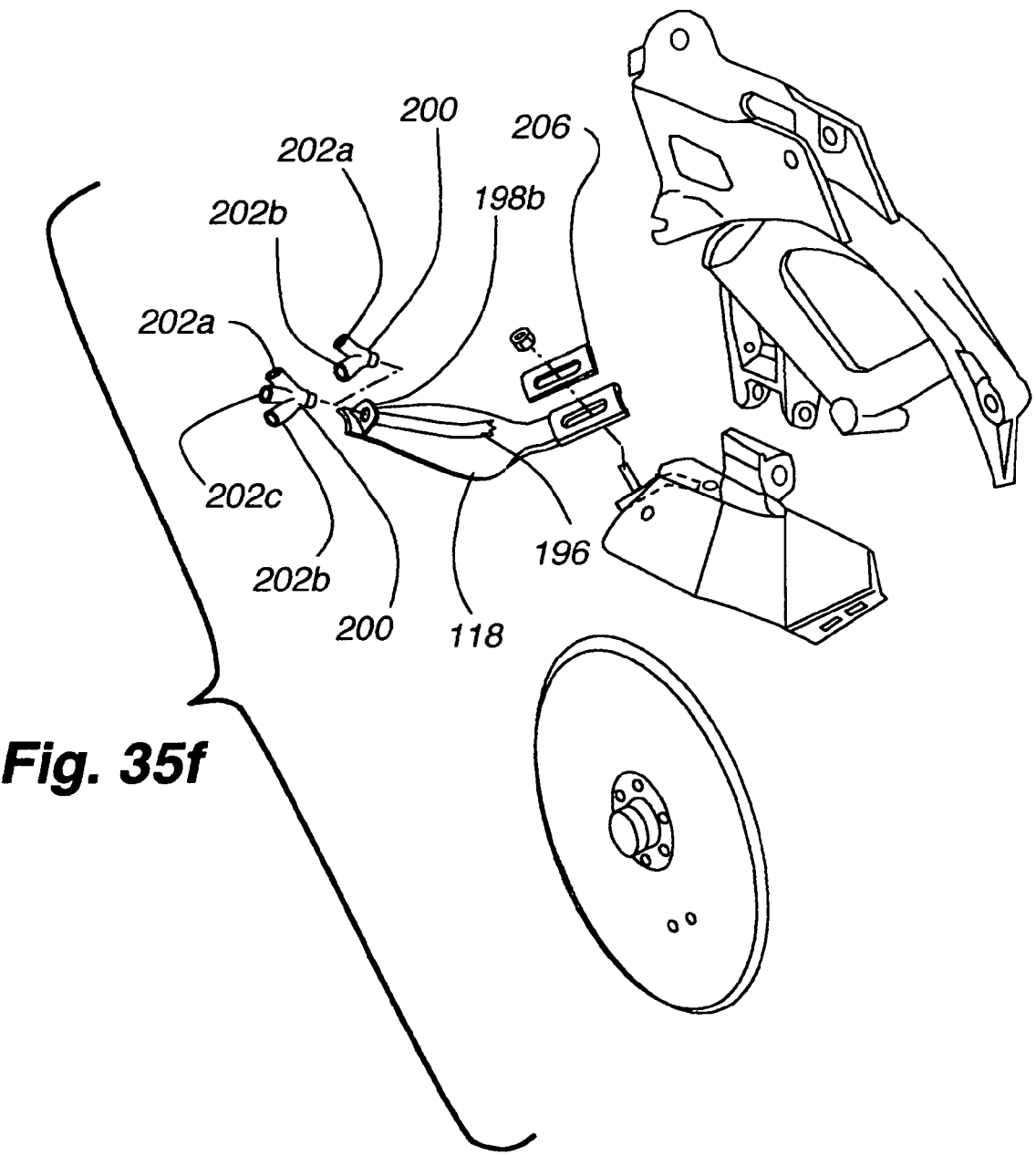
FIG. 35f illustrates an exploded perspective view of a Case IH™ model 400 or 500 planter having a boot with one embodiment of an extension for reducing seed bounce attached thereto, the extension having an embodiment of the liquid distribution apparatus of the present invention coupled therewith.
Figure 35I:
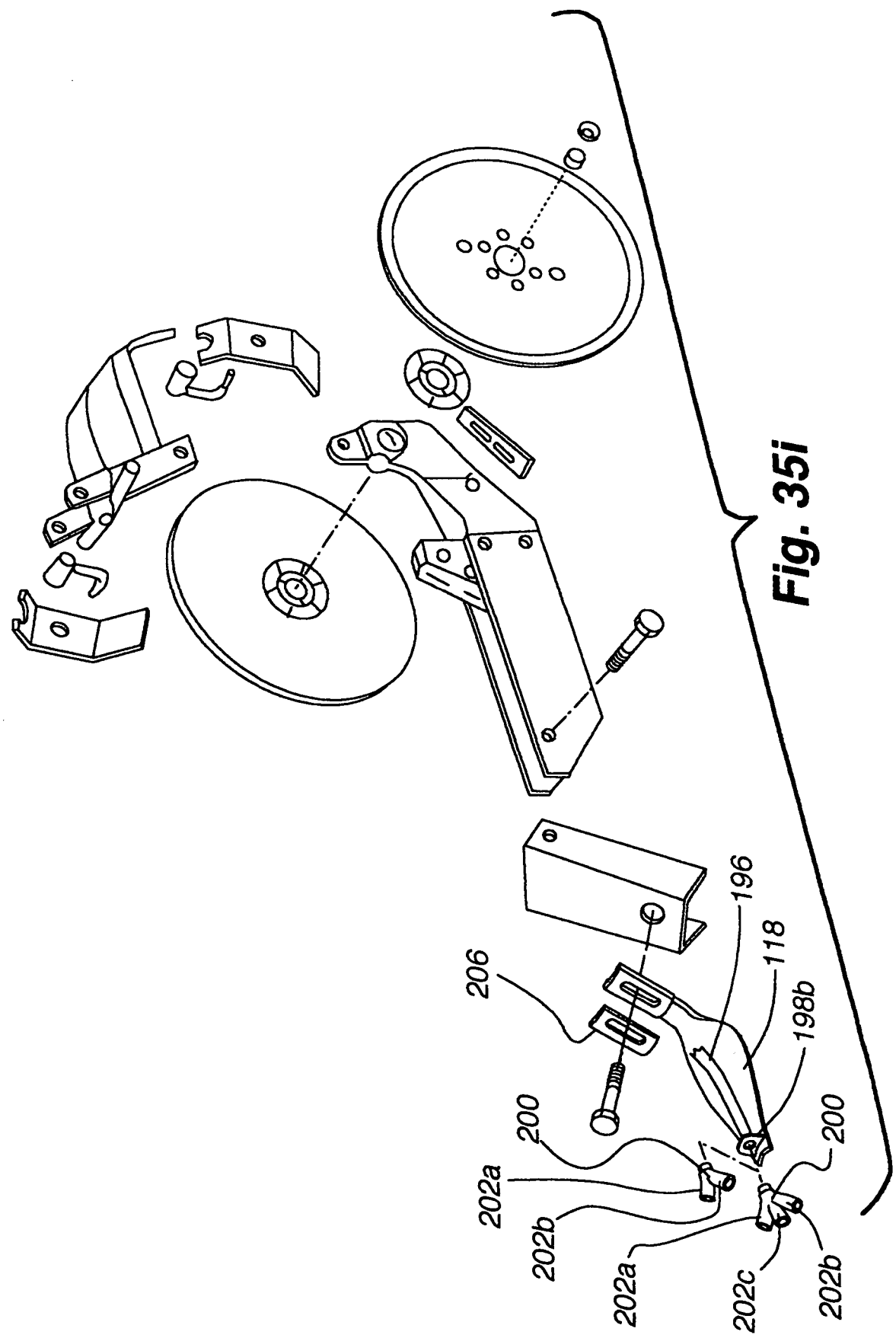
FIG. 35i illustrates and exploded view of a Case IH™ model 56 planter with one embodiment of an extension for reducing seed bounce attached thereto, the extension having an embodiment of the liquid distribution apparatus of the present invention coupled therewith.

Referring now to FIGS. 35a–35j various embodiment of the present invention are illustrated. FIG. 35a illustrates an exploded perspective view of a Buffalo™ planter with one embodiment of an extension for reducing seed bounce attached thereto. The extension, as shown, may have the two outlet or three outlet embodiment of the liquid distribution apparatus connected therewith. The liquid distribution apparatus being in fluid connection with the liquid supply hose. FIG. 35b illustrates an exploded perspective view of a Landoll Quadra™ planter with one embodiment of an extension for reducing seed bounce attached thereto. The extension, as shown, may have the two outlet or three outlet embodiment of the liquid distribution apparatus connected therewith. The liquid distribution apparatus being in fluid connection with the liquid supply hose. FIG. 35c illustrates a side view of a John Deere 71 Flex™ planter with one embodiment of an extension for reducing seed bounce attached thereto. The extension, as shown in FIG. 35c, may have the two outlet or three outlet embodiment of the liquid distribution apparatus connected therewith. The liquid distribution apparatus being in fluid connection with the liquid supply hose. FIG. 35d illustrates a side view of an Allis Chalmers™ model 78 or 79 planter with one embodiment of an extension for reducing seed bounce attached thereto. The extension, as shown in FIG. 35d, may have the two outlet or three outlet embodiment of the liquid distribution apparatus connected therewith. The liquid distribution apparatus being in fluid connection with the liquid supply hose. FIG. 35e illustrates a perspective view of Allis Chambers™ model 500 or 600 planter with one embodiment of an extension for reducing seed bounce attached thereto. The extension, as shown in FIG. 35e, may have the two outlet or three outlet embodiment of the liquid distribution apparatus connected therewith. The liquid distribution apparatus being in fluid connection with the liquid supply hose. FIG. 35f illustrates an exploded perspective view of a Case IH™ model 400 or 500 planter having a boot with one embodiment of an extension for reducing seed bounce attached thereto. The extension, as shown in FIG. 35f, may have the two outlet or three outlet embodiment of the liquid distribution apparatus connected therewith. The liquid distribution apparatus being in fluid connection with the liquid supply hose. FIG. 35g illustrates an exploded view of a Case IH™ model 400 or 500 planter having an Acra-Plant boot with one embodiment of an extension for reducing seed bounce attached thereto. The extension, as shown in FIG. 35f, may have the two outlet or three outlet embodiment of the liquid distribution apparatus connected therewith. The liquid distribution apparatus being in fluid connection with the liquid supply hose. FIG. 35h illustrates an exploded view of a Case IH™ 400 or 500 planter having an Acra-Plant runner with one embodiment of an extension for reducing seed bounce attached thereto. The extension, as shown in FIG. 35h, may have the two outlet or three outlet embodiment of the liquid distribution apparatus connected therewith. The liquid distribution apparatus being in fluid connection with the liquid supply hose. FIG. 35i illustrates and exploded view of a Case IH™ model 56 planter with one embodiment of an extension for reducing seed bounce attached thereto. The extension, as shown in FIG. 35i, may have the two outlet or three outlet embodiment of the liquid distribution apparatus connected therewith. The liquid distribution apparatus being in fluid connection with the liquid supply hose. FIG. 35j illustrates an exploded view of a Case IH™ 1200 ASM planter with an embodiment of the liquid distribution apparatus of the present invention attached thereto. The extension, as shown in FIG. 35j, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 35a–35j.

Figure 36A:
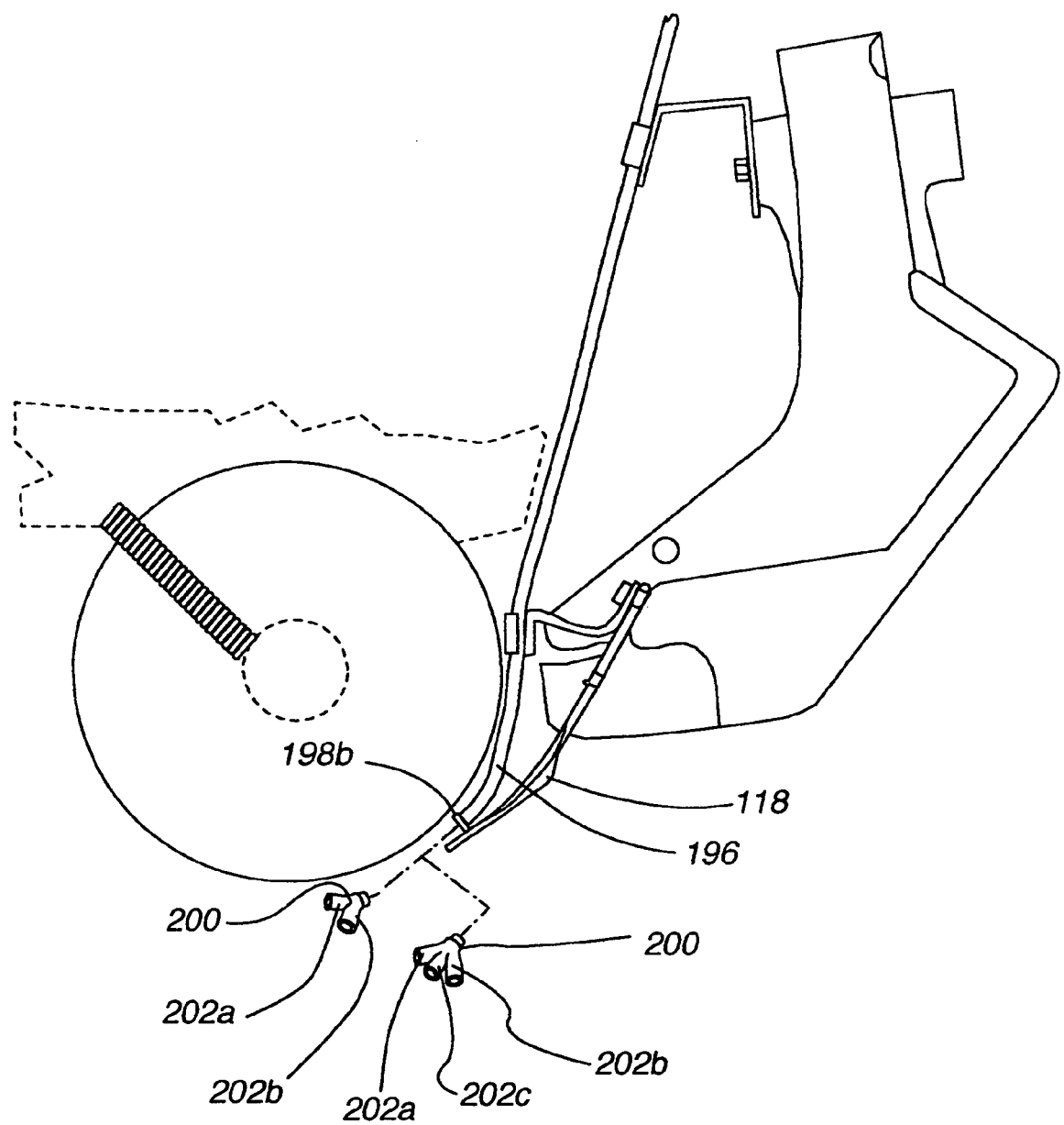
FIG. 36a illustrates a side view of a John Deere™ model 750 single disc drill with one embodiment of an extension for reducing seed bounce attached thereto, the extension having an embodiment of the liquid distribution apparatus of the present invention coupled therewith.
Figure 36B:
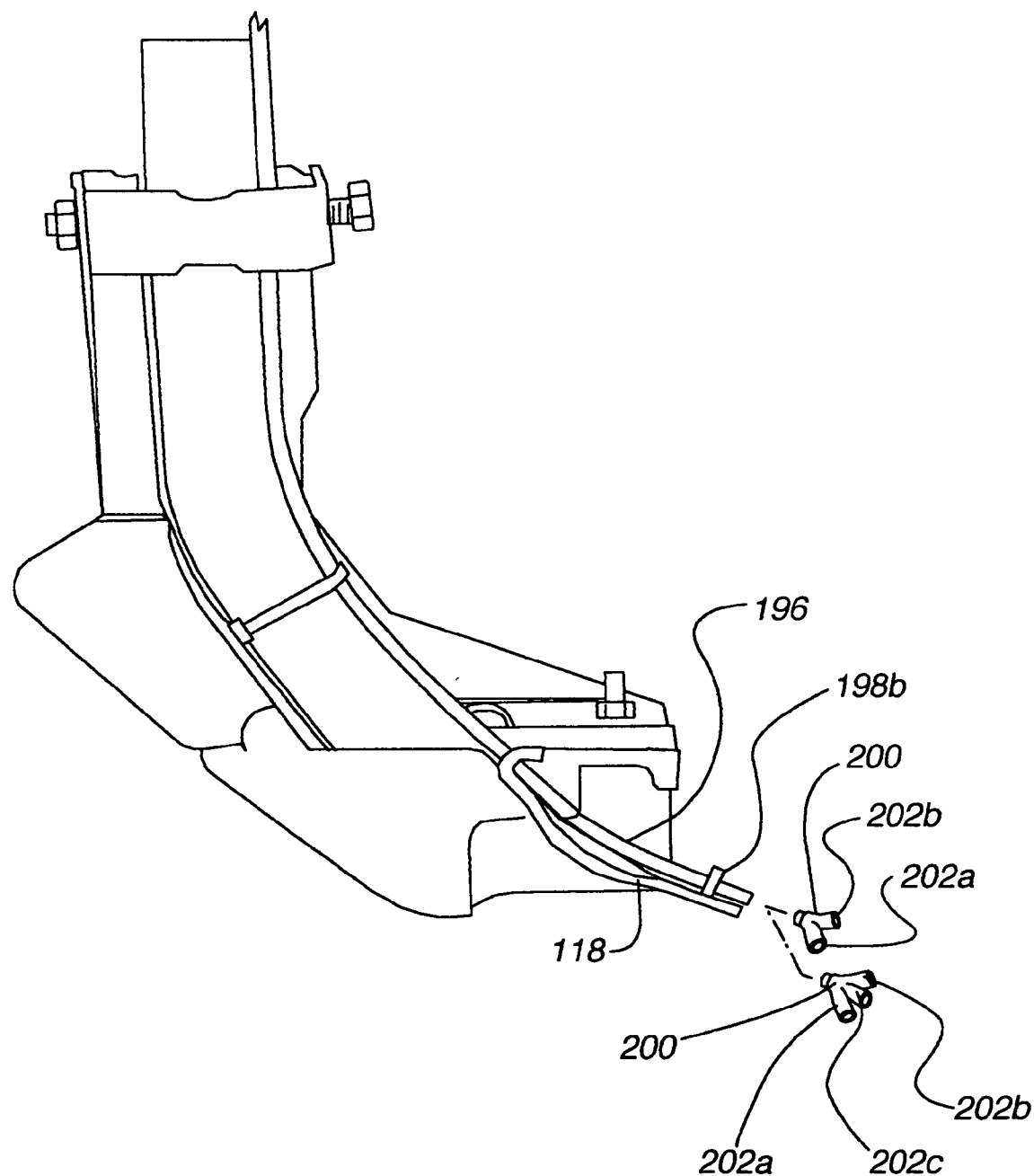
FIG. 36b illustrates a side view of a John Deere™ model 1560 or 1860 single disc drill with one embodiment of an extension for reducing seed bounce attached thereto, the extension having an embodiment of the liquid distribution apparatus of the present invention coupled therewith.
Figure 36C:
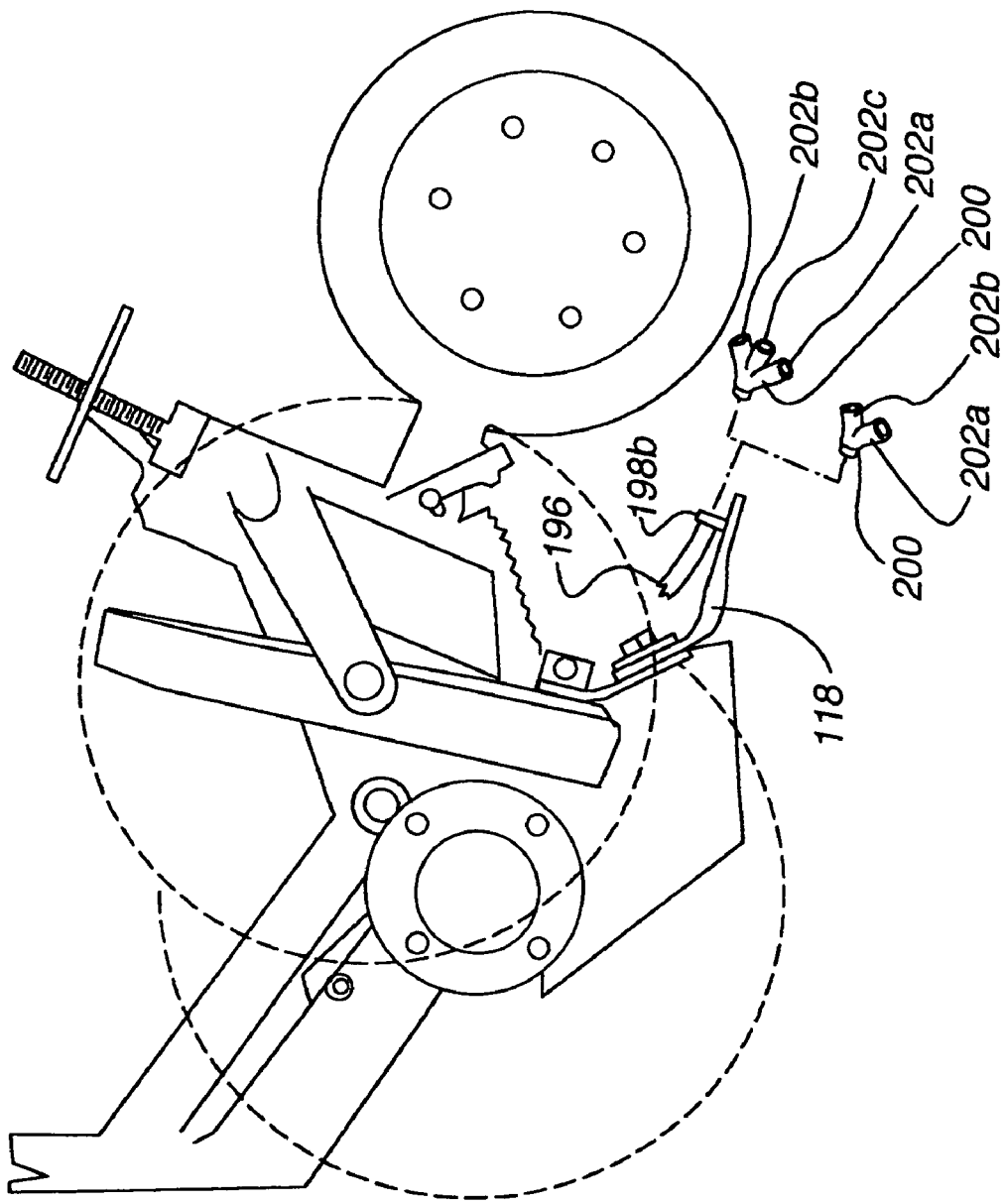
FIG. 36c illustrates a side view of a Flexi-Coil FSI™ single disc drill with one embodiment of an extension for reducing seed bounce attached thereto, the extension having an embodiment of the liquid distribution apparatus of the present invention coupled therewith.

Referring now to FIGS. 36a–36c various embodiments of the present invention are illustrated with single disc drills. FIG. 36a illustrates a side view of a John Deere™ model 750 single disc drill with one embodiment of an extension for reducing seed bounce attached thereto. The extension, as shown in FIG. 36a, may have the two outlet or three outlet embodiment of the liquid distribution apparatus connected therewith. The liquid distribution apparatus being in fluid connection with the liquid supply hose. FIG. 36b illustrates a side view of a John Deere™ model 1560 or 1860 single disc drill with one embodiment of an extension for reducing seed bounce attached thereto. The extension, as shown in FIG. 36b, may have the two outlet or three outlet embodiment of the liquid distribution apparatus connected therewith. The liquid distribution apparatus being in fluid connection with the liquid supply hose. FIG. 36c illustrates a side view of a Flexi-Coil FSI™ single disc drill with one embodiment of an extension for reducing seed bounce attached thereto. The extension, as shown in FIG. 36c, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 36a–36c.

Figure 37A:
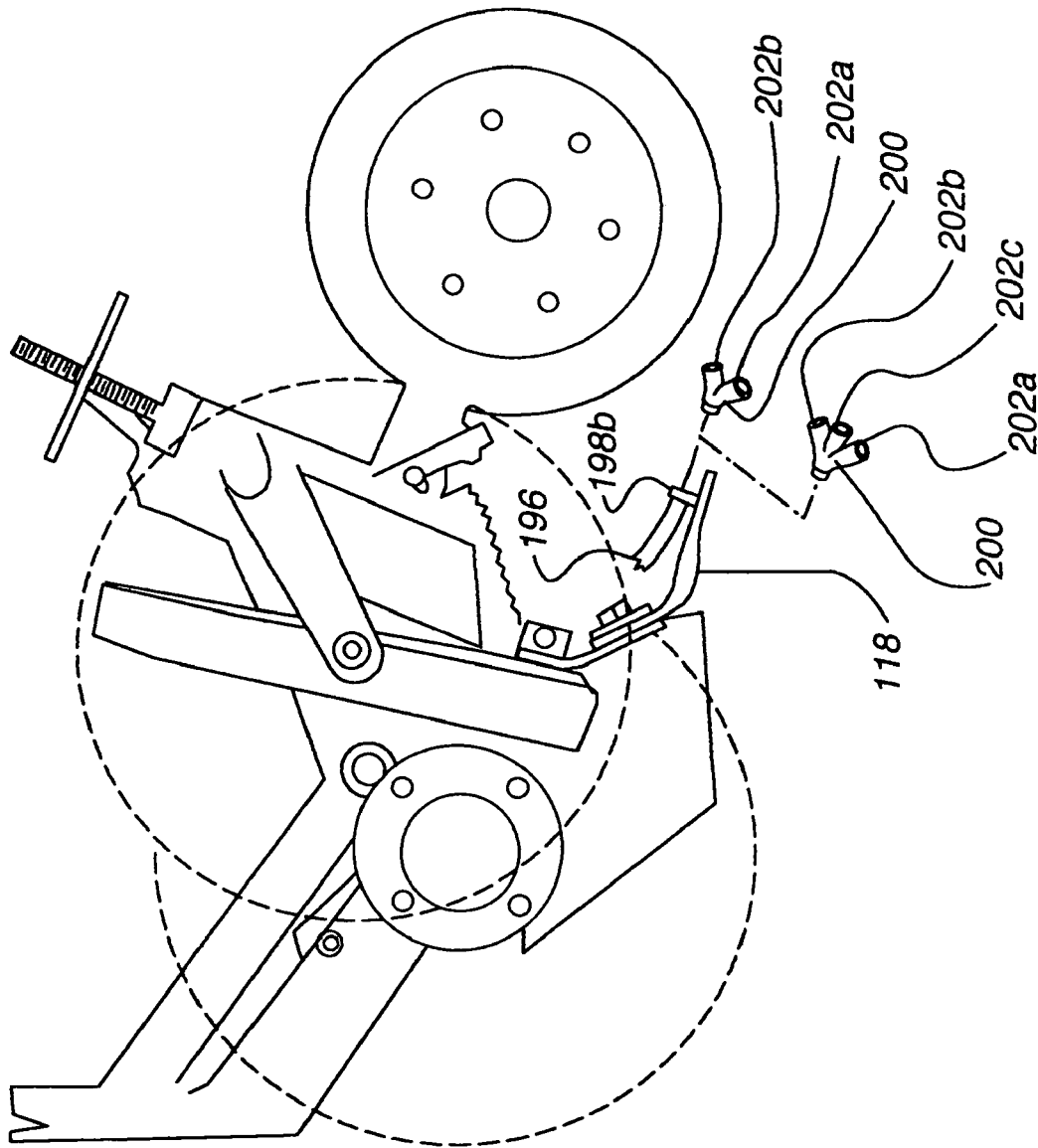
FIG. 37a illustrates a side view of a FSO™ single disc opener with one embodiment of an extension for reducing seed bounce attached thereto, the extension having an embodiment of the liquid distribution apparatus of the present invention coupled therewith.
Figure 37B:
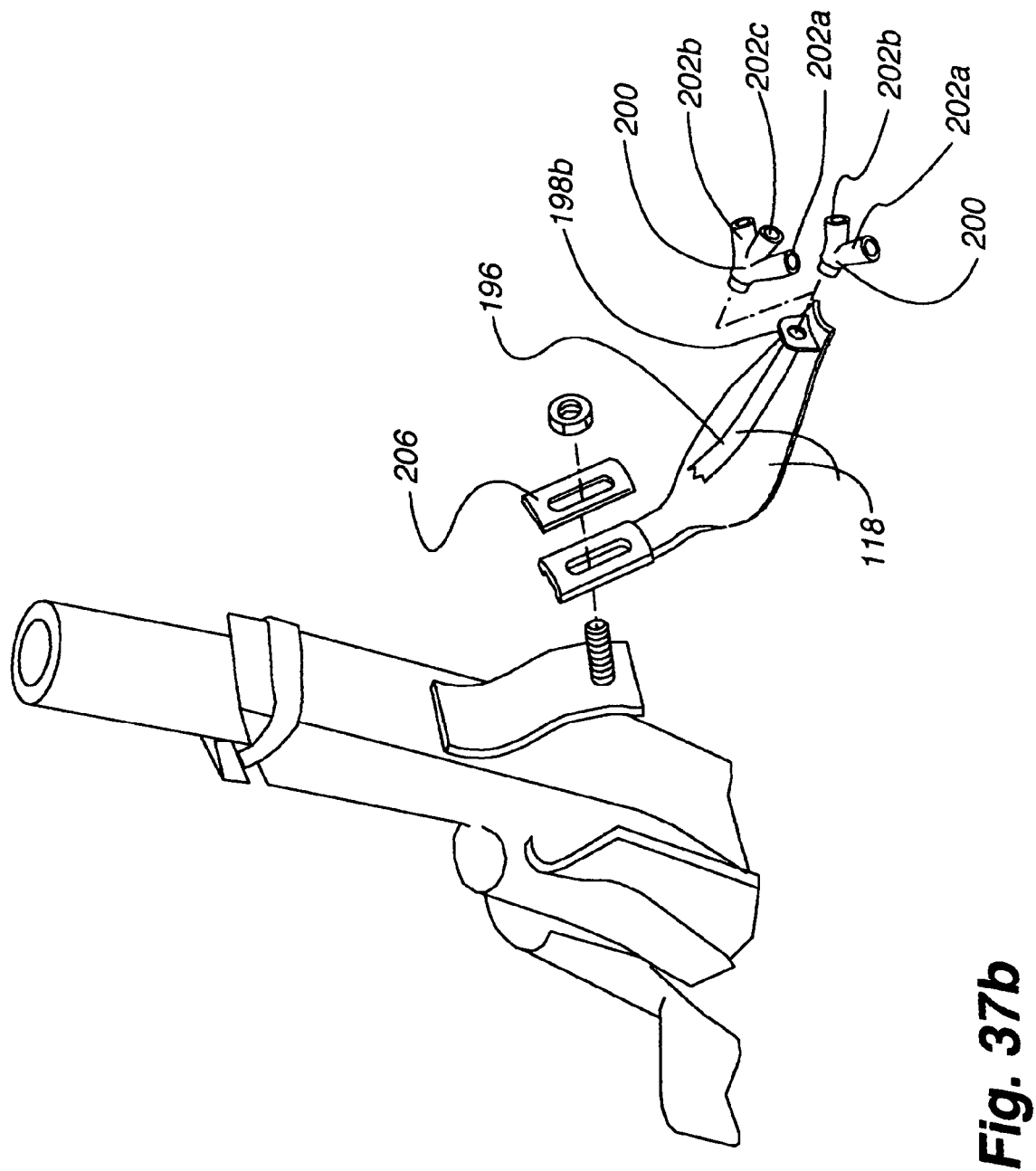
FIG. 37b illustrates a side view of a banding and spreading boot with an embodiment of the liquid distribution apparatus of the present invention attached therewith.
Figure 37C:
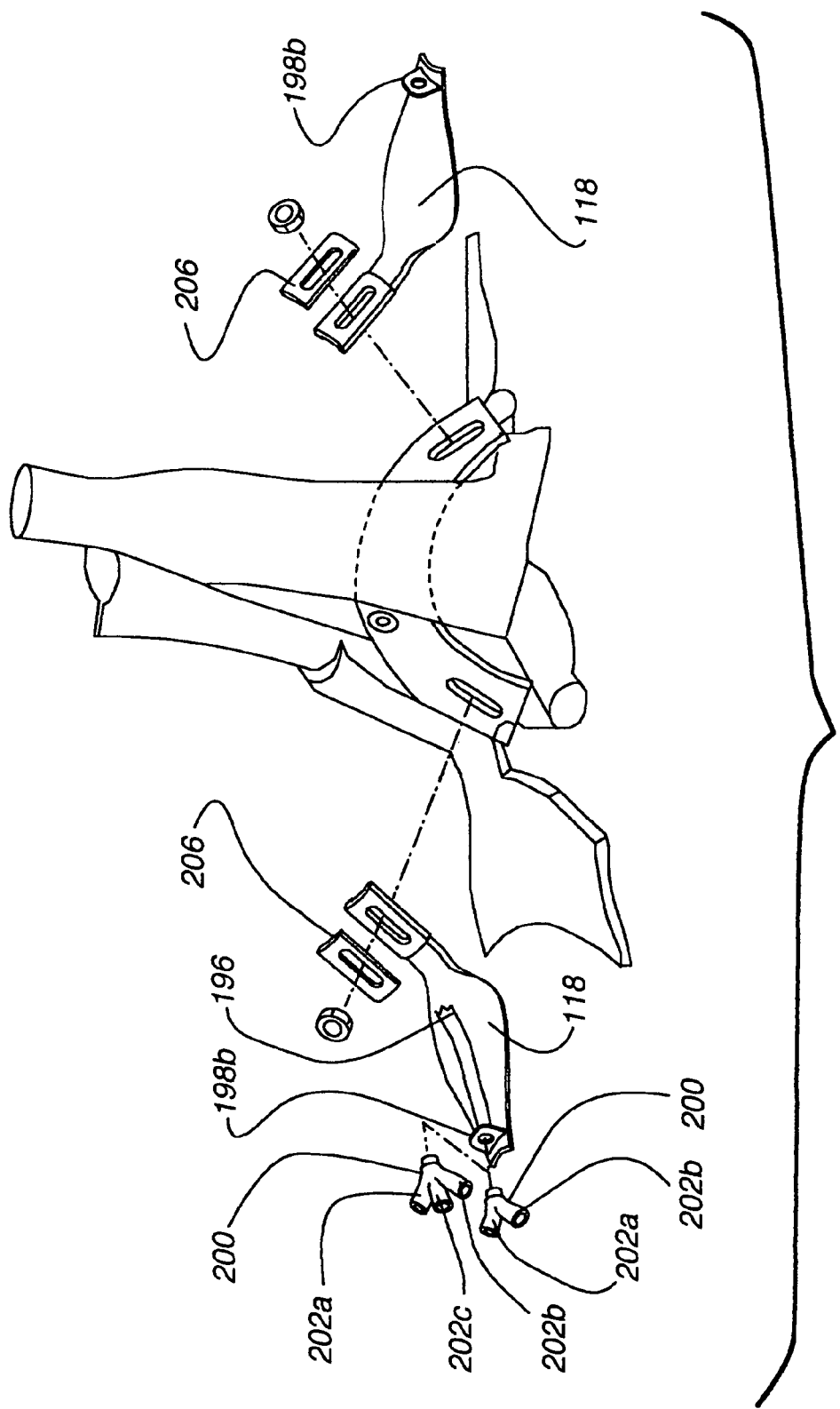
FIG. 37c illustrates a side view of a paired row boot having a shoe with one embodiment of an extension for reducing seed bounce attached thereto, the extension having an embodiment of the liquid distribution apparatus of the present invention coupled therewith.
Figure 37D:
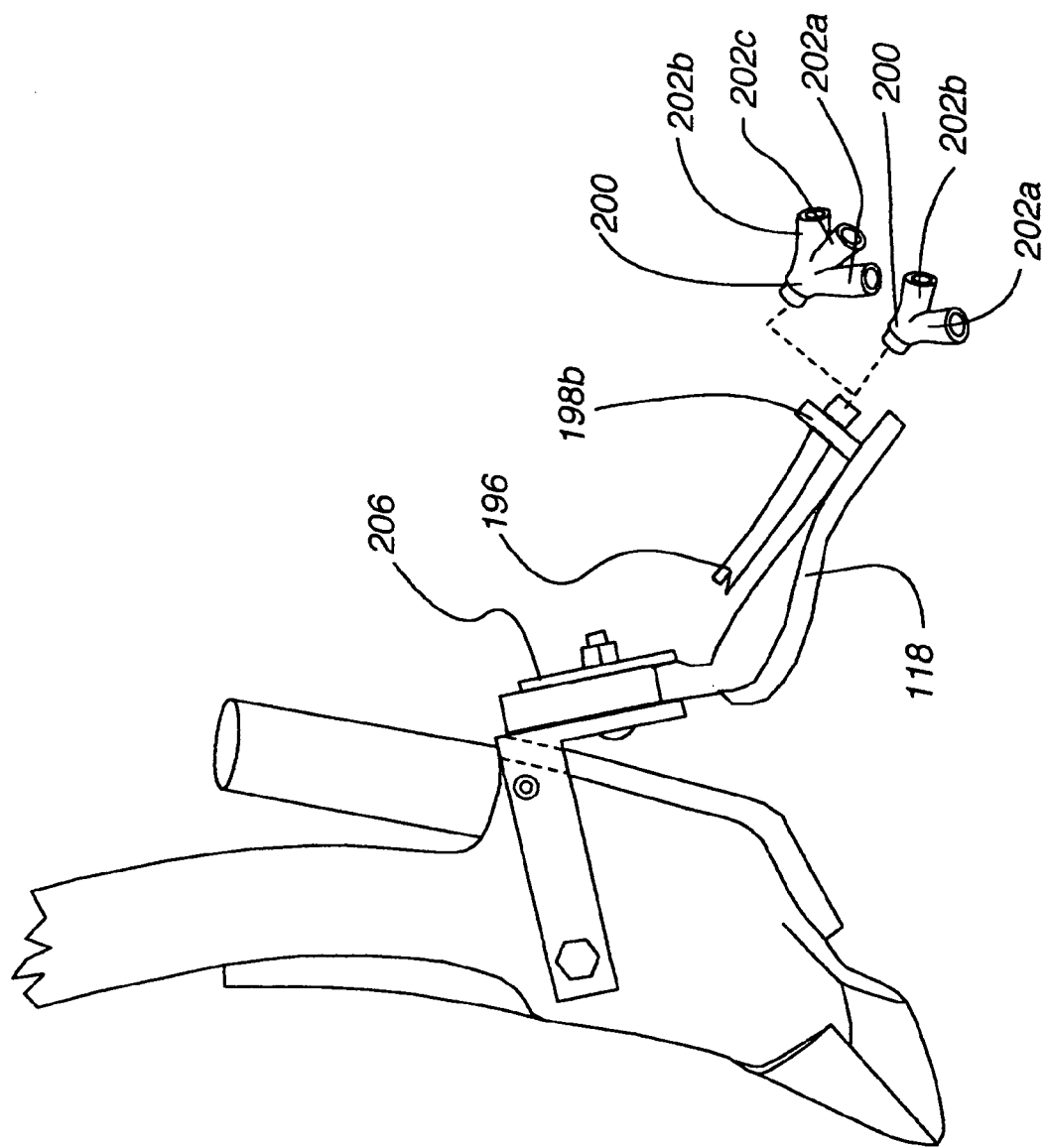
FIG. 37d illustrates a side view of an eagle beak having a boot with one embodiment of an extension for reducing seed bounce attached thereto, the extension having an embodiment of the liquid distribution apparatus of the present invention coupled therewith.

Referring now to FIGS. 37a–37d various embodiment of the present invention are illustrated with various single disc openers. FIG. 37a illustrates a side view of a FSO™ single disc opener with one embodiment of an extension for reducing seed bounce attached thereto. The extension, as shown in FIG. 37a, may have the two outlet or three outlet embodiment of the liquid distribution apparatus connected therewith. The liquid distribution apparatus being in fluid connection with the liquid supply hose. FIG. 37b illustrates a side view of a banding and spreading boot with an embodiment of the liquid distribution apparatus of the present invention attached therewith. The extension, as shown in FIG. 37b, may have the two outlet or three outlet embodiment of the liquid distribution apparatus connected therewith. The liquid distribution apparatus being in fluid connection with the liquid supply hose. FIG. 37c illustrates a side view of a paired row boot having a shoe with one embodiment of an extension for reducing seed bounce attached thereto. The extension, as shown in FIG. 37c, may have the two outlet or three outlet embodiment of the liquid distribution apparatus connected therewith. The liquid distribution apparatus being in fluid connection with the liquid supply hose. FIG. 37d illustrates a side view of an eagle beak having a boot with one embodiment of an extension for reducing seed bounce attached thereto. The extension, as shown in FIG. 37d, may have the two outlet or three outlet embodiment of the liquid distribution apparatus connected therewith. The liquid distribution apparatus being in fluid connection with the liquid supply hose. Additionally, a diverter may be used along with any of the embodiments shown in FIGS. 37a–37d.

Figure 38A:
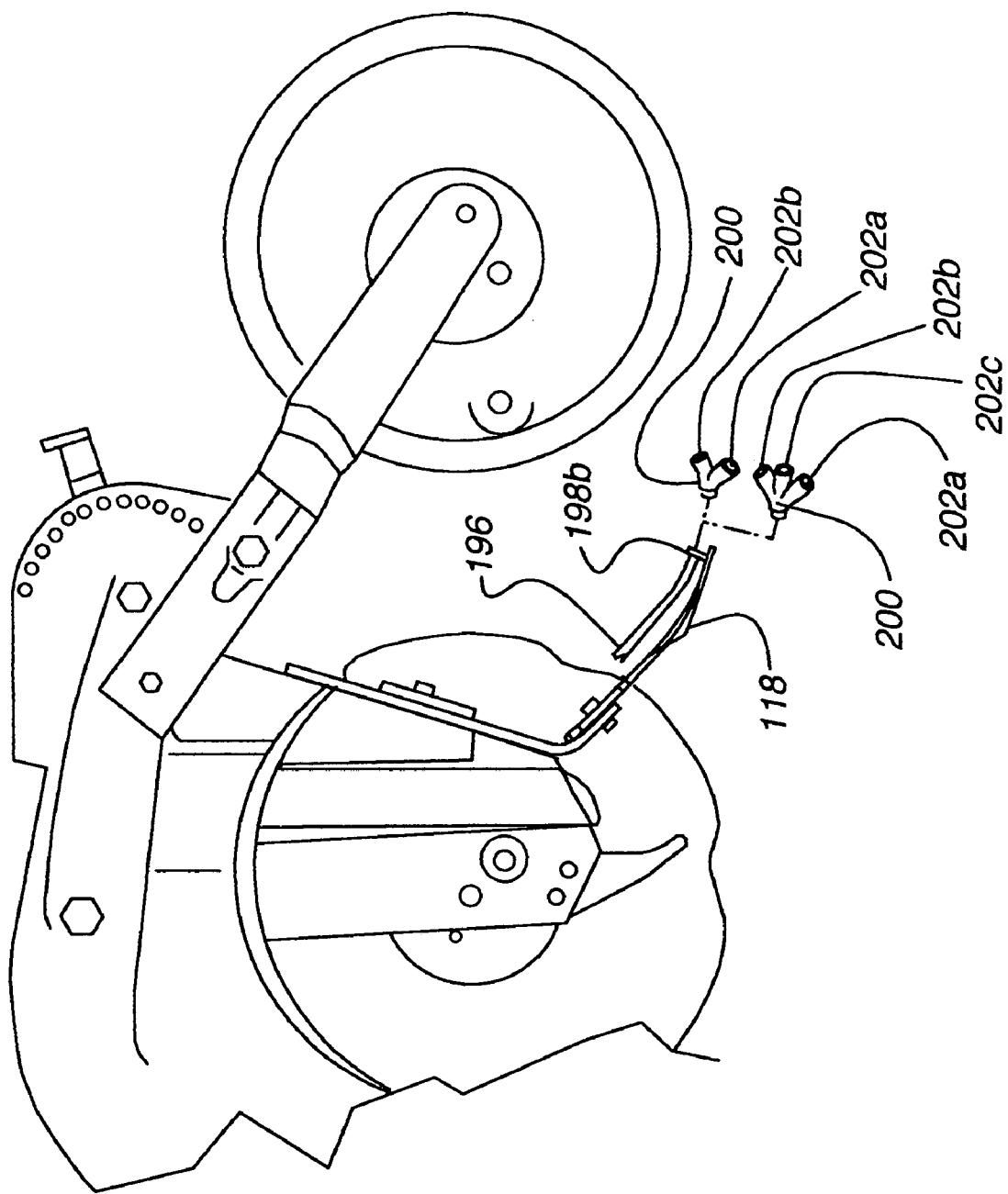
FIG. 38a illustrates a side view of a Krause™ model 5400 double disc drill with one embodiment of an extension for reducing seed bounce attached thereto, the extension having an embodiment of the liquid distribution apparatus of the present invention coupled therewith.
Figure 38B:
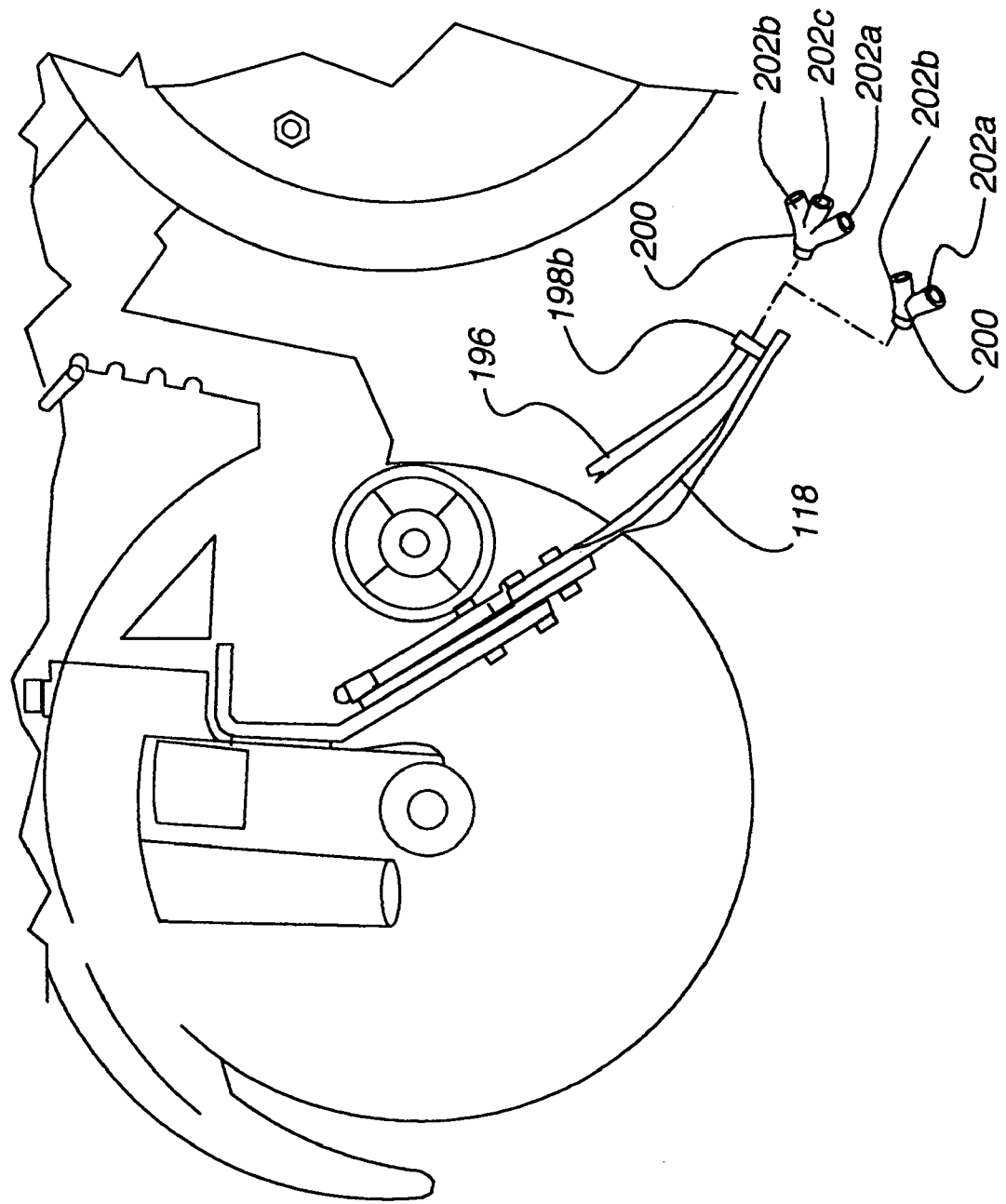
FIG. 38b illustrates a side view of a Krause™ model 5200, 5250 or 5500 double disc drill with one embodiment of an extension for reducing seed bounce attached thereto, the extension having an embodiment of the liquid distribution apparatus of the present invention coupled therewith.
Figure 38C:
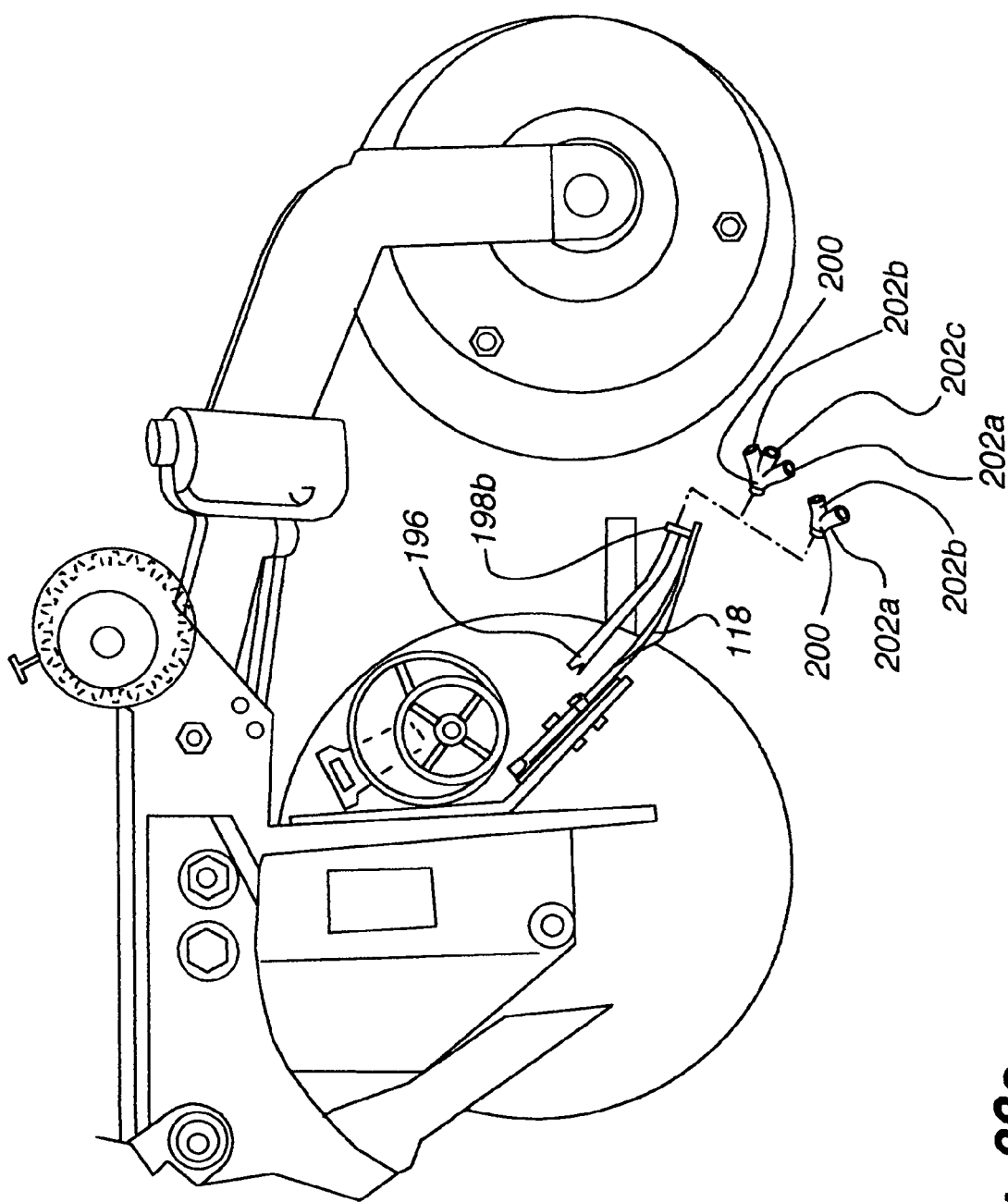
FIG. 38c illustrates a side view of a Sunflower™ double disc drill with one embodiment of an extension for reducing seed bounce attached thereto, the extension having an embodiment of the liquid distribution apparatus of the present invention coupled therewith.
Figure 38D:
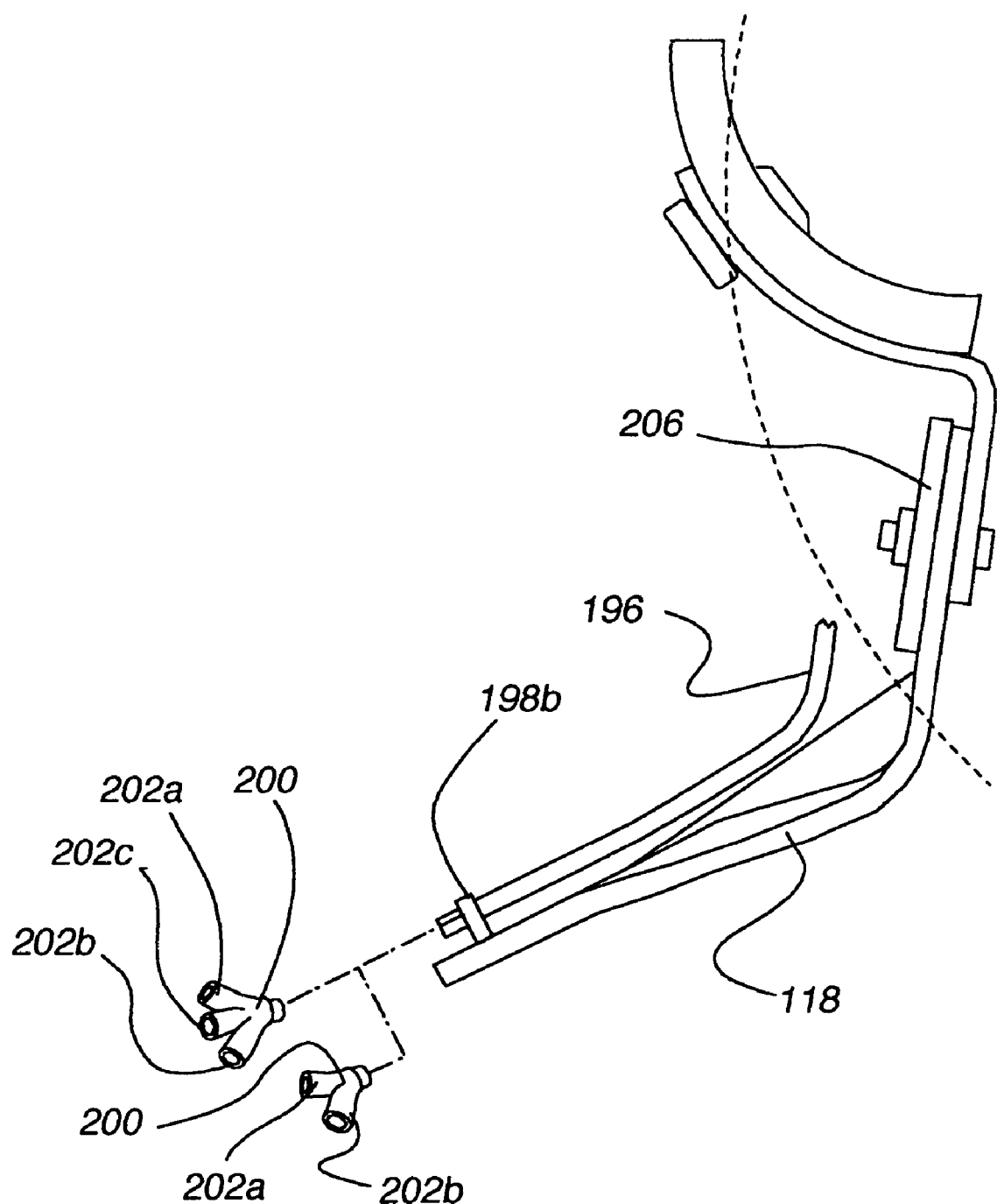
FIG. 38d illustrates a side view of a Tye™ double disc drill with one embodiment of an extension for reducing seed bounce attached therewith, the extension having an embodiment of the liquid distribution apparatus of the present invention coupled therewith.
Figure 38E:
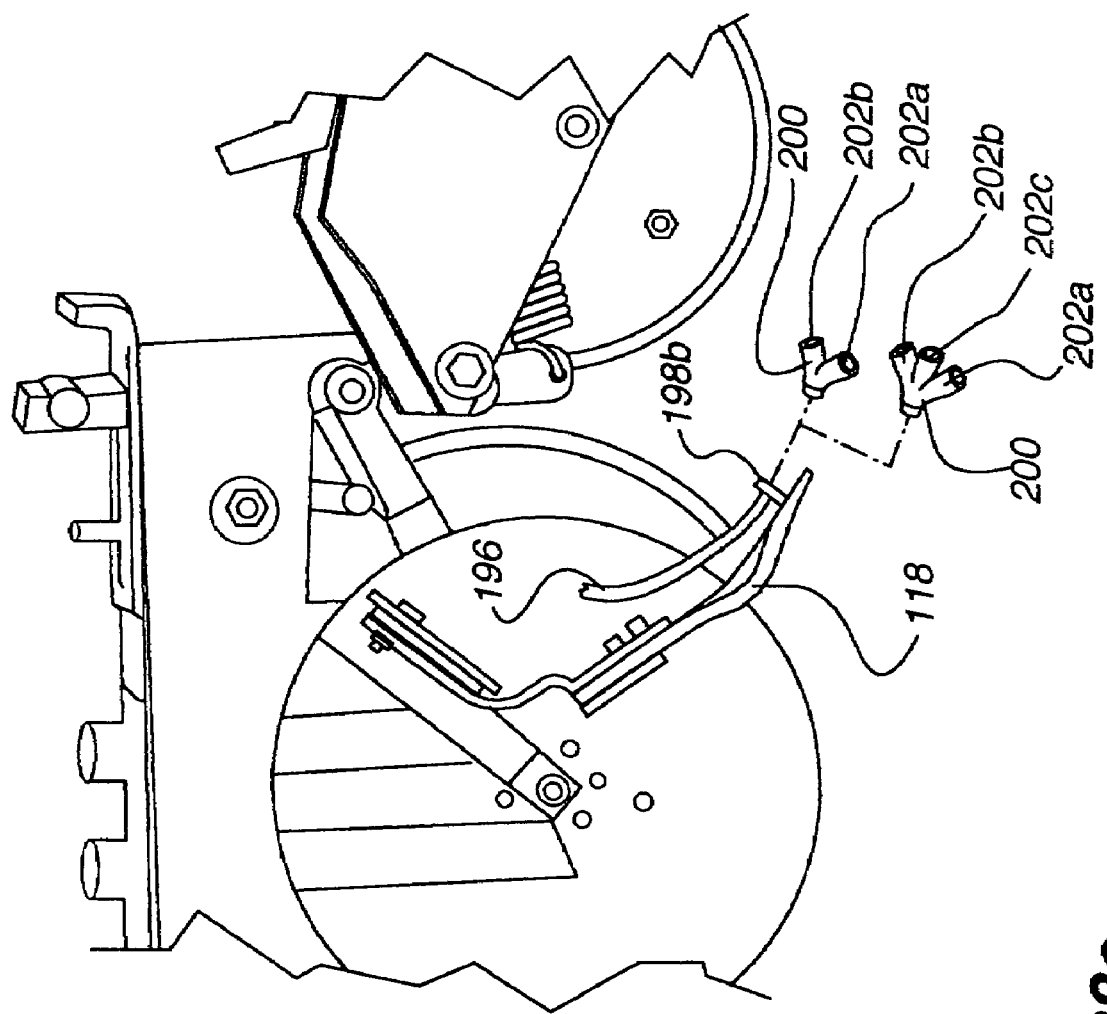
FIG. 38e illustrates a side view of a Tye™ soybean/rice double disc drill with one embodiment of an extension for reducing seed bounce attached therewith, the extension having an embodiment of the liquid distribution apparatus of the present invention coupled therewith.
Figure 38F:
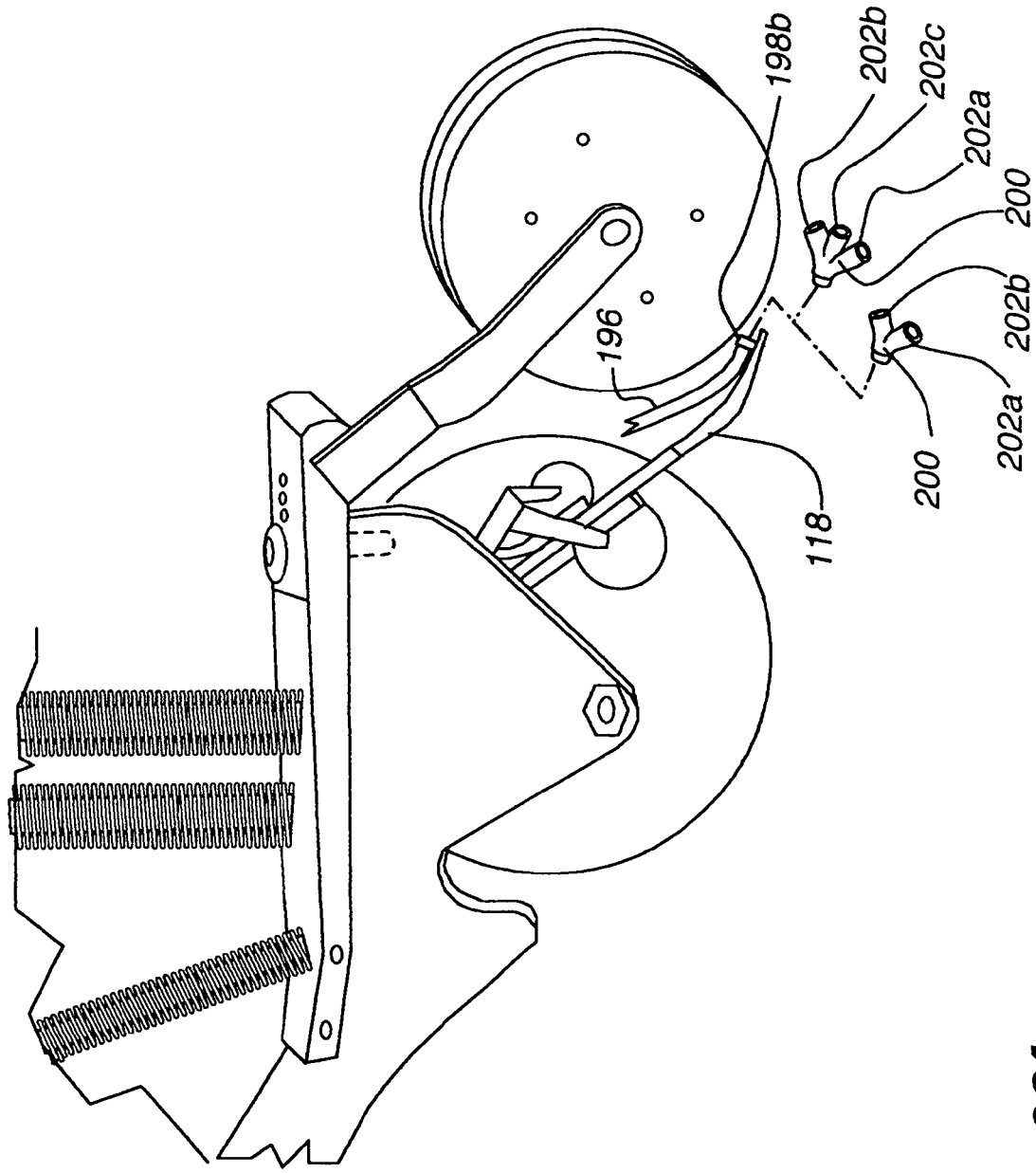
FIG. 38f illustrates a side view of a UFT™ double disc drill with one embodiment of an extension for reducing seed bounce attached therewith, the extension having an embodiment of the liquid distribution apparatus of the present invention coupled therewith.
Figure 38G:
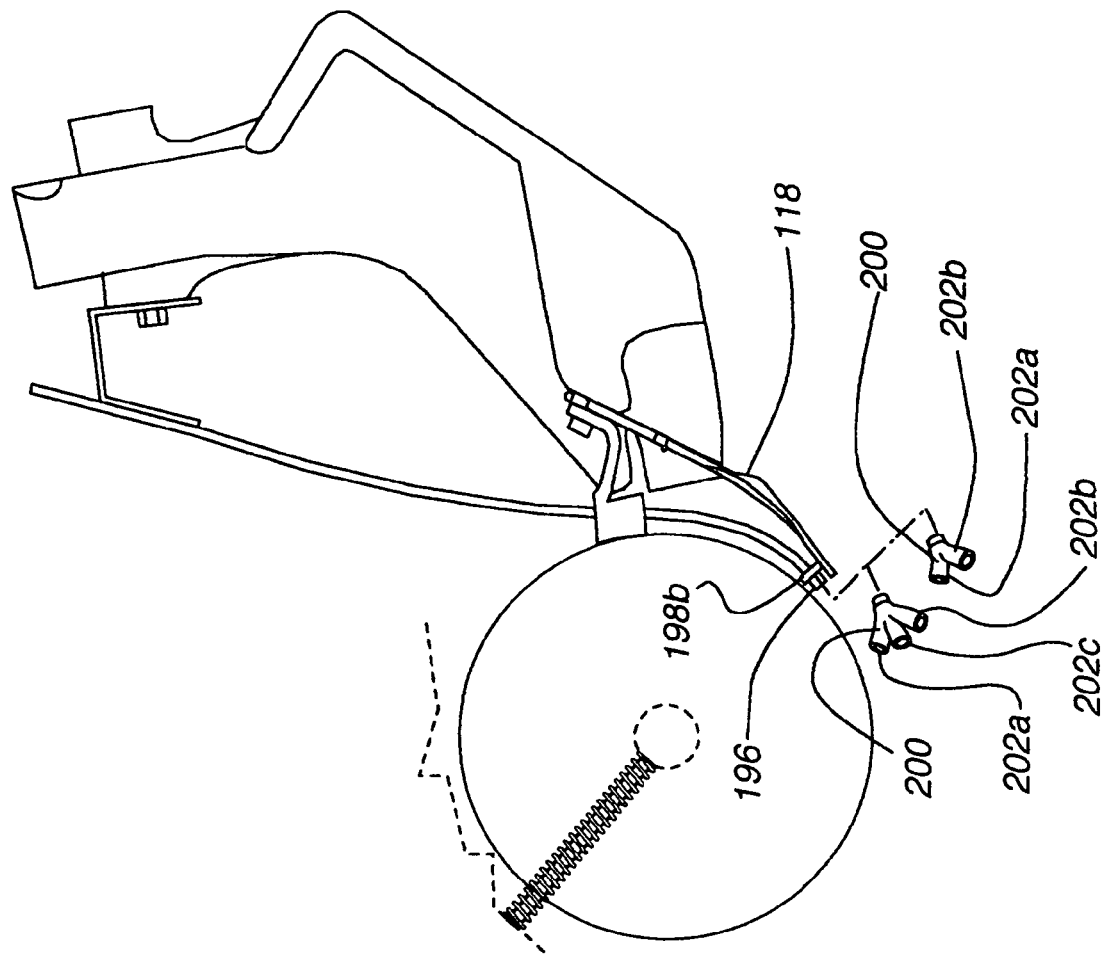
FIG. 38g illustrates a side view of a John Deere™ model 750 double disc drill with one embodiment of an extension for reducing seed bounce attached therewith, the extension having an embodiment of the liquid distribution apparatus of the present invention coupled therewith.
Figure 38H:
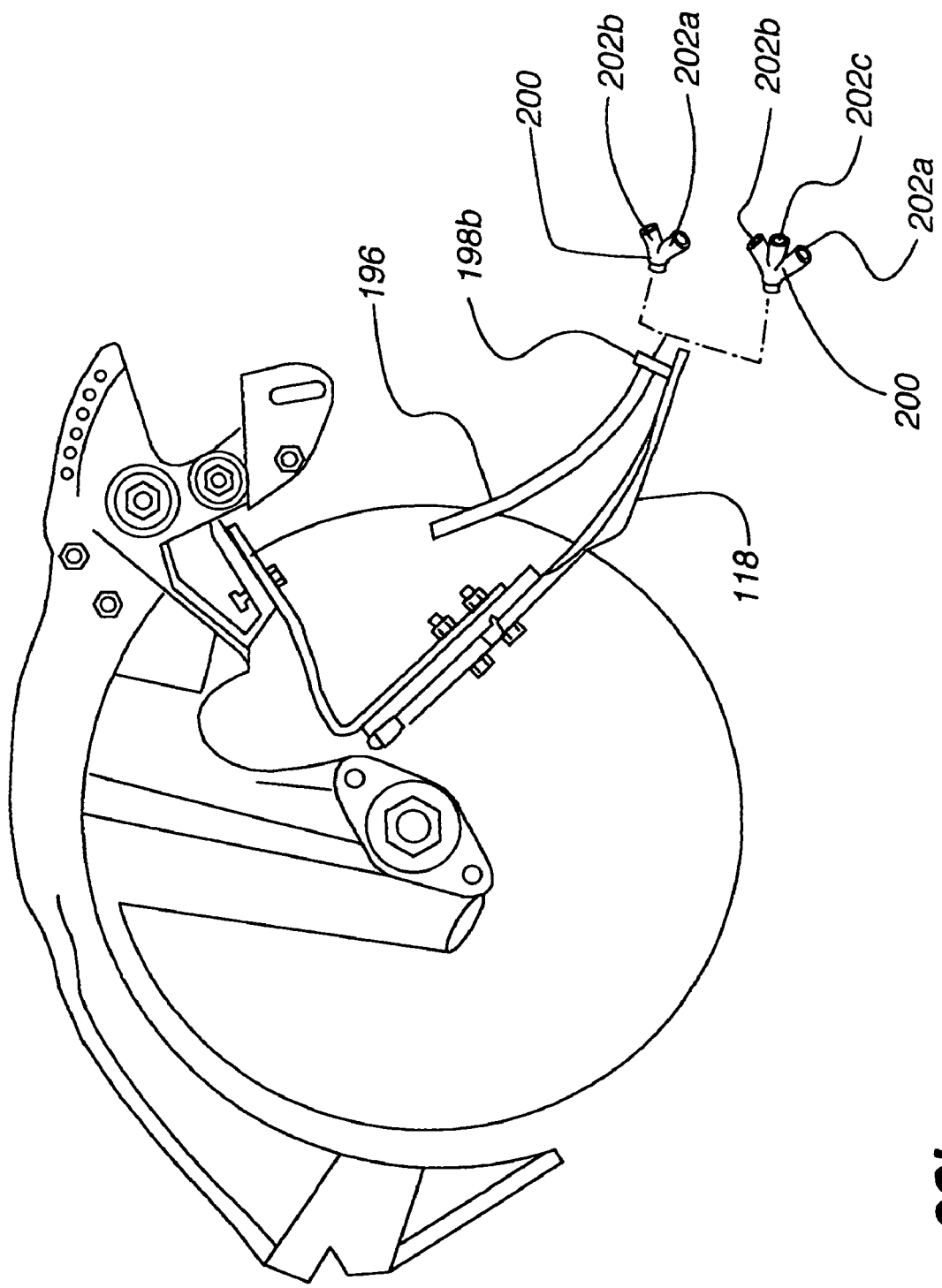
FIG. 38h illustrates a side view of a John Deere™ model 455, 515 or 8300 double disc drill having gauge wheels mounted along side the double disc openers with an embodiment of the liquid distribution apparatus of the present invention attached therewith.
Figure 38I:
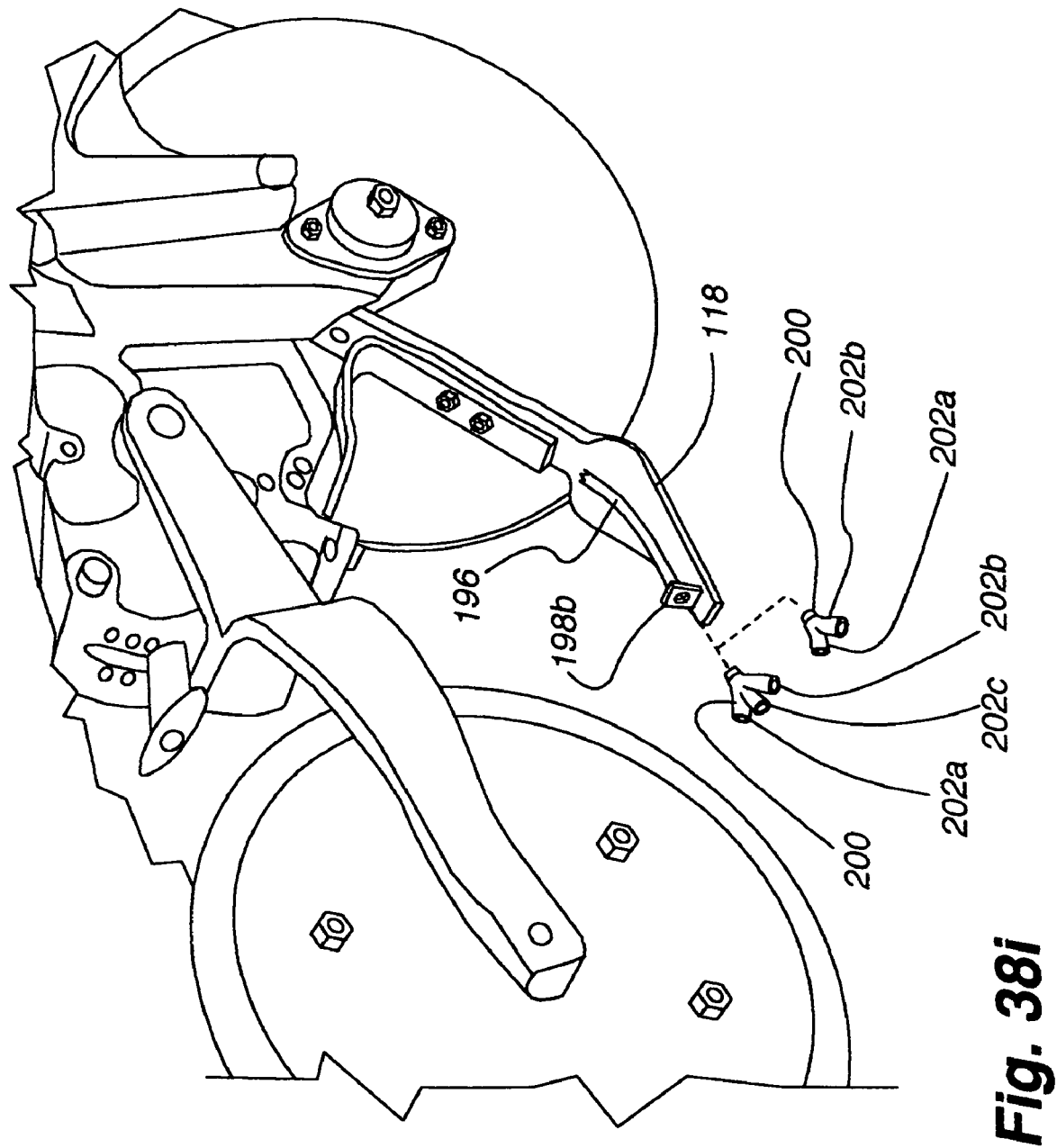
FIG. 38i illustrates a John Deere™ model 455, 515 or 8300 double disc drill having single or double press wheels with an embodiment of the liquid distribution apparatus of the present invention attached therewith.
Figure 38K:
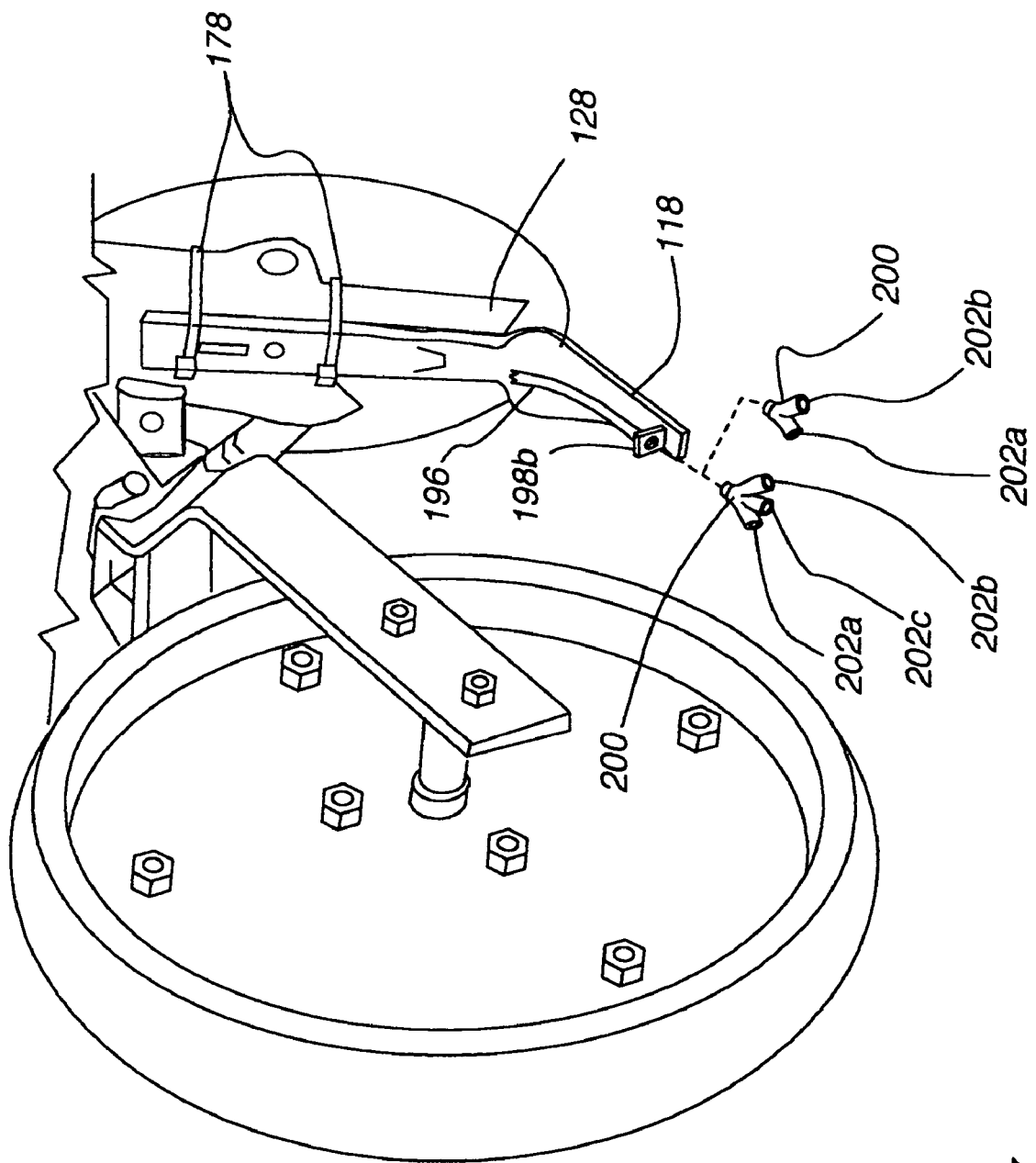
FIG. 38k illustrates a Marliss™ double disc drill with an embodiment of the liquid distribution apparatus of the present invention attached therewith.
Figure 38L:
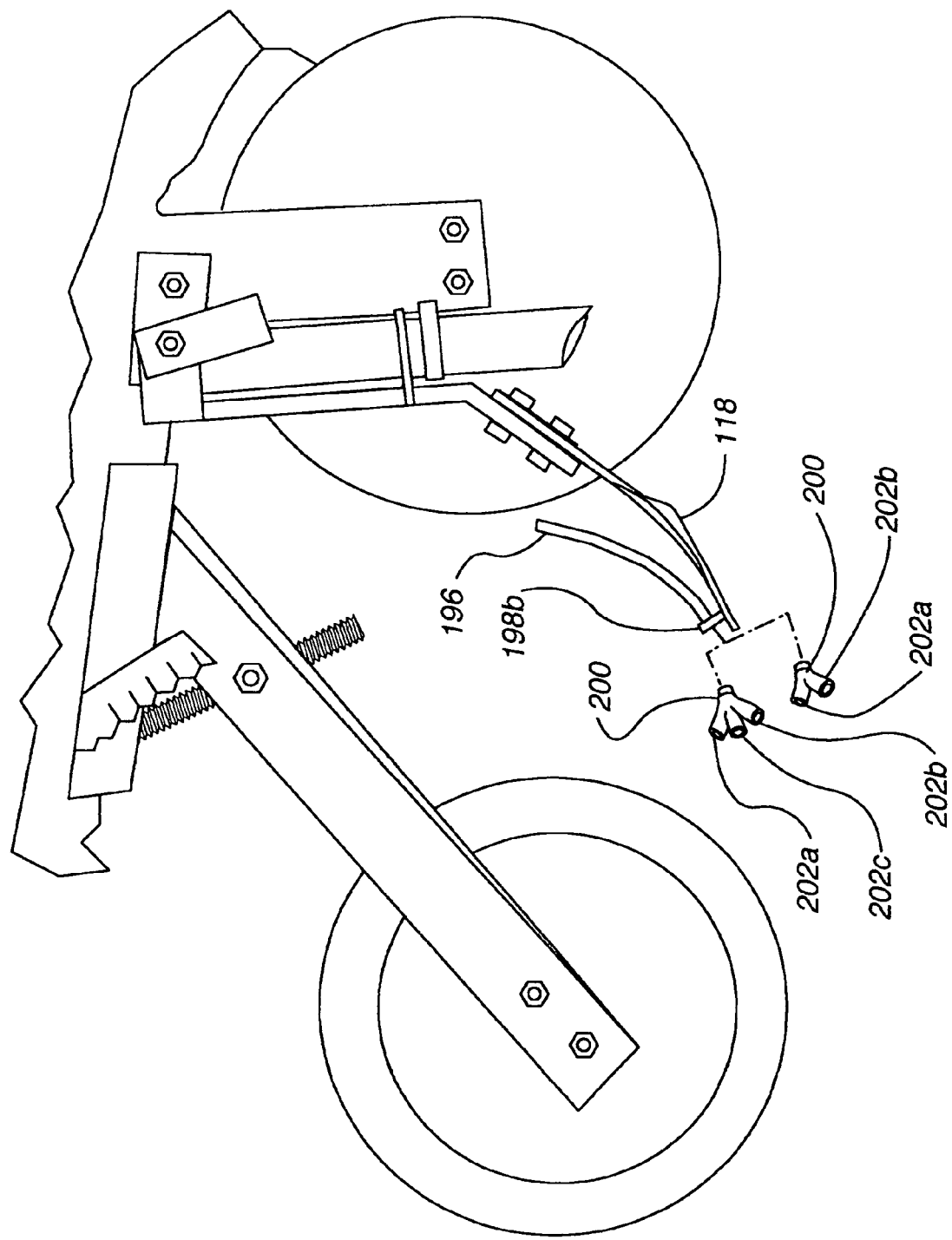
FIG. 38l illustrates a Best™ double disc drill with an embodiment of the liquid distribution apparatus of the present invention attached therewith.
Figure 38M:
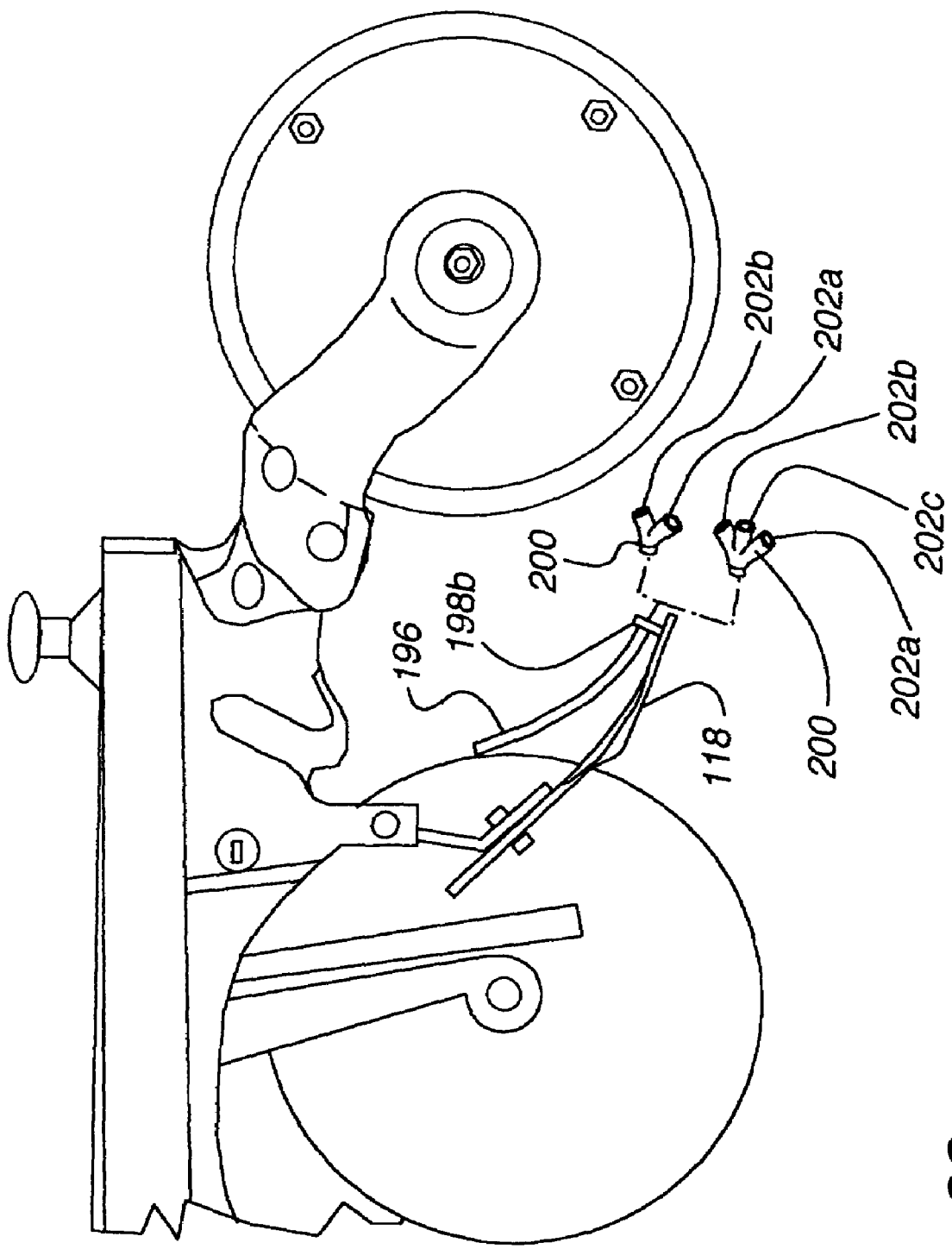
FIG. 38m illustrates a Great Plains™ double disc drill with an embodiment of the liquid distribution apparatus of the present invention attached therewith.
Figure 38N:
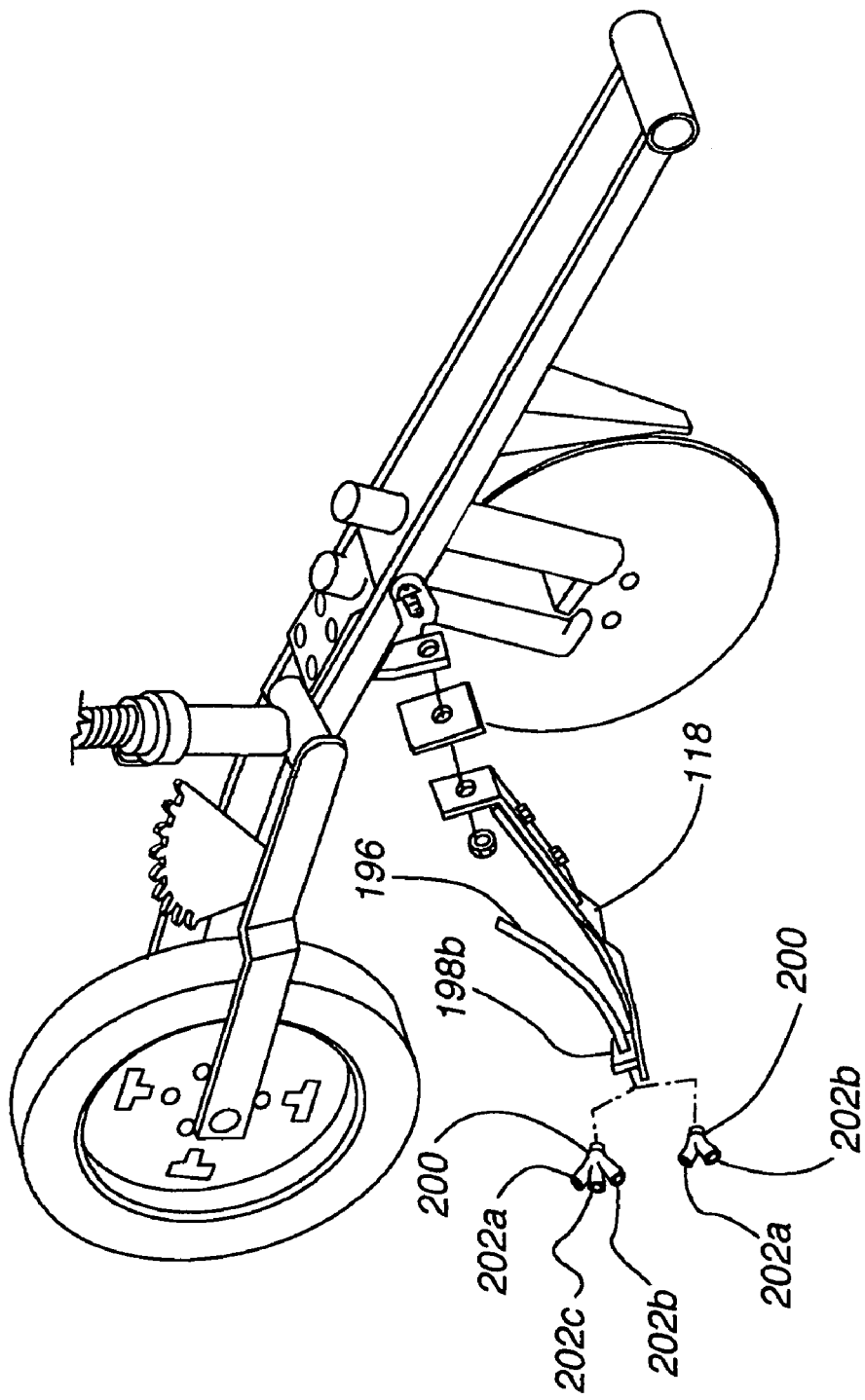
FIG. 38n illustrates a Crustbuster™ model 3400 or 3700 double disc drill with an embodiment of the liquid distribution apparatus of the present invention attached therewith.
Figure 38O:
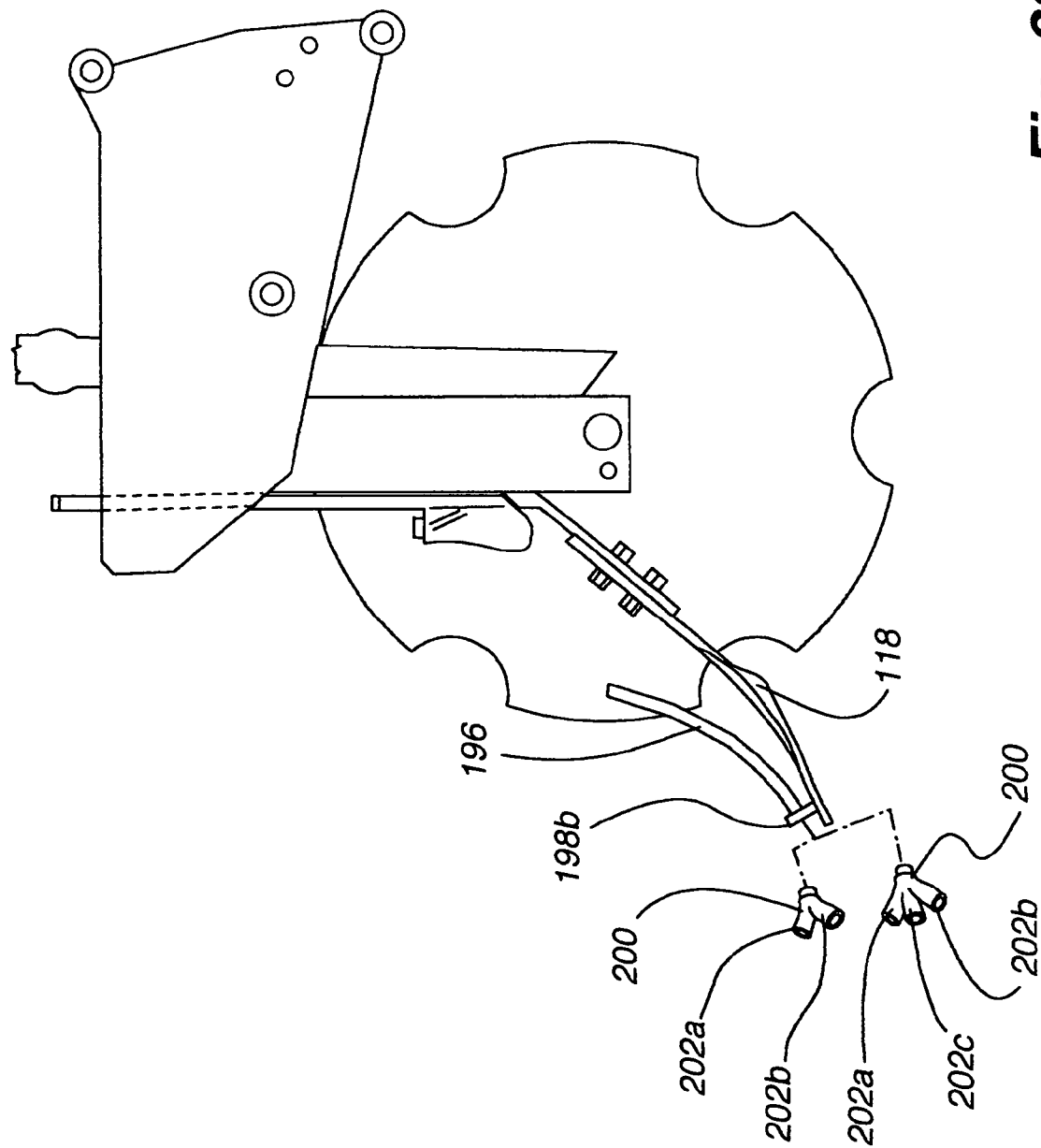
FIG. 38o illustrates a Crustbuster™ model 4000 double disc drill with an embodiment of the liquid distribution apparatus of the present invention attached therewith.
Figure 38P:
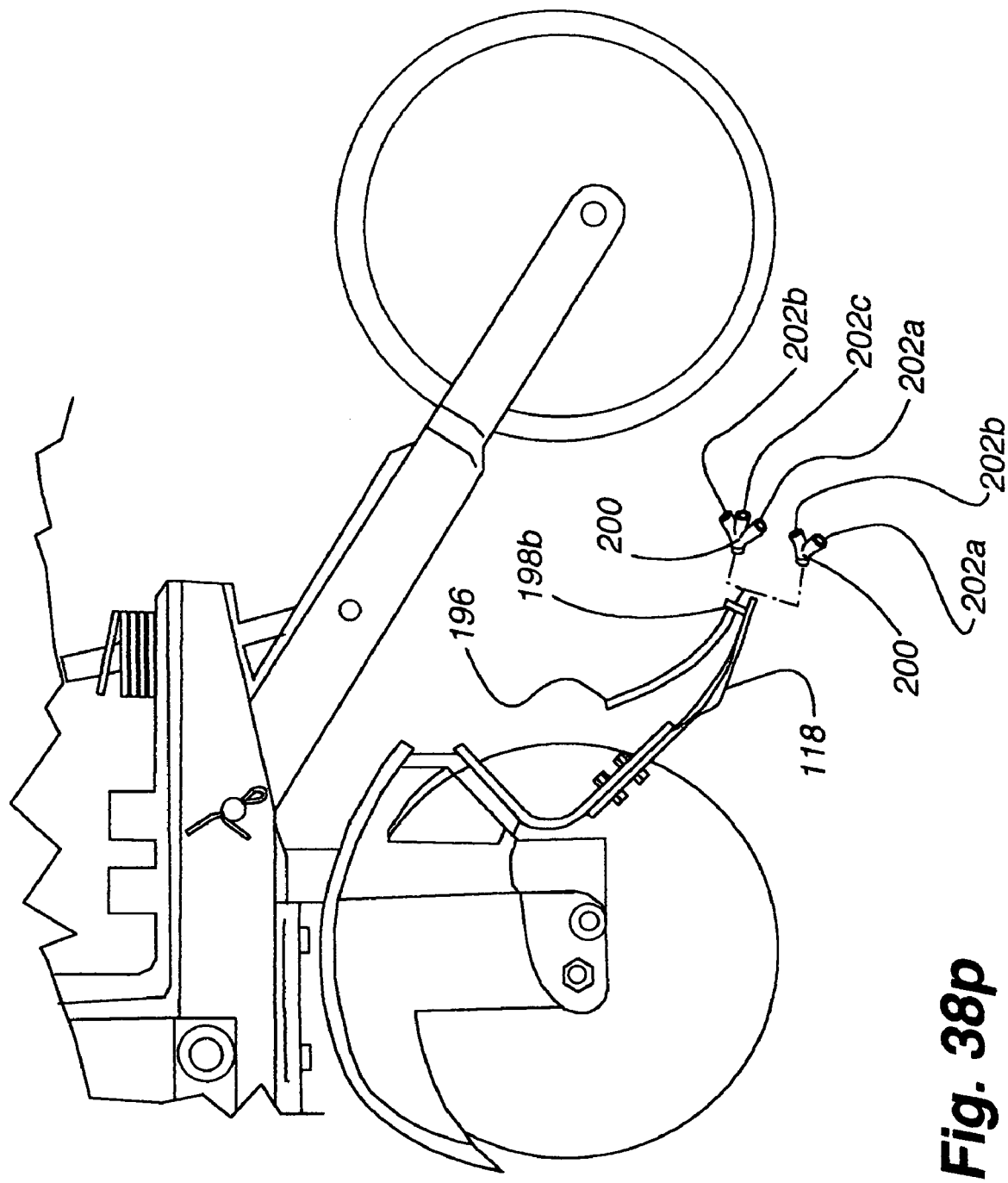
FIG. 38p illustrates a Haybuster™ double disc drill with an embodiment of the liquid distribution apparatus of the present invention attached therewith.
Figure 38Q:
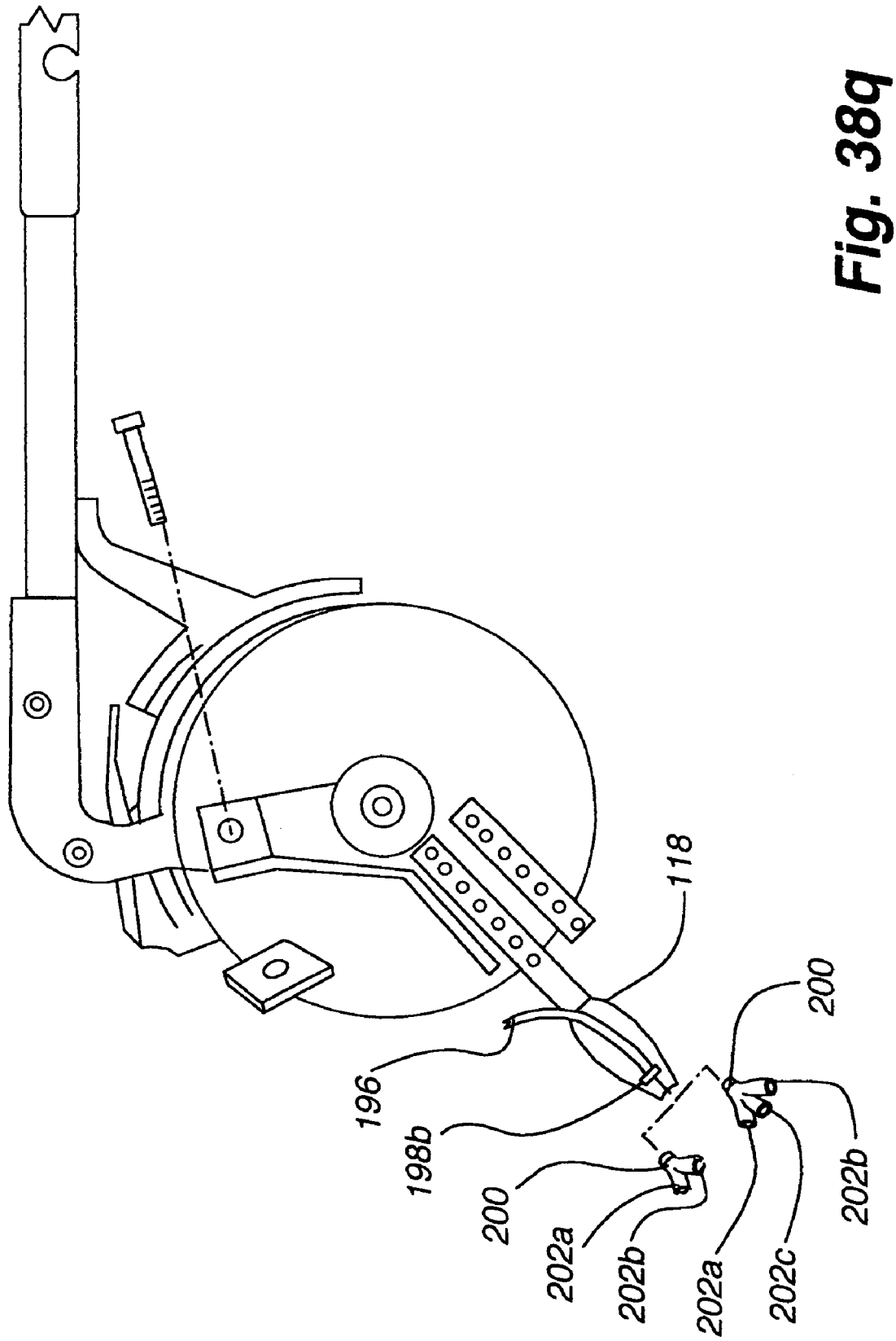
FIG. 38q illustrates a Case IH™ model 5100, 5300 or 5400 double disc drill with an embodiment of the liquid distribution apparatus of the present invention attached therewith.

Referring now to FIGS. 38a–38q various embodiments of the present invention are illustrated with various double disc drills. FIG. 38a illustrates a side view of a Krause™ model 5400 double disc drill with one embodiment of an extension for reducing seed bounce attached thereto. The extension, as shown in FIG. 38a, may have the two outlet or three outlet embodiment of the liquid distribution apparatus connected therewith. The liquid distribution apparatus being in fluid connection with the liquid supply hose. FIG. 38b illustrates a side view of a Krause™ model 5200, 5250 or 5500 double disc drill with one embodiment of an extension for reducing seed bounce attached thereto. The extension, as shown in FIG. 38b, may have the two outlet or three outlet embodiment of the liquid distribution apparatus connected therewith. The liquid distribution apparatus being in fluid connection with the liquid supply hose. FIG. 38c illustrates a side view of a Sunflower™ double disc drill with one embodiment of an extension for reducing seed bounce attached thereto. The extension, as shown in FIG. 38c, may have the two outlet or three outlet embodiment of the liquid distribution apparatus connected therewith. The liquid distribution apparatus being in fluid connection with the liquid supply hose. FIG. 38d illustrates a side view of a Tye™ double disc drill with one embodiment of an extension for reducing seed bounce attached therewith. The extension, as shown in FIG. 38d, may have the two outlet or three outlet embodiment of the liquid distribution apparatus connected therewith. The liquid distribution apparatus being in fluid connection with the liquid supply hose. FIG. 38e illustrates a side view of a Tye™ soybean/rice double disc drill with one embodiment of an extension for reducing seed bounce attached therewith. The extension, as shown in FIG. 38e, may have the two outlet or three outlet embodiment of the liquid distribution apparatus connected therewith. The liquid distribution apparatus being in fluid connection with the liquid supply hose.

FIG. 38f illustrates a side view of a UFT™ double disc drill with one embodiment of an extension for reducing seed bounce attached therewith. The extension, as shown in FIG. 38f, may have the two outlet or three outlet embodiment of the liquid distribution apparatus connected therewith. The liquid distribution apparatus being in fluid connection with the liquid supply hose. FIG. 38g illustrates a side view of a John Deere™ model 750 double disc drill with one embodiment of an extension for reducing seed bounce attached therewith. The extension, as shown in FIG. 38g, may have the two outlet or three outlet embodiment of the liquid distribution apparatus connected therewith. The liquid distribution apparatus being in fluid connection with the liquid supply hose. FIG. 38h illustrates a side view of a John Deere™ model 455, 515 or 8300 double disc drill having gauge wheels mounted along side the double disc openers with an embodiment of the liquid distribution apparatus of the present invention attached therewith. FIG. 38i illustrates a John Deere™ model 455, 515 or 8300 double disc drill having single or double press wheels with a two outlet or three outlet embodiment of the liquid distribution apparatus of the present invention attached therewith. FIG. 38j illustrates a John Deere™ model 8300 double disc drill having a press wheel not attached to the drill, with a two outlet or three outlet embodiment of the liquid distribution apparatus of the present invention attached therewith. FIG. 38k illustrates a Marliss™ double disc drill with a two outlet or three outlet embodiment of the liquid distribution apparatus of the present invention attached therewith. FIG. 38l illustrates a Best™ double disc drill with a two outlet or three outlet embodiment of the liquid distribution apparatus of the present invention attached therewith.

FIG. 38m illustrates a Great Plains™ double disc drill with a two outlet or three outlet embodiment of the liquid distribution apparatus of the present invention attached therewith. FIG. 38n illustrates a Crustbuster™ model 3400 or 3700 double disc drill with a two outlet or three outlet embodiment of the liquid distribution apparatus of the present invention attached therewith. FIG. 38o illustrates a Crustbuster™ model 4000 double disc drill with a two outlet or three outlet embodiment of the liquid distribution apparatus of the present invention attached therewith. FIG. 38p illustrates a Haybuster™ double disc drill with a two outlet or three outlet embodiment of the liquid distribution apparatus of the present invention attached therewith. FIG. 38q illustrates a Case IH™ model 5100, 5300 or 5400 double disc drill with a two outlet or three outlet embodiment of the liquid distribution apparatus of the present invention attached therewith. Additionally, a diverter may be used along with any of the embodiments shown in FIGS. 38a–38q.

Including liquids 114 such as liquid fertilizer, liquid starter, liquid insecticides, liquid inoculants, and water in the furrow 110 along with the seeds 112 at the time of planting advantageously affects the growth of the plants and the ultimate yield of the crop as discussed above. The provision of some types of liquid 114 directly into the furrow 110, however, can actually negatively affect plant growth and the ultimate crop yield if liquid 114 is distributed directly on the seeds 112. Conversely, for some liquids and some types of seeds, it is preferable to provide liquid 114 directly on the seeds 112. Using the various liquid distribution apparatuses described above, it is possible to dispense liquid 114 on the sidewalls 122 of the furrow 110 above the seeds 112 or directly on the seeds 112.

In some instances, it is preferable to dispense liquid 114 well above the vertex 120 of the furrow 110 and the seeds 112 therein. This allows a higher concentration of liquid 114, such as fertilizers, nitrogen, zinc, pot ash, sulfur, insecticides, and the like, to be deposited in the furrow 110 along with the seeds 112, while lessening the risk that the higher concentration liquid will damage the seeds. As the extension 118 is pulled along in the furrow 110, it is jostled by the tractor rolling over the uneven surfaces typically found in fields, by dirt and mud falling on the extension 118, and by other events. Thus, it is important to keep the liquid distribution apparatus 100 firmly held to the extension 118 so that the liquid distribution apparatus 100 is not inadvertently reoriented by the jostling. Otherwise, such jostling might cause liquid 114, whether high concentration or not, to be distributed in unintended portions of the furrow 110.

Figure 39:
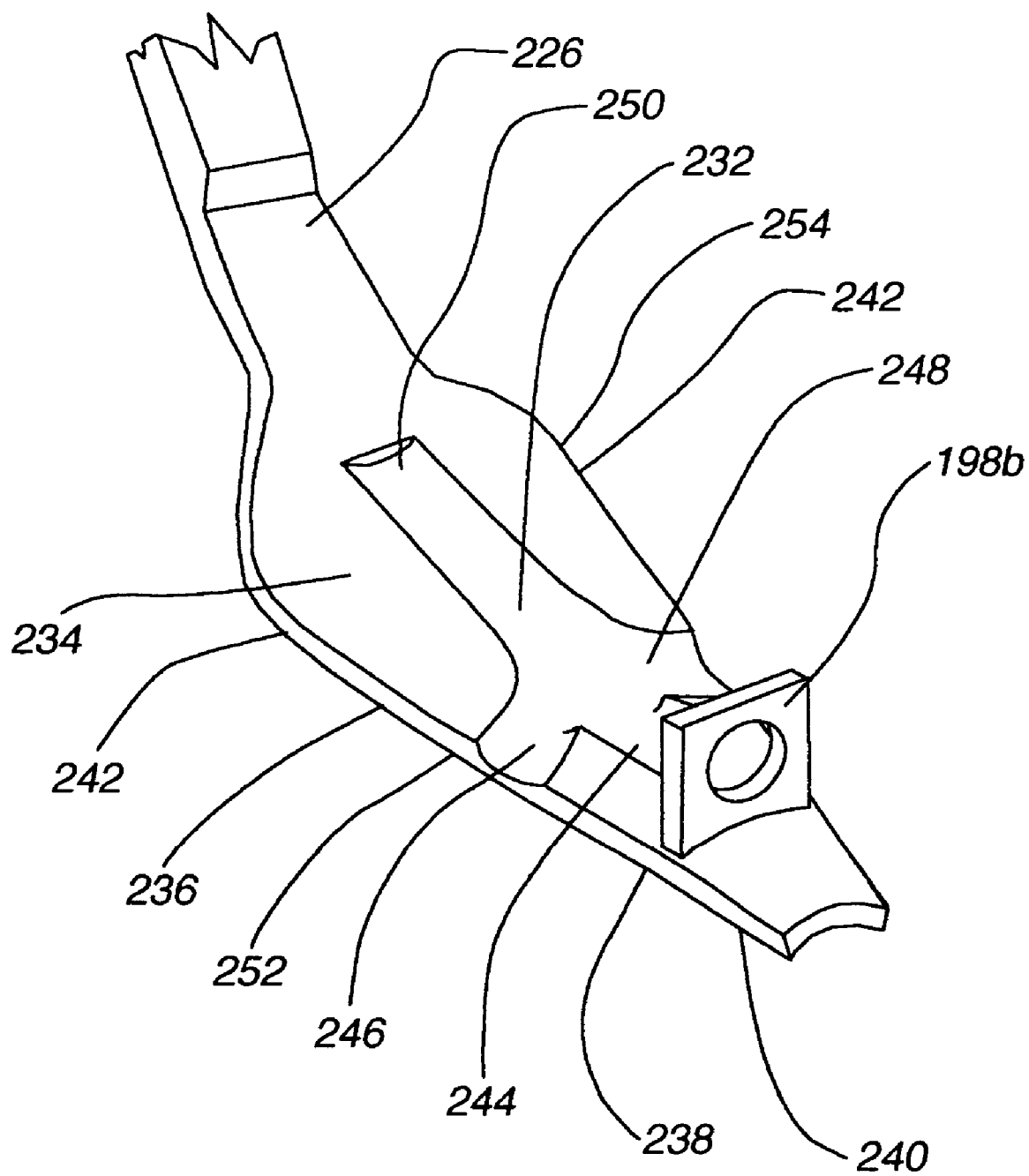
FIG. 39 is an isometric view of one embodiment of an extension defining a depression for locating a liquid distribution apparatus.
Figure 40:
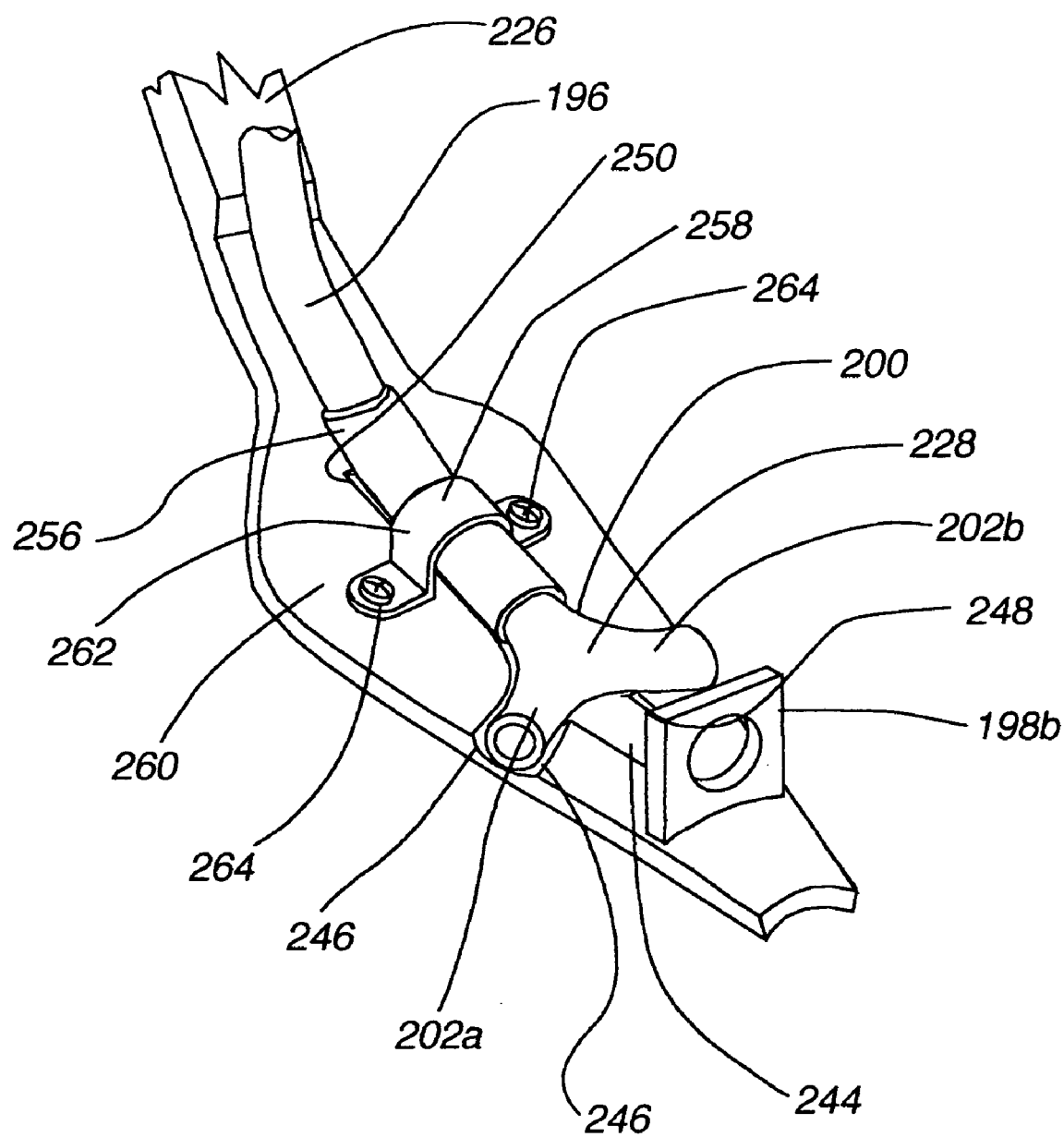
FIG. 40 is an isometric view of the extension illustrated in FIG. 39 with a two outlet liquid distribution apparatus coupled thereto.
Figure 41:
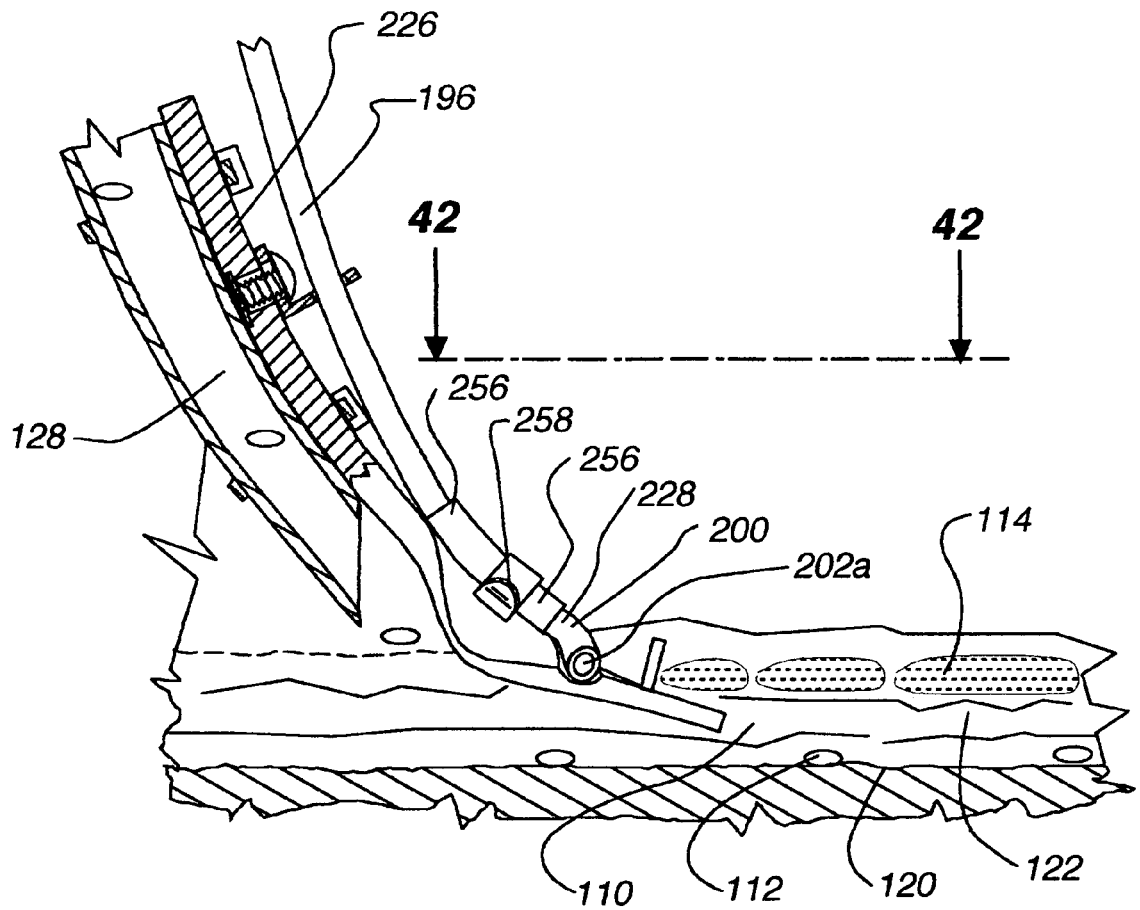
FIG. 41 is a side view of the extension shown in FIG. 40.
Figure 42:
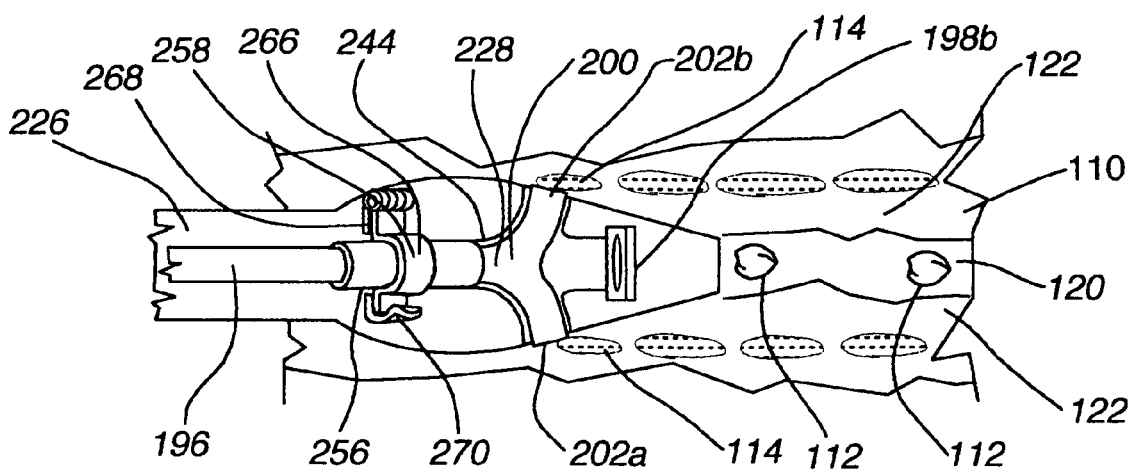
FIG. 42 is a top view of the extension taken along line 42—42 of FIG. 41.
Figure 43:
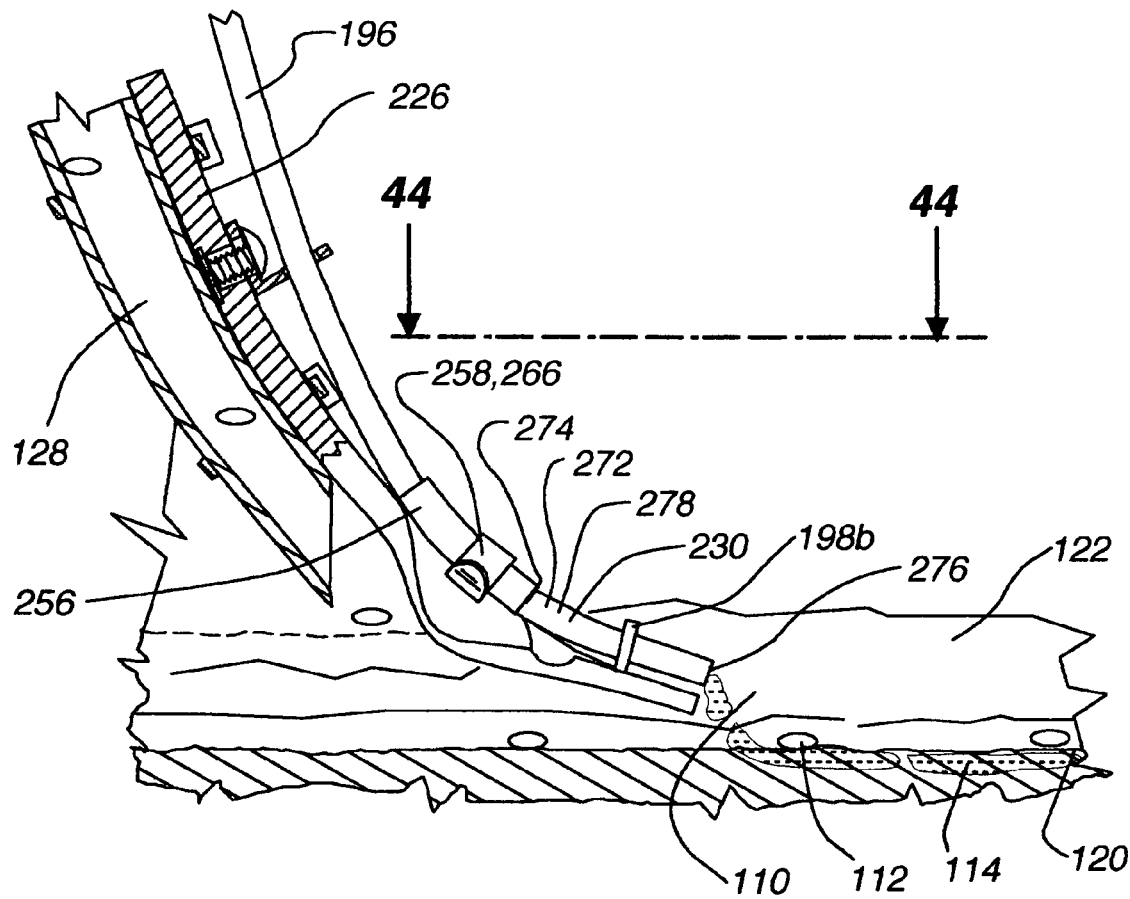
FIG. 43 is a side view of the extension illustrated in FIG. 39 with a single outlet liquid distribution apparatus coupled thereto.
Figure 44:
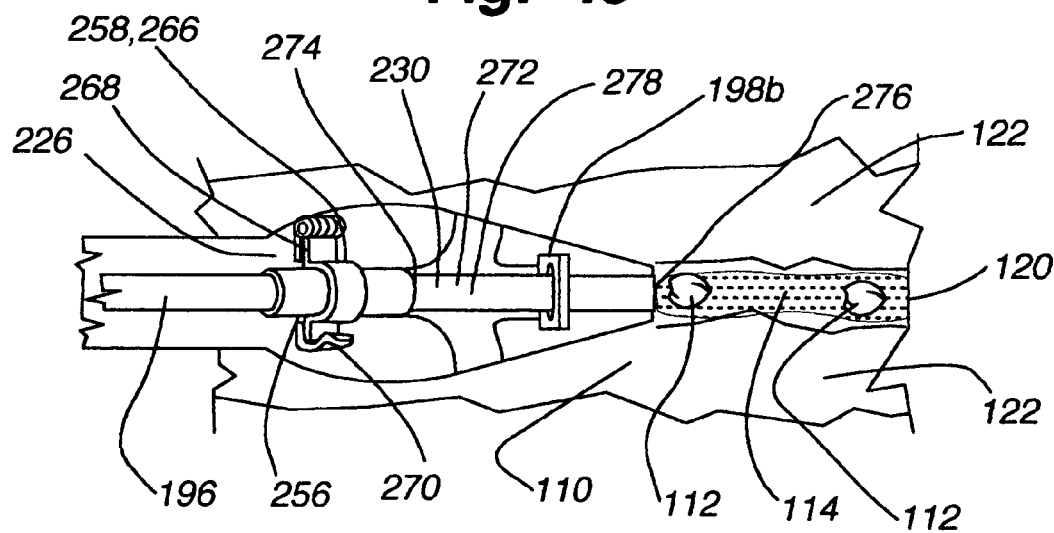
FIG. 44 is a top view of the extension taken along line 44—44 of FIG. 43.

FIG. 39 illustrates one embodiment of an extension 226 conforming to the present invention. FIGS. 40–47 illustrate the extension 226 with various liquid distribution apparatus configurations connected therewith, each conforming to various aspects of the present invention. FIGS. 40–42 illustrate the extension 226 with a two outlet liquid distribution apparatus 228. The two outlet liquid distribution device 228 is oriented on the extension 226 to distribute liquid 114 on the sidewalls 122 well above the vertex 120 of the furrow 110 to allow higher concentration liquids 114 to be used without damaging the seeds 112 located in the vertex 120. FIGS. 43–44 illustrate the extension 226 with a one outlet liquid distribution apparatus 230. The one outlet liquid distribution device is oriented on the extension to distribute liquid on the seeds in the vertex 120 of the furrow 110.

Aspects of the invention allow the extension 226 to be quickly reconfigured from a one outlet liquid distribution configuration to a two outlet liquid distribution configuration or vice versa. For either a single outlet configuration 230 or a two outlet configuration 228, the liquid distribution device is located in a depression 232 defined along the top surface 234 of the extension 226. The depression 232 helps to hold the liquid distribution apparatus (228, 230) in place. The depression 232 also facilitates changing the configuration from a one outlet setup to a two outlet setup.

Figure 45:
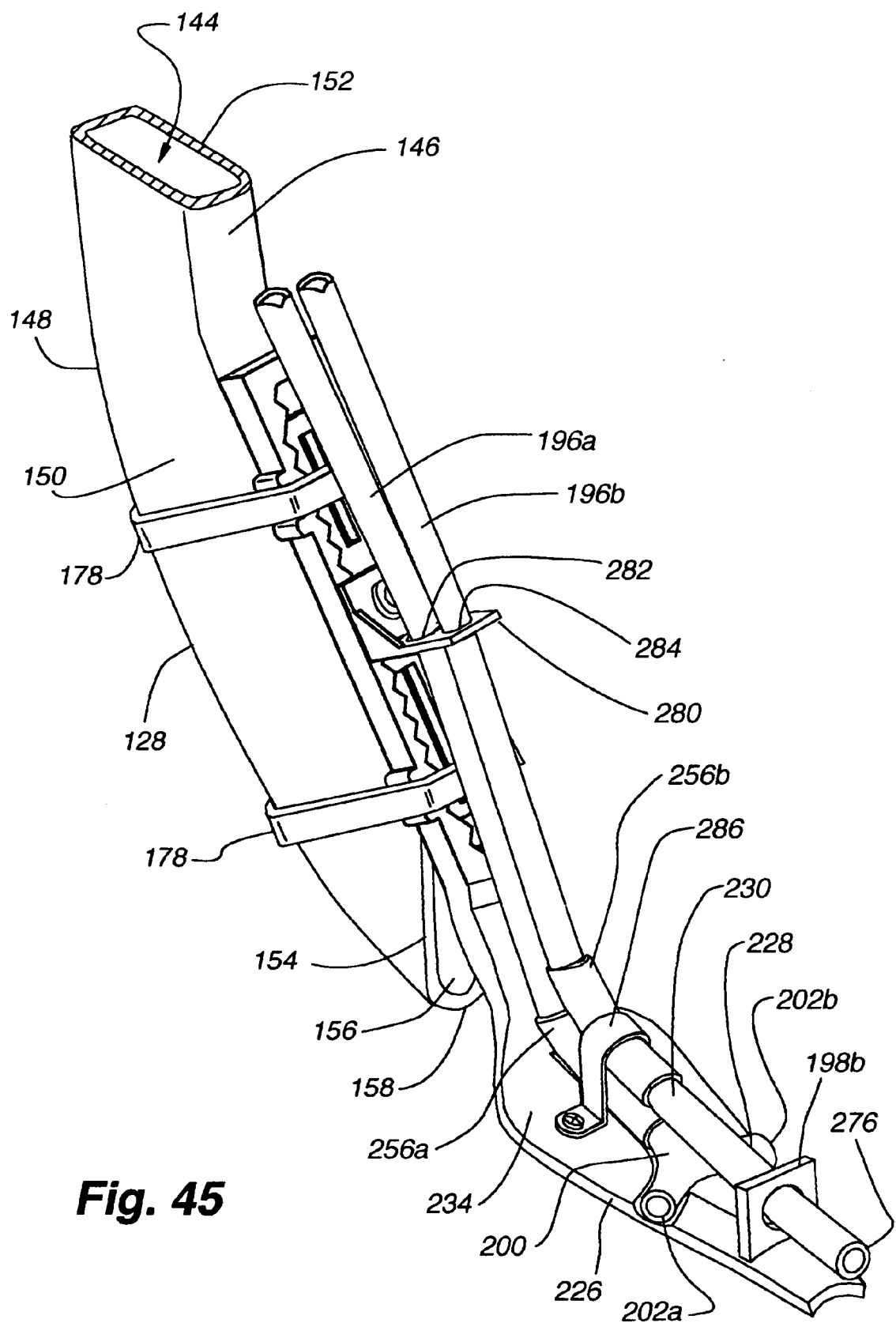
FIG. 45 is an isometric view of the extension shown in FIG. 39 with a two outlet liquid distribution apparatus and a single outlet liquid distribution apparatus coupled therewith.
Figure 46:
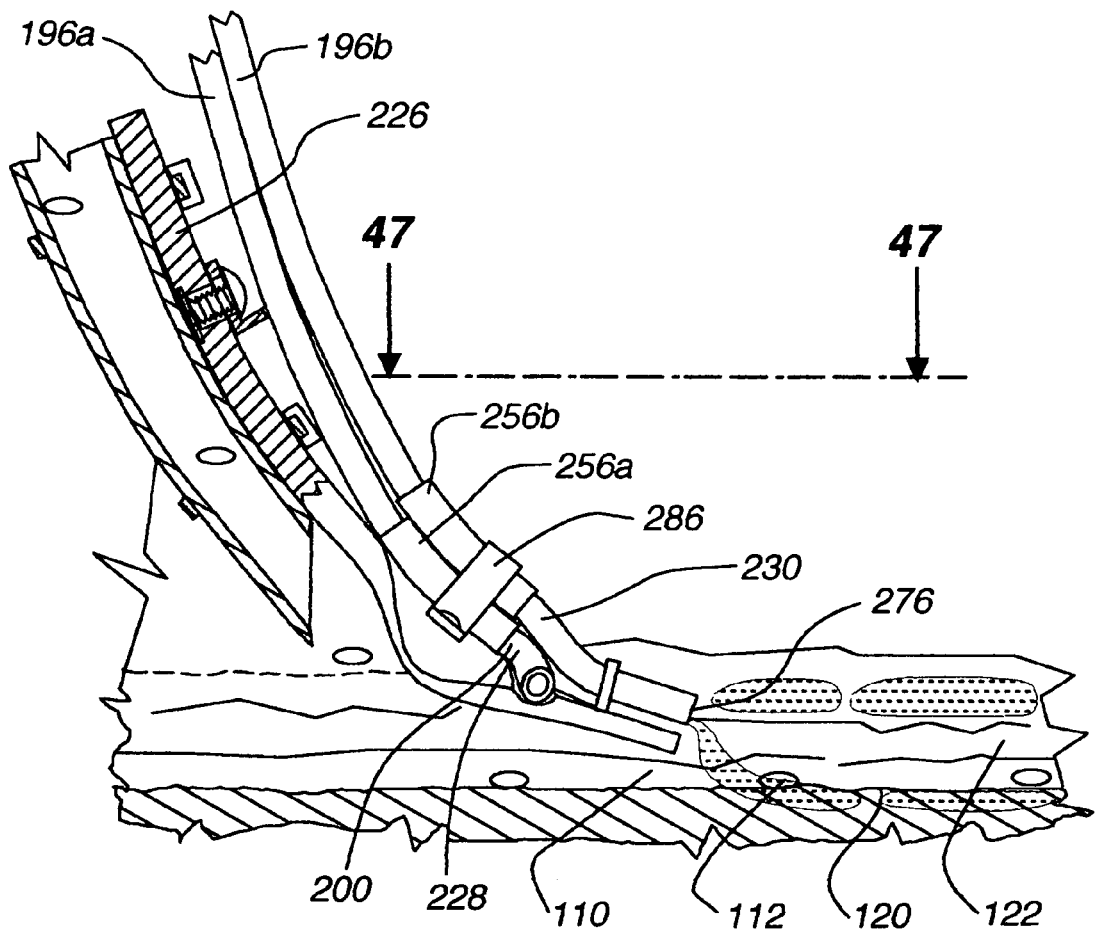
FIG. 46 is a side view of the extension illustrated in FIG. 45.
Figure 47:
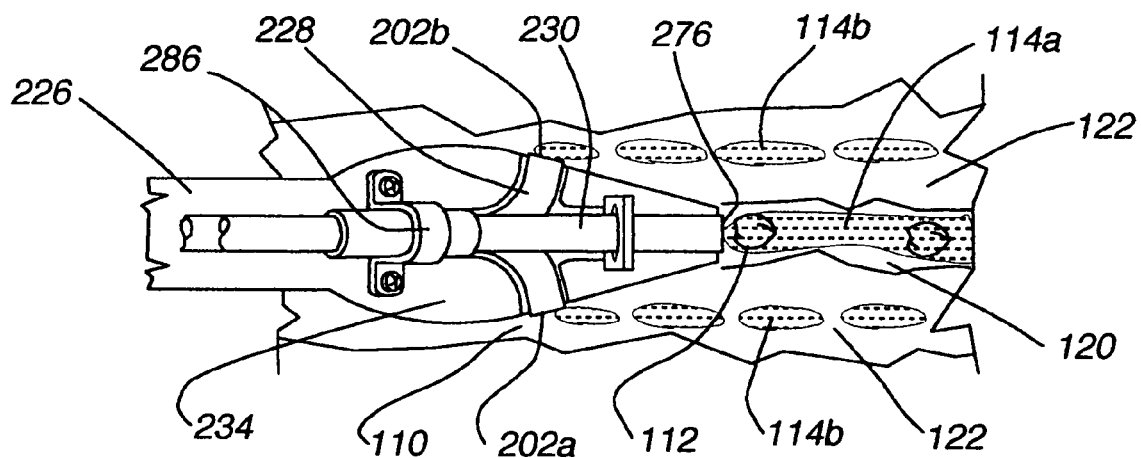
FIG. 47 is a top view of the extension taken along line 47—47 of FIG. 46.

FIGS. 45–47 illustrate an extension 226 with both a one outlet 230 and a two outlet 228 liquid distribution device. This configuration allows for distribution of liquid 114 on only the sidewalls 122, only the vertex 120, or both the vertex 120 and the sidewalls 122 with the same or different liquids. It also allows for reconfiguration of the liquid distribution by changing the liquid feed line at the liquid container 106 rather than swapping liquid distribution devices at the extension 226.

Referring now to FIG. 39, an isometric view of one implementation of an extension 226 conforming to the present invention is shown. The top surface 234 of the bottom segment 236 of the extension 226 defines depression 232 to accept one or more liquid distribution apparatuses. Generally, a liquid distribution apparatus (228, 230) is seated in the depression 232 to locate and to help stabilize the liquid distribution apparatus as the extension 226 is pulled through the furrow 110.

The extension 226 is typically mounted to the seed tube 128. As best shown in FIGS. 4, 5, 7, and 8, the top segment 166 of the extension 226 is releasably attached to the seed tube 128. In one example, described in detail above, the upper segment 166 defines an elongate slot 176 having a saw tooth pattern configured to cooperate with an attachment fixed to the seed tube that define a complimentary saw tooth pattern. The cooperating saw tooth patterns allow the user to adjust the depth that the extension extends down in the furrow 110.

Referring again to FIG. 39, in one implementation, the bottom surface 238 of the extension 226 defines a generally concave surface 240 that acts to deflect seeds 112 into the vertex 120 of the furrow 110 after they exit the seed tube 128 and bounce around in the furrow 110. The extension 226 includes sidewalls 242 defining a generally narrowing width to conform as much as possible to the V-shaped furrow 110 as the extension 226 extends therein. Aspects of the present invention, however, may be adapted for use with an extension that do not have a concave bottom surface and does not have a narrowing width.

The depression 232 in the top surface 234 of the bottom segment 236 comprises a rearward section 244, a first 246 and a second 248 angularly orientated section, and a forwardly extending section 250. The rearward section 244 and the forward section 250 are defined generally along the length of the extension 226 and in combination define a single continuous depression 232. The combined depression 232 extends along the length of the extension 226 in front of the second eyelet 198b. For reference, the second eyelet 198b is located towards the rear of the liquid distribution apparatus (228, 230) when it is attached to a farming implement. The first angularly oriented section 246 extends from the combined depression 232 to one side 252 of the extension 226. The second angularly oriented section 248 extends from the combined depression 232 to the opposite side of the extension.

The depression 232 is formed, in one example, to receive the corresponding tubular portions of some of the embodiments of the liquid distribution apparatus described herein. FIGS. 40–42 illustrate a side view and a top view, respectively, of the extension 226 with an embodiment of the two outlet liquid distribution apparatus 228 received in the depression 232. Particularly, the supply channel 200 of the liquid distribution apparatus 228 is received in the forward section 250 of the depression 232, and the two outlets (202a, 202b) are each received in the respective first 246 and second 248 angularly orientated sections. No portion of the liquid distribution apparatus 228 is received in the rearward section 244. In this implementation of the extension 226, the first and second angularly orientated sections (246, 248) are swept rearwardly to conform to the orientation of the outlets (202a, 202b).

To distribute liquid into the furrow 110, the supply channel portion 200 of the Y-shaped liquid distribution apparatus 228 is fluidly connected with the liquid supply hose 196. In one example, both the supply channel 200 and the liquid supply hose 196 are inserted into a sleeve 256 so that liquid 114 may flow from the supply hose 196 to the liquid distribution apparatus 228. The outlets (202a, 202b) are arranged to distribute liquid 114 onto opposing sidewalls 122 of the furrow 110 well above the vertex region 120 where the majority of the seeds 112 are located.

The depression 232 locates the liquid distribution apparatus (228, 230) forwardly of the second eyelet 198b. Other embodiments, such as those shown in FIGS. 5, 6, and others, illustrate the supply portion of the liquid distribution apparatus within the second eyelet 198b, and the outlets (202a, 202b) to the rear of the second eyelet 198b. In these embodiments, liquid 114 is distributed on the sidewalls 122 nearer to the vertex 120 of the furrow 110. From the seed tube 128, the extension 118 extends rearwardly and downwardly toward the vertex 120 of the furrow 110. The extension 118 also narrows as it extends down into the furrow 110. Referring again to FIGS. 40–42, by locating the outlets (202a, 202b) forwardly of the second eyelet 198b and generally further from the rear of the liquid distribution apparatus 228, the outlets (202a, 202b) are higher on the extension 226. This causes the liquid 114 to be distributed higher on the sidewalls 122 of the furrow 110 above the seeds 112 in the vertex region 120. In some instances, the outlets (202a, 202b) are lengthened as compared with other implementations so that they extend to the sides (252, 254) of the extension along its wider sections. By lengthening the outlets (202a, 202b), the distance or width between the outlets increases, which also causes liquid 114 to be distributed higher on the sidewalls 122. As mentioned above, placing the liquid 114 higher on the sidewalls 122 and thus further from the seeds 112 in the vertex 120 allows a higher concentration of liquid 114 to be distributed in the furrow 110.

The extension 226 may include a clamp that secures the sleeve 256, the supply hose 196, and the liquid distribution apparatus (228, 230) to the extension 226. The sleeve 256 is placed in the clamp 258 to receive the liquid supply hose 196 and the supply channel 200, and the clamp 258 secures them together within the sleeve 256. By loosening the clamp 258, the various embodiments of the liquid distribution apparatus may be swapped out quickly and efficiently. For example, if the user desires to change from a sidewall distribution configuration to a vertex distribution configuration, then a two outlet configuration may be exchanged for a straight one outlet configuration (see FIGS. 43–44 discussed below).

The clamp 258 may be a bracket 262 fixed to the sleeve 256 by way of bolts 264, screws, or the like. To receive the bolts 264 or screws, the extension 226 may define a raised area 260 defining one or more threaded apertures. To facilitate repeated loosening and tightening of the clamp 258, a threaded sleeve formed from a metallic or other durable material may be fixed within the apertures defined in the extension 226. In another alternative, a hinged clamp 266 may be used. The hinged clamp 266 is fixed to the extension 226 along one side of the sleeve 256 and also provided with a hinge 268. The clamp may then be arranged to pivot over the sleeve 256, and snap into a receiver 270 located on the opposite side of the sleeve 256.

FIGS. 43–44 illustrate a side view and a top view, respectively, of the extension 226 with a single outlet liquid distribution apparatus 230 received in the depression 232. The single outlet distribution apparatus 230, in one example, is a straight section of hose 272 defining an inlet 274 and an outlet 276. The inlet 274 is fluidly connected with the liquid supply hose 196. The inlet region 274 is inserted in the sleeve 256, which also receives the liquid supply hose 196. The sleeve 256, the inlet 274 of the straight hose 272, and the liquid supply hose 196 are then secured to the extension 226 with the clamp 258. A portion 278 of the hose 272 between the inlet 274 and the outlet 276 is arranged within the second eyelet 198b to further secure the hose 272 to the extension 226. The outlet 276 of the hose 272 is arranged adjacent the very rear of the extension 226 to deposit liquid 114 on the seeds 112 located in the vertex 120 region of the furrow 110.

The length of hose between the sleeve 256 and the second eyelet 198b is located in the continuous portion of the depression 232 running along the length of the extension 226 in front of the second eyelet 198b. The depression 232 helps to locate the hose 272 when it is being inserted in the sleeve 256, and also helps to secure the hose 272 to the extension 226 during use so that it is not dislodged.

For a user to switch from the two outlet liquid distribution apparatus 228 to the single outlet 230, or vice versa, the user first loosens the clamp 258. The user then removes the liquid distribution apparatus (228, 230) by pulling it free from the sleeve 256. The new liquid distribution apparatus (228, 230) is then inserted into the sleeve 256, located in the depression 232, and the clamp 258 tightened. Thus, removal and replacement of liquid distribution apparatuses (228, 230) may be performed quickly and efficiently by the user.

The depression 232 helps to locate the liquid distribution apparatus (228, 230) when it is being installed. To properly connect a liquid distribution apparatus (228, 230) to an extension 226, after insertion into the sleeve 256, but before clamping, the user places the liquid distribution apparatus (228, 230) within the depression 232, and then clamps it to the extension 226. Thus, the liquid distribution apparatus (228, 230) can be consistently located to the extension 226. This is especially useful for the two outlet embodiment 228.

It is important for the outlets (202a, 202b) to be properly located to distribute liquid 114 into the furrow 110. For example, if the outlets (202a, 202b) were arranged closer to the rear of the extension 226, then the liquid 114 would be distributed closer to the vertex 120 of the furrow 110, which might cause damage to the seeds 112 if a high concentration liquid 114 is used. The depression 232 ensures that the two outlets (202a, 202b) are always located along the same part of the extension 226. The user can also verify that a liquid distribution apparatus (228, 230) has not been dislodged during use by determining whether the liquid distribution apparatus (228, 230) is located correctly within the depression 232.

While the extension 226 is being pulled through the furrow 110, it may run into any number of obstructions, such as the sidewalls 122, mud and dirt falling onto the extension 226, and rocks or other debris in the furrow 110. Such obstructions may act to dislodge or dislocate the liquid distribution apparatus, which can result in liquid 114 being inadvertently deposited in unintended regions of the furrow 110. For example, if the two outlet liquid distribution apparatus 228 is dislodged so that one of the outlets 202 is near the center of the extension 226, liquid 114 might be distributed on the seeds 112 when it was intended to be distributed along the sidewall 122.

The depression 232 also helps to keep the liquid distribution apparatus (228, 230) consistently located along the extension 226 when various obstructions are encountered during planting. Portions of the liquid distribution apparatus (228, 230) are encompassed within the depression 232, which protect those portions from contact with the obstructions. In one implementation, the depression 232 is about half the height of the liquid distribution apparatus (228, 230). Thus, about half of the liquid distribution apparatus (228, 230) is encompassed by the depression 232. Due to constraints of the plastic injection molding process, the depths of the angularly oriented sections (246, 248) of the depression 232 adjacent the sidewalls 242 may be shallower.

FIG. 45 illustrates an isometric view of alternative embodiment of the extension 226 with both a two outlet liquid distribution apparatus 228 and a single outlet liquid distribution apparatus 230 connected thereto. FIGS. 46 and 47 illustrate a side view and a top view, respectively, of the extension 226 and liquid distribution apparatuses (228, 230) shown in FIG. 45. The implementation of the extension 226 illustrated in FIGS. 45–47 may be used to distribute liquid 114 on the sidewalls 122 of the furrow 110 or in the vertex 120 of the furrow 110 directly on the seeds 112. This embodiment may be used to also distribute liquid 114 on the sidewalls and in the vertex 120 at the same time.

As with other embodiments shown herein, a liquid supply hose 196a extends downwardly to the extension 226. To provide for a second fluid, a second liquid supply hose 196b also extends down to the extension 226. About midway along the length of the upper segment of the extension 226, a bracket 280 extends upwardly from the extension 226 defining two eyelets (282, 284). The lower eyelet 282 secures the first supply hose 196a to the extension and the second eyelet 284 secures the second hose 196b to the extension 226. The bracket 280 having the two eyelets (282, 284) defined thereon is similar to the bracket and the single eyelet 198a described with reference to FIGS. 5–8 and others. In one implementation, the two eyelets (282, 284) define an aperture with a radius larger than that of the associated liquid supply hose (196a, 196b) so that flexing of the extension 226 will not disconnect the liquid distribution apparatuses (228, 230) from the supply hoses (196a, 196b).

The liquid supply hoses (196a, 196b) are configured such that the second supply hose 196b is located generally above the first supply hose 196a.

As with other embodiments described herein, the two outlet liquid distribution apparatus 228 is fluidly connected with the first supply hose 196a. The supply channel 200 is inserted into the sleeve 256a which also receives the supply hose 196a. The supply channel 200 and outlets (202a, 202b) of the liquid distribution apparatus 228 are received in the depression 232 defined in the top surface 234 of the extension 226. The two outlet liquid distribution apparatus 228 is thus configured to deposit liquid 114 on the sidewalls 122 of the furrow 110 well above the vertex 120 of the furrow where the seeds 112 are located.

The single outlet liquid distribution apparatus 230 is placed generally above the two outlet liquid distribution apparatus 228 and also extends through the second eyelet 198b at the rear end of the extension 226. The single outlet liquid distribution apparatus 230 is fluidly connected with the second supply hose 196b. The outlet of the supply hose and the inlet of the single liquid distribution apparatus are received in a second sleeve 256b arranged above the first sleeve 256a. The main body of the single liquid distribution apparatus extends downwardly between the rearward intersection of the two outlets (202a, 202b) of the two outlet liquid distribution apparatus 228 and into the rearward section of the depression 232. The region of the single outlet liquid distribution apparatus adjacent the outlet 276 is located within the second eyelet 198b. The outlet 276 is located adjacent the rear of the extension 226. Thus, the single outlet liquid distribution apparatus 230 is oriented to distribute liquid 114 directly into the vertex 120 of the furrow 110 and onto the seeds 112 therein.

To further secure both the single and two outlet liquid distribution apparatuses (228, 230) to the extension 226, a single large clamp 286 is provided that fits over both sleeves (256a, 256b). When the clamp 286 is fixed or tightened to the extension 226, it holds both the two outlet and the one outlet liquid distribution apparatus (228, 230) within the sleeve and also holds the supply hoses (196a, 196b) within the sleeves (256a, 256b).

To distribute liquid 114 onto the sidewalls 122 of the furrow 110, into the vertex 120 of the furrow 110, or both, the user connects the respective supply hose 196 to the appropriate liquid supply tank. To change which liquid distribution apparatus (228, 230) is supplying liquid to the furrow, the user merely has to connect the correct supply hose (196a, 196b) to the correct tank. Such a set-up makes reconfiguration of the liquid distribution into the furrow 110 a straightforward task. The required liquid distribution apparatus (228, 230) and supply hoses (196a, 196b) may be permanently connected to the extension. Thus, changing liquid distribution patterns merely requires the correct supply hose be connected to the correct supply tank.

Using the extension with two liquid distribution apparatus, the user may also distribute a first liquid 114a into the vertex 120 of the furrow 110 on the seeds 112 and distribute a second liquid 114b on the sidewalls 122 of the furrow 110 above the seeds 112. For example, the user may wish to place a high concentration liquid fertilizer high up on the sidewalls 122 of the furrow 110 and at the same time provide water directly onto the seeds 112 in the furrow 110 during the planting. Thus the first supply hose 196a supplying liquid to the two outlet liquid distribution apparatus 228 would be connected to a liquid fertilizer tank, and the second supply hose 196b supplying liquid to the single outlet liquid distribution apparatus 230 would be connected to a water tank.

In alternate embodiments of the invention, other structures for securing the liquid distribution apparatus (228, 230) to an extension are also possible. For example, as shown in the exploded isometric view of FIG. 48 and the assembled isometric view of FIG. 49, an extension 290 may be employed having a pair of protrusions 292 deployed to retain or otherwise secure the liquid distribution apparatus 228. In one particular implementation, the protrusions 292 are formed on opposite sides of a centerline 293 along the length of the upper surface 291 of the lower segment 299 of the extension 290. Each protrusion 292 is configured to receive a screw 294 by way of an aperture 295. The protrusions 292 are a polymer-based material formed through injection molding along with the remainder of the extension 290, in an example.

The protrusions 292 shown are generally of an upstanding elongate rectangular arrangement. Other shapes and sizes are also possible. For example, the protrusions may define a prong, the protrusion may extend for a greater or lesser length along the upper surface, and the protrusions may be of differing height.

As shown further in FIGS. 48 and 49, a two outlet liquid distribution apparatus 228, along with a liquid supply hose 196 fluidly connected to the supply channel 200 of the liquid distribution apparatus 228, is placed between the protrusions 292. A retaining plate 228 having a hole 297 corresponding to the aperture 295 of each protrusion 292 is then placed atop the protrusions 292 so that each hole 297 aligns with the aperture 295. A screw 294 is then rotated into the aperture 295 of each of the protrusions 292, thereby immovably affixing the liquid distribution apparatus 228 to the extension 290. The aperture 295 may be threaded or not, depending on whether the screws 294 employed are of a self-tapping nature.

The use of the screws 294 allow the rapid changing of one type of liquid distribution apparatus 228 for another while allowing a secure attachment between the liquid distribution apparatus 228 and the extension 290. Alternate embodiments may employ different types of fasteners, such as posts, clips, and other structures to secure the liquid distribution apparatus 228 between the protrusions 292.

In alternate embodiments, the protrusions 292 may each also include a flange 298, as indicated in FIGS. 48 and 49, oriented parallel to and along opposite sides of the supply channel 200 of the liquid distribution apparatus 228, further helping to maintain the liquid distribution apparatus 228 in a stationary position, even when the liquid distribution apparatus 228 makes contact with soil, rocks, and other debris while traveling within the seed furrow. Therefore, attaching the liquid distribution apparatus 228 to the extension 290 in such a secure manner aids in the consistent application of various liquids, such as water, fertilizers, insecticides, starters and inoculants, to the desired area of the seed furrow.

In addition to the advantage of immovably securing the liquid distribution apparatus 228, the protrusions 292, along with their associated flanges 298, help divert soil, rocks, and other debris away from the liquid distribution device 28 while traveling within the seed furrow to prevent inordinate wear of the liquid distribution apparatus 228.

The protrusions 292 typically are spaced at such a distance that the liquid distribution apparatus 228 fits snugly between the protrusions 292 to further aid in preventing the liquid distribution apparatus 228 from rotating or sliding in relation to the extension 290.

Figure 50:
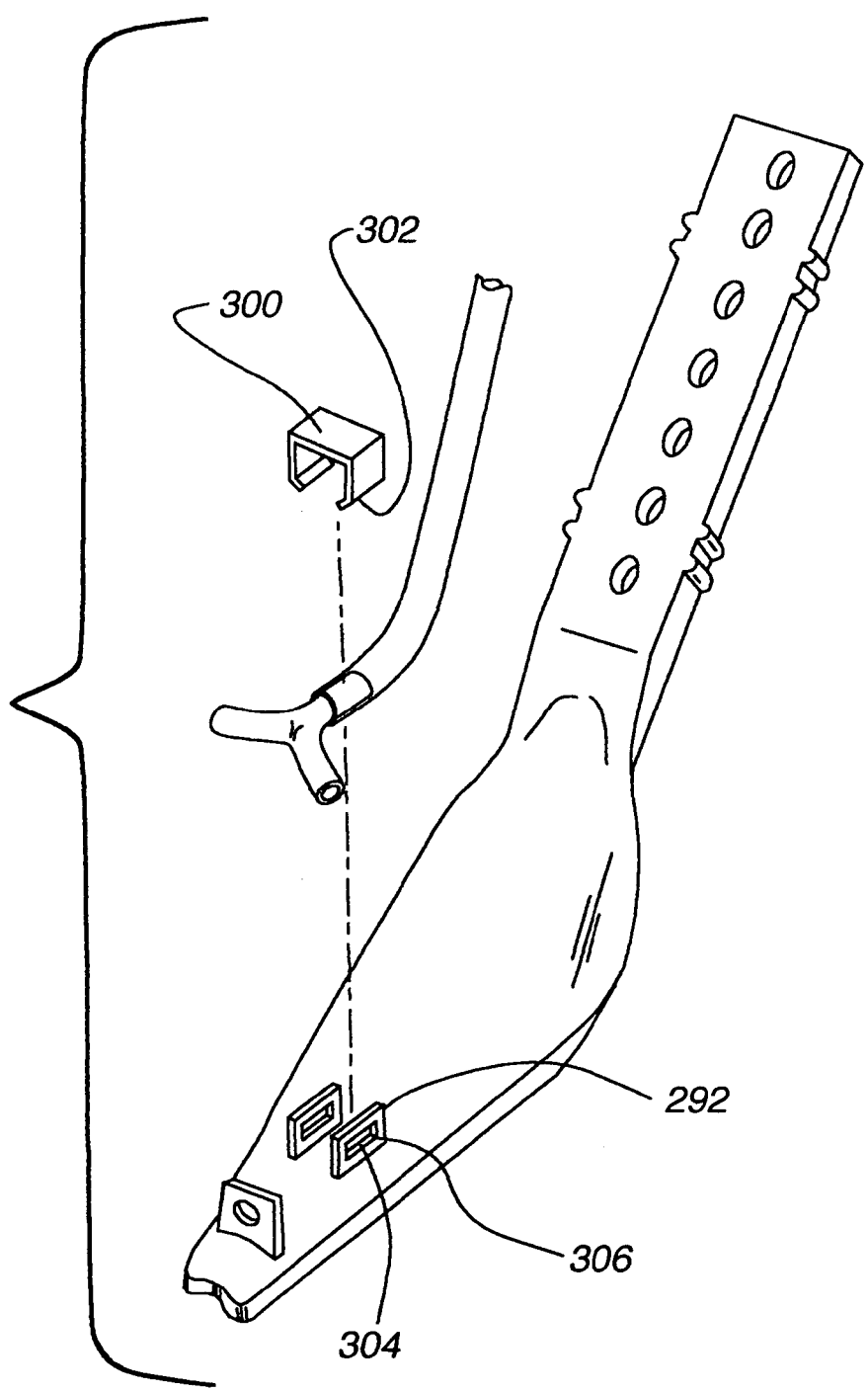
FIG. 50 is an exploded isometric view of an alternate embodiment of an extension having protrusions for attaching a liquid distribution apparatus to the extension by way of a retaining plate with prongs.

Alternatively, as shown in FIG. 50, a retaining plate 300 may define a pair of downwardly extending prongs 302 adapted to snap into corresponding apertures 304 defined in the sidewalls 306 of a protrusion 292. Removal of the plate is achieved by imposing a downward force on the upper surface of the plate 300 to cause the prongs 302 to flare outwardly and disengage from the apertures 304 in the protrusion sidewalls 306.

In still other embodiments, the protrusions 292 may define an inward flange 308 (as shown in FIG. 51) or an inward curve along the top edge. In either arrangement, the spacing between the lower portions of the protrusions 292 is greater than between upper portions. Arranged as such, with spacing so that the diameter of the supply tube 196 is greater than that between the upper portions of the protrusions 292, the liquid distribution apparatus 228 may be pressed between the protrusions and retained by the top portions or flanges 308 of the protrusions 292. Thus, in either arrangement a retaining plate may not be necessary.

Although FIGS. 48–51 indicate the use of the two outlet liquid distribution apparatus 228, which is typically used for application of liquids to the sidewalls of the seed furrow, other devices, such as the one outlet liquid distribution device 230, as described above, may be used in conjunction with these embodiments to allow the distribution of liquid at the bottom of the seed furrow. Furthermore, both a one outlet and two outlet liquid distribution device (228, 230) may be used simultaneously where taller protrusions 292 are employed.

While various embodiments of the invention have been particularly shown and described, it will be understood by those skilled in the art that various other changes in the form and details may be made without departing from the spirit and scope of the invention, which is defined by the following claims.

I claim:

1. An extension for use with a planter for properly placing seeds in a seed furrow, the planter including a liquid supply hose for distributing liquid into the seed furrow, the seed furrow having a centrally located bottom portion and a first sidewall and a second sidewall, the first sidewall and the second sidewall extending upwardly and outwardly from the centrally located bottom portion of the seed furrow, said extension comprising:
   an elongate flexible body member defining a generally arcuate shape which provides a generally downwardly and rearwardly sweeping orientation, and also defining an upper segment and a lower segment;
   the upper segment attachable to the planter;
   the lower segment comprising an upper surface;
   the lower segment configured to depend downwardly and rearwardly from the planter and extendible into the furrow; and
   a first and second protrusions extending upwardly from the upper surface, the first and second protrusions being adapted to support a liquid distribution apparatus therebetween.

2. The extension of claim 1, wherein the planter comprises a furrow opener.

3. The extension of claim 1, wherein the planter comprises a seed tube.

4. The extension of claim 1, wherein the upper surface defines a centerline along a length of the lower segment, the first and second protrusions being located on opposing sides of the centerline.

5. The extension of claim 1, wherein the first and second protrusions each define an aperture configured to receive a fastener for securing a retainer plate to the first and second protrusions.

6. The extension of claim 5, wherein the fastener is a screw.

7. The extension of claim 1, wherein the first and second protrusions each define an aperture for receiving prongs of a retainer plate.

8. The extension of claim 1, wherein the first and second protrusions each define an inward curve configured to retain the liquid distribution apparatus.

9. The extension of claim 1, wherein the first and second protrusions each define an inward flange configured to retain the liquid distribution apparatus.

10. The extension of claim 1, wherein the first and second protrusions each include a flange oriented parallel to a centerline of the upper surface.

11. The extension of claim 1, wherein the lower segment further comprises a lower surface having a downwardly convex shape.

12. The extension of claim 1, wherein the lower segment defines a decreasing width dimension between a first side and a second side of the lower segment.

13. The extension of claim 1, the liquid distribution apparatus comprising:
   a supply channel fluidly connected with the liquid supply hose; and
   a distribution channel in fluid connection with the supply channel.

14. The extension of claim 13, further comprising:
   a retainer plate secured to the first and second protrusions.

15. The extension of claim 14, further comprising:
   at least one fastener being received by the first and second protrusions to secure the retainer plate against the first and second protrusions, whereby the liquid distribution apparatus is securely mounted to the extension.

* * * * *